(12) United States Patent
Ebisu et al.

(10) Patent No.: US 7,179,512 B2
(45) Date of Patent: Feb. 20, 2007

(54) LIQUID CRYSTAL DISPLAY AND MANUFACTURING METHOD OF SAME

(75) Inventors: Katsuji Ebisu, Kawasaki (JP); Takahiro Kashikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 10/436,331

(22) Filed: May 13, 2003

(65) Prior Publication Data

US 2003/0214623 A1    Nov. 20, 2003

(30) Foreign Application Priority Data

| | | | |
|---|---|---|---|
| May 14, 2002 | (JP) | | 2002-138627 |
| Jun. 6, 2002 | (JP) | | 2002-165603 |
| Jun. 7, 2002 | (JP) | | 2002-167295 |
| Jun. 7, 2002 | (JP) | | 2002-167473 |
| Jun. 10, 2002 | (JP) | | 2002-168796 |
| Jun. 10, 2002 | (JP) | | 2002-168919 |
| Jun. 10, 2002 | (JP) | | 2002-169105 |
| Jun. 11, 2002 | (JP) | | 2002-170267 |
| Jun. 11, 2002 | (JP) | | 2002-170289 |
| Jun. 25, 2002 | (JP) | | 2002-184781 |
| Sep. 3, 2002 | (JP) | | 2002-257891 |
| Oct. 11, 2002 | (JP) | | 2002-298730 |

(51) Int. Cl.
    *G02F 1/1339* (2006.01)
(52) U.S. Cl. ............ 428/1.5; 349/155; 349/156; 540/122; 540/125; 540/139; 540/140; 252/587
(58) Field of Classification Search .......... 428/1.5; 349/1.55, 155–156; 540/122, 125, 139–140; 252/587
See application file for complete search history.

(56) References Cited

U.S. PATENT DOCUMENTS

| | | | | |
|---|---|---|---|---|
| 4,983,023 A | * | 1/1991 | Nakagawa et al. | 349/157 |
| 5,089,905 A | * | 2/1992 | Sasaki et al. | 349/97 |
| 5,499,128 A | * | 3/1996 | Hasegawa et al. | 349/155 |
| 5,581,384 A | * | 12/1996 | Hotta et al. | 349/155 |
| 5,615,031 A | * | 3/1997 | Saiuchi et al. | 349/149 |
| 5,643,471 A | * | 7/1997 | Onishi et al. | 216/23 |
| 5,911,899 A | * | 6/1999 | Yoshikai et al. | 219/522 |
| 6,064,461 A | * | 5/2000 | Nishida | 349/155 |
| 6,066,729 A | * | 5/2000 | Fujita et al. | 540/125 |
| 6,278,066 B1 | * | 8/2001 | Fahlen et al. | 174/250 |
| 6,294,230 B1 | * | 9/2001 | Koyanagi et al. | 428/1.52 |
| 6,299,949 B1 | * | 10/2001 | Shioda et al. | 428/1.5 |
| 6,339,461 B1 | * | 1/2002 | Kashiwazaki et al. | 349/155 |

(Continued)

FOREIGN PATENT DOCUMENTS

JP      8-110524      4/1996

(Continued)

*Primary Examiner*—Harold Pyon
*Assistant Examiner*—Sow-Fun Hon
(74) *Attorney, Agent, or Firm*—Staas & Halsey LLP

(57) ABSTRACT

A liquid crystal display which has spacers reliably joined with a pair of substrates of the liquid crystal display by using spacers adapted to the purpose with respect to material, structure, method of joining with the substrates, etc. A pair of substrates can be reliably joined with spacers, and the strength of the liquid crystal display against an external pressure as well as display characteristics can be thereby improved. A manufacturing methods for such a liquid crystal display is also disclosed.

14 Claims, 17 Drawing Sheets

U.S. PATENT DOCUMENTS 6,392,735 B1 * 5/2002 Tani .......................... 349/156
6,396,559 B1 * 5/2002 Kishimoto et al. ......... 349/156
6,441,879 B2 * 8/2002 Hiraishi et al. ............. 349/155

FOREIGN PATENT DOCUMENTS

| | | |
|---|---|---|
| JP | 8-220546 | 8/1996 |
| JP | 2000-155321 | 6/2000 |
| JP | 2001-83517 | 3/2001 |
| JP | 2001-201750 | 7/2001 |

* cited by examiner

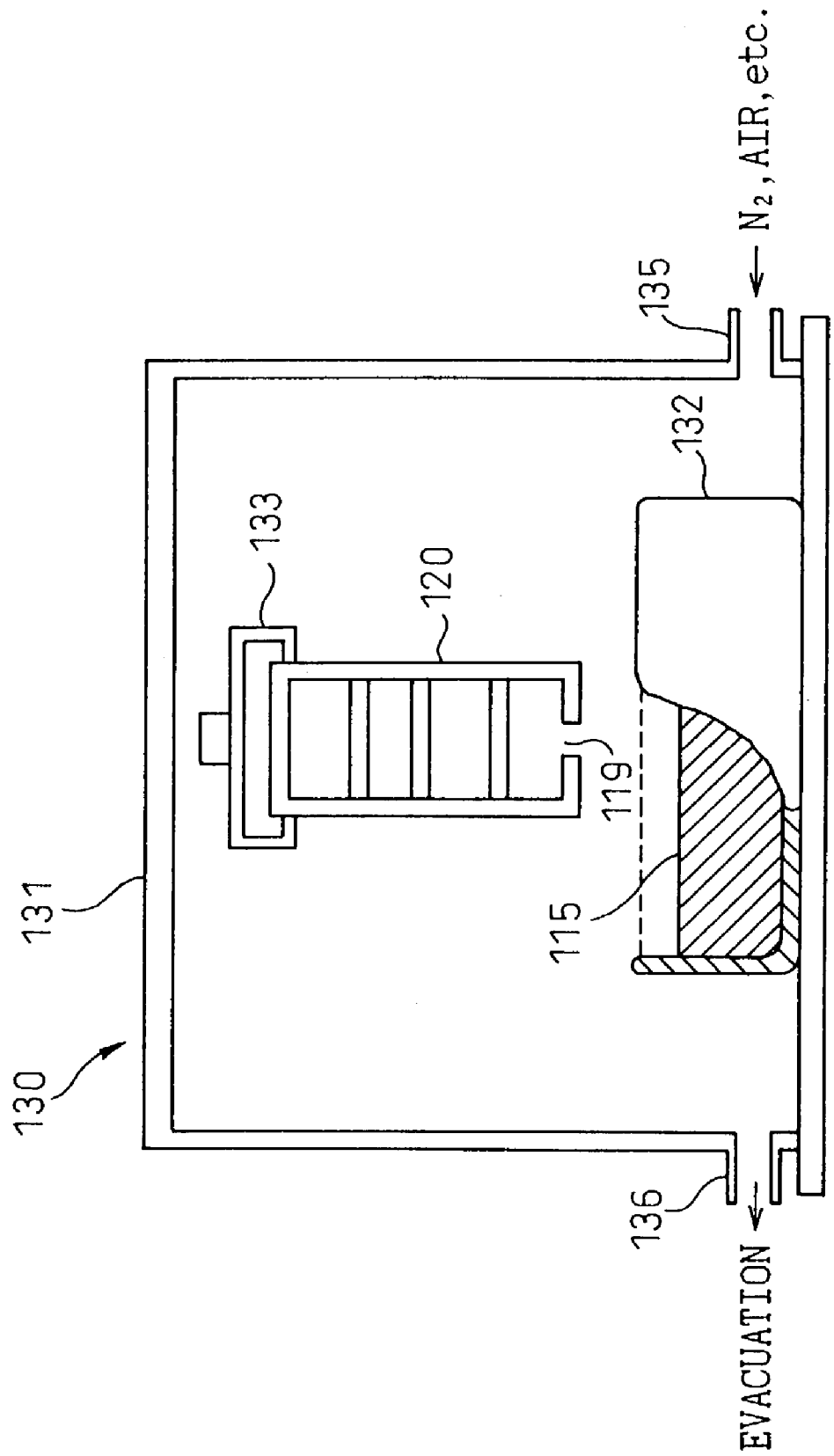

LIQUID CRYSTAL DISPLAY AND MANUFACTURING METHOD OF SAME

CROSS-REFERENCES TO RELATED APPLICATIONS

This application is based upon and claims the benefit of priority from each of prior Japanese Patent Applications No. 2002-138627, which was filed on May 14, 2002; No. 2002-165603, which was filed on Jun. 6, 2002; No. 2002-167295 and No. 2002-167473, which were filed on Jun. 7, 2002; No. 2002-168796, No. 2002-168919 and No. 2002-169105, which were filed on Jun. 10, 2002; No. 2002-170267 and No. 2002-170289, which were filed on Jun. 11, 2002; No. 2002-184781, which was filed on Jun. 25, 2002; No. 2002-257891, which was filed on Sep. 3, 2002; and No. 2002-298730, which was filed on Oct. 11, 2002, the entire contents thereof being incorporated herein by reference.

BACKGROUND OF THE INVENTION

1. Field of the Invention

The present invention relates to a liquid crystal display or a liquid crystal panel and a manufacturing method of the same. More particularly, the present invention relates to a liquid crystal display consisting of a pair of substrates of which at least one is transparent and which have a medium sandwiched therebetween that has light switching function and is generally known as liquid crystal, wherein uniformity in contrast, response speed, etc., can be improved and a good display quality can be achieved by maintaining a uniform and constant gap between the substrates over the effective display area, and also relates to a manufacturing method of the same.

2. Description of the Related Art

A liquid crystal display consisting of a pair of substrates of which at least one is transparent and which has liquid crystal, that is, a medium having light switching function, filled therebetween, has several advantages in that it is generally thin and light in weight, has a low power consumption, etc. Therefore, it is widely used as a display device in electronic calculators, household appliances, or in OA (office automation) equipment. A liquid crystal display is also used in an input apparatus of an information processing system and in computer-holograms as a spatial light modulator.

A liquid crystal panel used for a display in an OA equipment has typically the construction of a pair of substrates having liquid crystal filled and sealed therebetween. On one of the substrates, a TFT (Thin Film Transistor) and a pixel electrode is formed for each pixel, and on the other substrate a common electrode is formed that is common to all pixels. Hereinafter, the substrate on which pixel electrodes and TFTs are formed will be referred to as the TFT substrate, and the substrate which is disposed opposing to the TFT substrate will be referred to as the opposing substrate.

In a liquid crystal display, it is essential, to obtain a good quality display, that the gap between the TFT substrate and the opposing substrate be uniform and constant. In order to maintain a uniform and constant gap, members are used which are disposed between the substrates and are generally called spacers. Spacers are broadly divided into bead-shaped spacers and pillar-shaped spacers, and various methods have been developed for arranging and fixing these spacers.

One method which has been proposed for uniformly controlling the gap between substrates is to scatter spherical particles (beads) on the substrate. In this method, however, it is difficult to control the distribution of beads, and beads tend to be scattered also in the area of pixels that is essential for display. This gives rise to orientation defect of the liquid crystal molecules, which leads to the problem of deterioration of the display quality.

In order to overcome this problem, a method has been proposed in which, in place of scattering beads, a photolithographic method is used to selectively form pillar-shaped spacers outside the area of pixels (for example, Japanese Patent Publication Nos. 08-220546, 2001-82517, and 2001-201750). In this case, there is no spacer in the essential pixel area, and therefore, defects in orientation and a deterioration of display quality can be avoided. However, spacers are usually adhered to only one of the substrates and are not adhered to the other substrate. Therefore, as shown in FIG. 7, when spacers 51 are adhered only to the opposing substrate 50, but not to the TFT substrate 60, if external pressure is applied to a point A between the spacers 51, cell gap around the point A may vary considerably and may give rise to interference fringes or fluctuation of color tone or of drive voltage characteristics. In extreme cases, the substrates may come into contact with each other and the orientation film may be damaged, leading to a disturbance in the orientation of liquid crystal molecules and to deterioration of display quality.

Thus, the possibility of adhering spacers to both substrates has been examined, but it has been difficult to realize both precise control of the gap and strong adherence to substrates. For example, it is proposed in Japanese Patent Publication No. 2000-155321 to include beads which are not deformed by application of pressure or heat, in the spacers, to realize both high strength and strong adhesion to substrates. However, since the beads are dispersed in resin material for forming spacers, problems arise as described below:

(1) There is a probability that some spacers do not contain beads, and this degrades the gap uniformity.

(2) If, in order to avoid above problem, the content of the beads is increased, the beads act as fillers and produce adverse effect, in that, when manufacturing spacers, spacer material cannot be spin-coated uniformly, leading to fluctuations in the coating thickness which results in non-uniform heights of the spacers.

(3) Beads with uniform size are very expensive, and since beads outside of the spacer are removed and cast off, most of the beads are wasted, leading to a high manufacturing cost.

Pillar-shaped spacers are largely composed of beads having high hardness so that they cannot follow rapid oscillation of substrates due to shock, especially expansion of the substrates, and the pillar-shaped spacers tend to separate from the substrates, or to be broken.

Further, a method is disclosed in Japanese Patent Publication No. 08-110524 in which spacers coated with thermoplastic resin are scattered on one of the substrates, and when two substrates are adhered, spacers are joined to both substrates by the thermoplastic resin. However, it is impossible to dispose the spacers in desired positions with this method.

Thus, the prior method for arranging and fixing spacers for a liquid crystal display has not been satisfactory for realizing a liquid crystal display which is resistant to an external force (highly resistant to shock) and has good display characteristics.

Further, with the prior spacers, it has been difficult to coat the solution for orientation film so as to arrange spacers uniformly and in high density on the substrate, or spacers may separate from the substrate during rubbing treatment of the orientation film. Thus, it is not satisfactory for fixing spacers on the substrate while maintaining the display quality of the liquid crystal display.

When a photolithographic method is used to control the substrate gap, using spacers which are formed and completely hardened on one of the substrates outside of the pixel region, sufficient adhesion to the other opposing substrate cannot be obtained so that the gap between electrodes at the center portion of the substrates becomes small under an external pressure, giving rise to interference fringes, fluctuation of color tone or fluctuation of the drive voltage characteristics, and, in an extreme case, upper and lower substrates may come into contact with each other and the orientation film may be damaged, leading to problems such as disturbances in the orientation of liquid crystal molecules and a deterioration of display quality.

On the other hand, it is highly desirable to form spacers from resin alone and realize both high strength and strong adhesion. Spacers can be formed from resin alone, for example, by coating the resin material for the spacer on an orientation control film formed on one of the substrates and then patterning the resin film by exposure to light and development. A spacer thus obtained adheres strongly to the orientation control film on which the resin material for the spacer was coated. However, when the spacer thus formed is superimposed on the other substrate in subsequent step to form a liquid crystal panel, it does not adhere, after being melted by heating and solidified, with same strength to the orientation control film formed on the other substrate. Although various resin materials have been examined for spacers, and development of resin material capable of improving adhesion to an orientation film is actively in progress, a novel technology which enables stronger adhesion is still to be realized.

With regard to rubbing of an orientation film, besides the problem of separation of spacers, there is another problem that debris of spacers produced when the spacers are scraped off by the brush for rubbing, may give rise to display defects in the liquid crystal display.

SUMMARY OF THE INVENTION

It is an object of the present invention to resolve above-described problems and to provide a liquid crystal display, and a manufacturing method thereof, wherein spacers are formed from resin alone without mixing beads or the like in the spacer forming material, and substrates can be strongly adhered to each other via the spacers, and high resistance to external pressure, an improvement in display characteristics, and avoidance of fluctuations in drive voltage characteristics can be thereby achieved.

In accordance with a first aspect, the present invention provides a liquid crystal panel comprising a pair of substrates which are disposed so as to be opposed to each other, a plurality of spacers formed from a positive type photosensitive resin so as to join with both of said pair of substrates and to maintain a constant gap between said pair of substrates, and liquid crystal sealed between said pair of substrates.

In the present invention, the spacers for maintaining the constant gap between a pair of substrates are formed from a positive type photosensitive resin. Thus, the spacers can be disposed at desired positions between pixel regions, and the deterioration of display quality due to orientation of liquid crystal along the spacer surface can be thereby avoided.

Also, in the present invention, the spacers are joined with both of a pair of substrates. Therefore, even when an external pressure is applied to the liquid panel, the substrates do not separate from the spacers, and large change in cell gap (substrate gap) can be avoided. The occurrence of interference fringes, fluctuations of color tone, and fluctuations in drive voltage characteristics can be thereby avoided.

The present invention also provides a method of manufacturing a liquid crystal panel comprising the steps of providing a first substrate and a second substrate, forming a photosensitive resin film by coating a positive type photosensitive resin to said first substrate, light exposure/development step of exposing said photosensitive resin film to light and subjecting the film to development process to form spacers, re-exposure step of re-exposing said spacers to light, and liquid crystal sealing step of joining said first substrate with said second substrate via a sealant and said spacers, and then filling and sealing liquid crystal in a space surrounded by said sealant, said first substrate and said second substrate.

In the present invention, spacers are formed using a positive type photosensitive resin. When the spacers are re-exposed to light, the photosensitive resin constituting spacers are decomposed by light so that spacers are softened and its adhesive capability is increased. If the first substrate and the second substrate are superimposed in this state, spacers are joined both with the first substrate and the second substrate. Subsequently, spacers are hardened, for example, by heating.

Thus, in the present invention, spacers are formed using a positive type photosensitive resin, and after re-exposure, the first substrate and the second substrate are superimposed so that the spacers can be joined strongly with the first and the second substrates. With this construction, when external pressure is applied, a large change in cell gap can be avoided, and the occurrence of interference fringes, fluctuation of color tone, and fluctuations of drive voltage characteristics can be prevented.

When a rubbing treatment is performed on an orientation film provided on the first substrate, it is necessary to perform heat treatment of the spacers prior to rubbing treatment to put them in a semi-hardened state. By this heat treatment, the spacers can be prevented from being scraped off during rubbing process, and cell gap can be maintained at a desired value. In this case, when the spacers are re-exposed to light, the photosensitive resin constituting the spacers is decomposed and the adhesive capability can be recovered.

In accordance with a second aspect, the present invention provides a liquid crystal display comprising a pair of substrates, liquid crystal injected between said substrates, a sealant which seals the periphery of said substrates, and a multiplicity of spacers which are disposed between said substrates for maintaining the substrate gap, wherein said spacers are adhered at both ends thereof to said substrates and comprise a plurality of resin layers with different elastic moduli.

In accordance with the present invention, as a multiplicity of spacers adhered to a pair of substrate are disposed and the spacer is formed of a plurality of resin layers with different modulus of elasticity, the liquid crystal display can follow thermal expansion of the liquid crystal or an external force and can maintain a constant gap between the substrates. In particular, when the substrates are subjected to an external force, the gap between the substrates decreases at the moment of application of the external force, and then increases at the next moment. As the spacer of the present invention is adhered to the substrates and is composed of resin layers with different elastic moduli, the spacer exerts a counteracting force on the expanding substrates while the spacer itself is expanding, so that excessive increase of the substrate gap can be prevented. As a multiplicity of spacers are disposed over the entire substrates, the substrate gap can be maintained uniformly, and a fluctuation in display response speed can be thereby prevented and the quality of the display can be improved.

Above-mentioned spacer is composed of a hard resin layer and a soft resin layer, and the soft resin layer which has smaller Young modulus than the hard resin layer may have Young's modulus in the range of $5 \times 10^{-3}$ MPa –1 MPa, and may have a thickness in the range of 5%–95% of the overall thickness of the spacer. With this construction, sufficient flexibility can be ensured for the spacer and the spacer can follow thermal expansion of the liquid crystal or an external force.

Orientation films having been subjected to rubbing treatment are further provided on the opposed surfaces of the above-mentioned pair of substrates, and the heat curing temperature of each resin layer in the spacer is chosen to be lower than the temperature at which the effect of a rubbing treatment of the orientation film is impaired. The above-mentioned sealant is a heat-curable resin, and the heat curing temperature of the sealant is also chosen to be lower than the temperature at which the effect of a rubbing treatment of the orientation film is impaired. By hardening each resin layer of the spacer and the sealant at a temperature at which the effect of the rubbing treatment for orientating the liquid crystal molecules is maintained, the occurrence of orientation defects and the like can be avoided.

The heat curing temperature of each resin layer of above-mentioned spacer is chosen to be at or lower than the heat curing temperature of the sealant. In the superimposition step, each resin layer of the spacer disposed over the entire surface of the substrates is first hardened at a lower temperature and, subsequently, the sealant is hardened at or higher temperature so as to fasten the outer peripheries of the substrates to each other. Thus, the substrates can be fixed using the spacers uniformly at a constant substrate gap over the entire surface of the substrates.

The heat curing temperature of the sealant is in the range of 110° C.–180° C. This permits the sealant to be hardened by application of heat without impairing the effect of the rubbing treatment.

In accordance with the present invention, there is also provided a liquid crystal display comprising a pair of substrates, liquid crystal injected between said substrates, a sealant for sealing the periphery of said substrates, and a multiplicity of spacers disposed between said substrates for maintaining a substrate gap, wherein said spacer is adhered at both ends to said substrates, and has Young's modulus in the range of $5 \times 10^{-3}$ MPa –1 MPa.

Since, in accordance with the present invention, a multiplicity of spacers adhered to a pair of substrates are disposed and the spacer has Young's modulus in the range of $5 \times 10^{-3}$ MPa –1 MPa, the liquid crystal display can follow thermal expansion of the liquid crystal or an external force so as to maintain a constant substrate gap. As a result, fluctuations in the display response speed can be suppressed and the display quality can be improved.

Above-mentioned liquid crystal contains at least one liquid crystal selected from the group consisting of twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting electroclinic effect. Above-mentioned substrate is formed of glass with substrate gap in the range of 0.1 μm –6 μm. By forming the substrate from glass, variation of the substrate gap can be suppressed, and fluctuation of display response speed in the display region of the liquid crystal display can be suppressed, leading to improvement of the quality of display.

In accordance with a third aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein said spacers are formed of a photosensitive resin and each of said substrates is adhered to the spacers which are hardened after superimposition of the substrates.

The liquid crystal display of the present invention can be manufactured by a method of manufacturing a liquid crystal display comprising the steps of forming said spacers on one of the substrates, superimposing this substrate upon the other substrate and then hardening said spacers by application of heat so as to be adhered to the substrate.

In accordance with a fourth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein one of substrates and said spacers are joined using an adhesive.

The liquid crystal display of the present invention can be manufactured by a method of manufacturing a liquid crystal display comprising the steps of forming said spacers on one of the substrates, disposing said adhesive on top of the spacers, superimposing this substrate upon the other substrate and then joining the spacer with the other substrate with the adhesive.

In accordance with a fifth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein said spacers are formed of a photosensitive material that permits both positive type patterning and negative type patterning, and a part of the spacers are adhered to both substrates and rest of the spacers are adhered to only one of the substrates.

The liquid crystal display of the present invention can be manufactured by a method of manufacturing a liquid crystal display comprising the steps of forming a film of a photosensitive material that permits both positive type patterning and negative type patterning, subjecting the film to negative exposure to form a negative type patterning image, then subjecting the film to positive exposure to form a positive type patterning image, developing the film to form hardened spacers from the negative type patterning image and unhardened spacers from the positive type patterning image, respectively, and after superimposing the first substrate on the second substrate, adhering the unhardened spacers to the second substrate by heating.

In accordance with a sixth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein spacers adhered to both substrates are mixed with spacers adhered to only one of the substrates.

The liquid crystal display of the present invention can be manufactured by a method of manufacturing a liquid crystal display comprising the steps of forming both spacers exhibiting adhesive capability to the second substrate and spacers not exhibiting adhesive capability to the second substrate on the first substrate, and after superimposing the first substrate on the second substrate, adhering the spacers exhibiting adhesive capability to the second substrate to the second substrate.

Alternatively, the liquid crystal display of the present invention can be manufactured by a method of manufacturing a liquid crystal display comprising the steps of forming spacers exhibiting adhesive capability to the second substrate on the first substrate, forming spacers not exhibiting adhesive capability to the first substrate on the second substrate, and after superimposing the first substrate on the second substrate, adhering the spacers exhibiting adhesive capability, to the second substrate, to the second substrate.

In accordance with a seventh aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with peripheries of the opposed substrates being sealed, wherein at least a part of spacers are adhered to at least one of the substrates without having the orientation film sandwiched therebetween.

The liquid crystal display of the present invention can be manufactured by a method of manufacturing a liquid crystal display comprising the steps of forming spacers in advance on one of the substrates, combining this substrate with the other substrate which has no orientation film at positions corresponding to the position of the spacers, and adhering the spacers to the other substrate.

In accordance with an eighth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein said spacers have hardened portion and semi-hardened portion at the stage prior to superimposition of said substrates in the plane to be brought into contact with said substrate, and each of said substrates is adhered to the spacers, at least by hardening the semi-hardened portion of the spacers, after superimposition of the substrates.

The liquid crystal display of the present invention can be manufactured by a method of manufacturing a liquid crystal display comprising the steps of forming spacers having a hardened portion and a semi-hardened portion in the plane to be brought into contact with the substrates on one of the substrates, and after superimposing this substrate on the other substrate, adhering the spacers to the substrate by hardening the semi-hardened portion of said spacers.

In accordance with a ninth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein said spacers contain an adhesive component and the spacers are adhered to both substrates with the adhesive component.

The liquid crystal display of the present invention can be manufactured by a method of manufacturing a liquid crystal display comprising the steps of forming spacers containing adhesive component on one of the substrates, and after superimposing this substrate on the other substrate, adhering the spacers to the other substrate with said adhesive component.

In accordance with a tenth aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein at least one of said orientation films is thermoplastic, and said spacers have photo-thermal conversion capability, and the spacers are adhered to the thermoplastic orientation film.

The liquid crystal display of the present invention can be manufactured by a method of manufacturing a liquid crystal display comprising the steps of forming, on said pair of substrates, orientation films of which at least one is thermoplastic, forming spacers having photo-thermal conversion capability on one of the substrates, and after superimposing the substrate having spacers formed thereon on the substrate having a thermoplastic orientation film, irradiating the spacers with light to generate heat in the spacers, and using the generated heat to adhere the spacers to the thermoplastic orientation film of the substrate.

In accordance with an eleventh aspect, the present invention provides a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, wherein said spacers are adhered to one of said pair of substrates via an adhesive containing a photo-thermal heat-generating agent.

The liquid crystal display of the present invention can be manufactured by a method of manufacturing a liquid crystal display comprising the steps of forming said spacers on one of the substrates, attaching said adhesive containing a photo-thermal heat-generating agent on top of the spacers, and after superimposing this substrate on the other substrate, irradiating with light from the side of the other substrate to generate heat from the photo-thermal heat generating agent, and using the generated heat to adhere the spacers to the other substrate with the adhesive.

In accordance with a twelfth aspect, the present invention provides a manufacturing method of a liquid crystal display comprising a pair of substrates of which at least one is transparent, each of which has electrodes and an orientation film formed on one surface thereof and which are opposed to each other such that the surfaces having these components formed thereon face each other, spacers disposed between these opposed substrates, and liquid crystal sealed between the substrates with the peripheries of the opposed substrates being sealed, said method comprising the steps of forming a photosensitive resin layer on one of the substrates which is transparent, exposing the photosensitive resin layer to light from the back surface of the substrate opposite to the surface having the photosensitive resin layer formed thereon (back exposure) to thereby form spacers that are hardened least at the tip portion opposite to the side adhered to the substrate and, after superimposing this substrate on the other substrate, hardening the least hardened tip portion of said spacers and adhering same to the other substrate.

BRIEF DESCRIPTION OF THE DRAWINGS

The above and other objects and advantages of the invention will be well understood and appreciated by a person with ordinary skill in the art from consideration of the following description made by referring to the attached drawings, wherein:

FIG. 10 is a view useful for explaining use of a bell jar in a vacuum injection method;

DETAILED DESCRIPTION OF THE INVENTION

Figure 1:
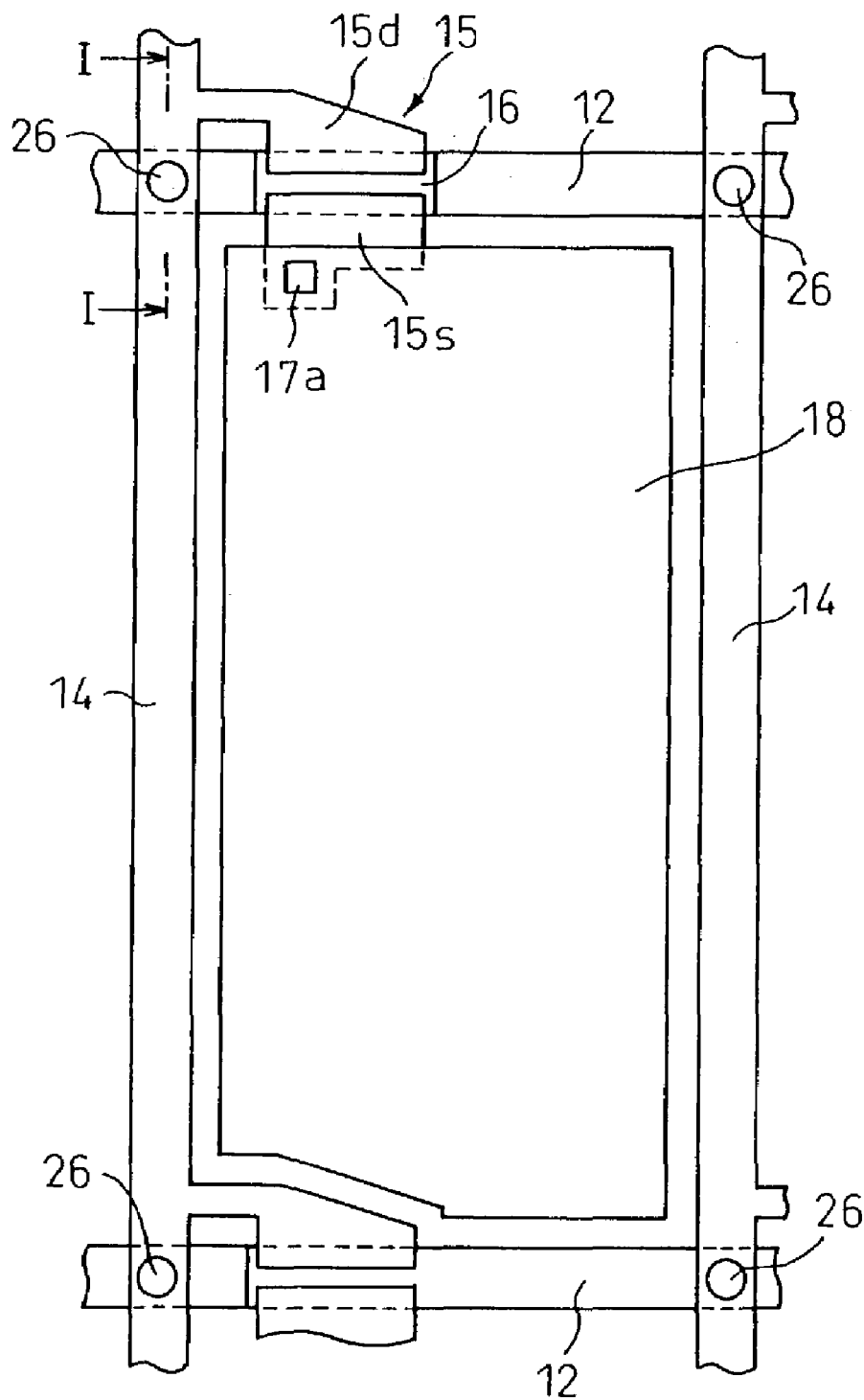
FIG. 1 is a plan view showing one pixel of a liquid crystal panel according to an embodiment of the present invention.
Figure 2:
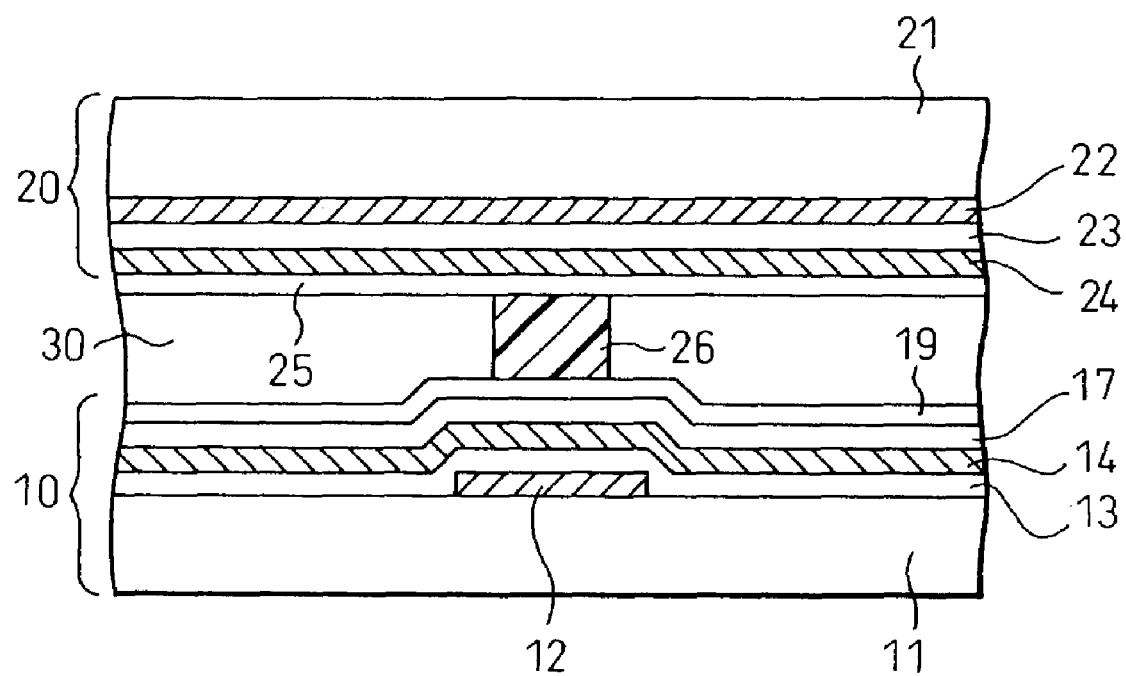
FIG. 2 is a sectional view taken along the line I-I of FIG. 1.

FIG. 1 is a plan view showing one pixel of a liquid crystal panel according to an embodiment of the present invention, and FIG. 2 is a sectional view taken along the line I—I of FIG. 1. The present embodiment describes an example of the present invention applied to a transmission type liquid crystal display panel.

The liquid crystal display panel according to the present embodiment comprises, as shown in FIG. 2, a TFT substrate 10 and an opposed substrate 20 which are disposed as opposed to each other and a liquid crystal 30 injected and sealed between the TFT substrate 10 and the opposed substrate 20. A polarizer (not shown) is disposed below the TFT substrate 10 and above the opposed substrate 20, respectively. A light source (back light) (not shown) is also disposed below the TFT substrate 10.

The TFT substrate 10 comprises, as shown in FIGS. 1 and 2, a glass substrate 11, gate bus lines 12 formed on the glass substrate 11, data bus lines 14, TFTs 15, and pixel electrodes 18. The gate bus lines 12 extend in lateral direction, and the data bus lines 14 extend in longitudinal direction. Each region defined by the gate bus lines 12 and data bus lines 14 constitutes a pixel region. One pixel electrode 18 and one TFT 15 are formed for each pixel region, respectively.

In the present embodiment, as shown in FIG. 1, a portion of the gate bus line 12 forms a gate electrode for the TFT 15, and a source electrode 15*s* and a drain electrode 15*d* for the TFT 15 are disposed on both sides in the width direction of a channel protecting film 16. The source electrode 15*s* is electrically connected to the pixel electrode 18 via a contact hole 17*a* formed in the insulating film 17, and the drain electrode 15*d* is electrically connected to the data bus line 14. On the pixel electrode 18, an orientation film 19 formed of polyimide or the like is formed. Rubbing treatment has been performed on the surface of the orientation film 19 in order to determine an orientation direction of the liquid crystal molecules when no electric field is being applied.

The opposed electrode 20 comprises a glass substrate 21, a black matrix 22 formed on one surface (underside in FIG. 2) of the glass plate 21, an insulating film 23 and a common electrode 24. The black matrix 22 is formed so as to cover regions between the pixels and the TFT forming regions. The insulating film 23 is formed on the underside of the glass substrate 21 so as to cover the black matrix 22. The common electrode 24 is formed under the insulating film 23, and the orientation film 25, of polyimide or the like, is formed under this common electrode 24. A rubbing treatment has been also performed on the surface of the orientation film 25 in order to determine an orientation direction of the liquid crystal molecules when no electric field is being applied.

The TFT substrate 10 and the opposed substrate 20 are disposed such that the surfaces having the orientation film 19, 25 formed thereon are opposed to face each other, and with liquid crystal 30 injected and sealed therebetween, constitutes a liquid crystal display panel.

The gap between the TFT substrate 10 and the opposed substrate 20 is kept constant by pillar-shaped spacers 26 provided on the intersections of the gate bus line 12 and the data bus line 13. According to a first aspect of the present invention, the pillar-shaped spacers 26 are formed of a positive type photoresist, and are joined to both the TFT substrate 10 and the opposed substrate 20.

In the liquid crystal display panel constructed in this manner, when an image is displayed, a scanning signal is supplied from a drive circuit (not shown) successively to the gate bus lines 12 arranged in longitudinal direction while display signal is supplied to the data bus lines 14. The TFT 15 connected to the gate bus line 12 to which the scanning signal is supplied is turned on, and the display signal is written via the TFT 15 to the pixel electrode 18. Consequently, an electric field is generated in accordance with the display signal between the pixel electrode 18 and the common electrode 24 so as to change the orientation of the liquid crystal molecules and, as a result, the light intensity transmitted through the pixel is modified. By controlling the intensity of light transmitted through each pixel, a desired image can be displayed on the liquid crystal panel.

A manufacturing method of the liquid crystal panel will be described below.

First, the TFT substrate 10 and the opposed substrate 20 are fabricated, respectively.

Fabrication method of the TFT substrate 10 will be briefly described. A first metal film is formed on a glass substrate 11 using PVD (Physical Vapor Deposition) method, and patterning is performed on the first metal film using a photolithographic method to form the gate bus line 12. Thereafter, a gate insulating film 13 is formed on the whole upper surface of the glass substrate 11, and a first silicon film to form operation layer of the TFT 15 and SiN film to form a channel insulating film 16 are formed on top of it. Subsequently, a photolithographic method is used for patterning of the SiN film to form the channel protecting film 16 in a predetermined region above the gate bus line 12.

Then, a second silicon film having high concentration of impurities introduced to form an ohmic contact layer is formed on the whole upper surface of the glass substrate 11, followed by formation of a second metal film on top of the second silicon film. A photolithographic method is used for patterning of the second metal film, the second silicon film and the first silicon film to form the definite shape of the silicon film for operation layer of the TFT 15, and to form the data bus line 14, the source electrode 15s and the drain electrode 15d.

Next, an insulating film 17 is formed on the whole upper surface of the glass substrate, and a contact hole 17a is formed at a predetermined position in this insulating film 17. Then, a film of transparent conductor such as ITO (Indium Tin Oxide) is formed on the whole upper surface of the glass substrate 11. By patterning this transparent conductor film, the pixel electrode 18 is formed which is electrically connected to the source electrode 15s of TFT 15 via the contact hole 17a. Then an orientation film 19 of polyimide is formed on the whole upper surface of the glass substrate 11. The TFT substrate 10 is thus completed.

Next, a fabrication method of the opposed substrate 20 will be briefly described. First, a metal film of Cr or the like is formed on a glass substrate 21. A black matrix 22 is formed by patterning of the metal film. Then, an insulating film 23 is formed on the glass substrate 21. When a color liquid crystal display panel is to be manufactured, the insulating film 23 is formed in three colors of red (R), green (G), and blue (B), and an insulating film 23 of one of a red, a green and a blue color is arranged for each pixel.

Then, a common electrode 24 of a transparent conductor such as ITO is formed on the insulating film 23. Thereafter, an orientation film 25 of polyimide is formed on the common electrode 24, and the opposed substrate 20 is thus completed.

Next, pillar-shaped spacers 26 are formed on one of the TFT substrate 10 and the opposed substrate 20. In the present embodiment, the spacers 26 are formed on the opposed substrate 20 as follows.

Figure 3A:
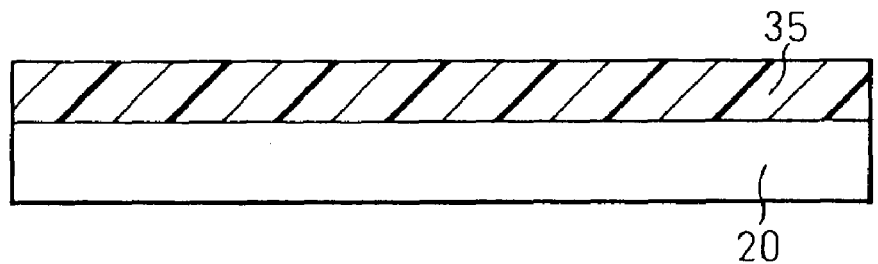
FIGS. 3A–3C are views useful for explaining a manufacturing method of the liquid crystal panel according to an embodiment of the present invention.

As shown in FIG. 3A, a positive type photoresist is applied on the opposed substrate 20, using a spin coat method, to a thickness of about 2 μm to form a resist film 35, and the resist film 35 is prebaked at 100° C. for 1 minute.

Figure 3B:
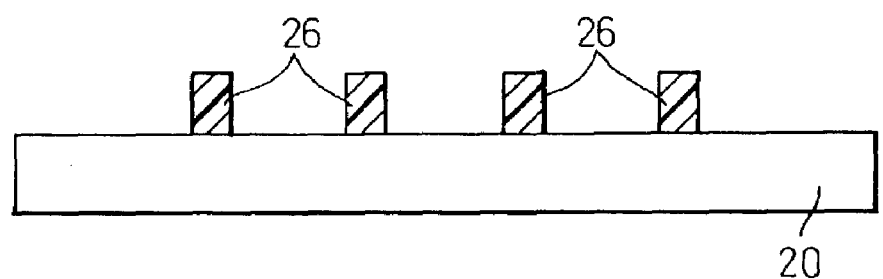

Then, the resist film 35 is exposed to UV (ultraviolet) light through an exposure mask provided with a predetermined pattern, and is subjected to development processing to form pillar-shaped spacers 26 as shown in FIG. 3B. Thereafter, the surface of the opposed substrate 20 is washed with pure water, and dried.

The spacer 26 may be, for example, in the shape of cylinder 10 μm in diameter. The spacers 26 are formed at positions corresponding to the intersection of the gate bus lines 12 and the data bus lines 14. The pitch both in the lateral direction and in the longitudinal direction may be, for example, 100 μm.

Next, heat treatment is performed at 120° C. for 10 minutes to obtain a semi-hardened state of the resist constituting the spacers. Then, a rubbing treatment is performed on the orientation film 25. A rubbing treatment is performed, in general, by rubbing the surface of the orientation film in one direction with a roller wound with a cloth such as nylon.

If the heat treatment has not been performed on the resist constituting the spacer 26 prior to the rubbing process, the hardness of the resist is low so that, during the rubbing treatment, the spacers 26 would be scraped off and desired cell gap could not be maintained. In the present embodiment, however, the resist constituting the spacer 26 is in semi-hardened state after the heat treatment, so that the spacer 26 is prevented from being scraped off during the rubbing process.

Then, the spacers 26 are again exposed to light to photodecompose the resist constituting the spacer 26. This softens the spacers 26 and its adhesive capability is improved.

Figure 4:
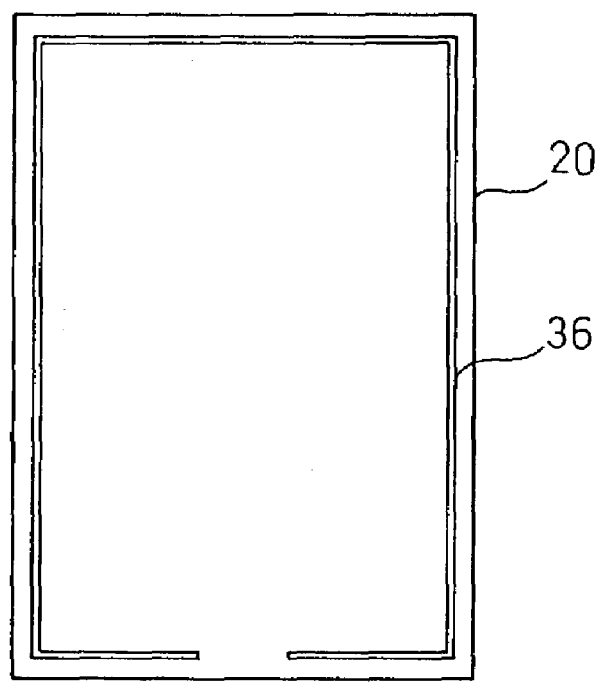
FIG. 4 is a plan view showing the sealant coated on the substrate.

Next, as shown in FIG. 4, a sealant 36 of heat-curable resin is applied on the opposed substrate 20 so as to surround the display region. The sealant 36 is not applied to a portion where a liquid crystal injection port is to be formed for injecting liquid crystal between the substrates.

Figure 3C:
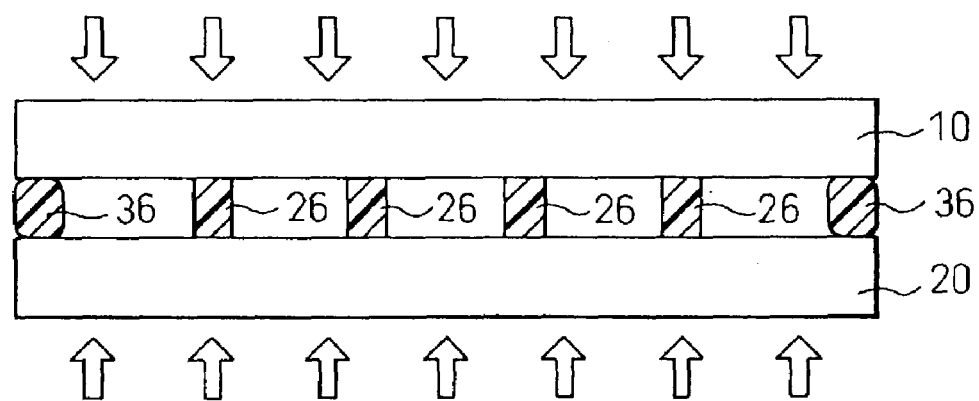

Then, as shown in FIG. 3C, the TFT substrate 10 and the opposed substrate 20 are aligned and superimposed, and, while pressure is applied in a heat treatment apparatus, heat treatment is performed at the heat curing temperature of the sealant 36 to harden the sealant 36. Thus, the spacers 26 are transiently softened and then hardened to be firmly joined to the TFT substrate 10 and the opposed substrate 20. It is necessary that the sealant be hardened at a temperature at which the effect of rubbing treatment performed on the orientation films 19, 25 is not lost. The structure formed by sticking the TFT substrate 10 to the opposed substrate 20 (a panel prior to injection and sealing of liquid crystal) will be referred to as an empty panel.

Then, liquid crystal 30 is injected between the TFT substrate 10 and the opposed substrate 20 using a vacuum injection method. Specifically, a container containing the liquid crystal and the empty panel are placed in a vacuum chamber, and the vacuum chamber is evacuated to vacuum. Then, the liquid crystal injection port of the empty panel is immersed in the liquid crystal and the vacuum chamber is restored to an atmospheric pressure. The liquid crystal is injected into the empty panel by the pressure difference between the internal space of the empty chamber and the atmospheric pressure, and the liquid crystal is filled in the internal space of the empty panel. Then, the panel filled with the liquid crystal is sandwiched between two flat plates to squeeze out the extra liquid crystal, and the liquid crystal injection port is sealed with sealing resin. Thus, the liquid crystal panel according to the present embodiment is completed.

The positive type photoresist film for forming the spacers 26 in this embodiment is preferably formed from polysilane resist. Polysilane resist softens by exposure to light and silanol is formed. Silanol exhibits strong adhesive capability to the orientation films 19, 25 formed of polyimide so that the spacers 26 are firmly joined to the TFT substrate 10 and the opposed substrate 20.

An aryl group is preferably introduced in the polysilane resist. When an aryl group is introduced in the polysilane resist, development performance using an alkali aqueous solution is improved so that exposure time is reduced and an improvement in the resolution can be expected. Although it is not clear why the aryl group can improve the development performance of the polysilane resist, the reason may be as follows. When polysilane resist is exposed to light, silanols are formed in the resist. Silanol exhibits solubility in alkali aqueous solution, and when aryl group is introduced in the side chain of the polysilane, compared to the case where alkyl group is introduced in the side chain, the produced silanols are difficult to react with each other, so that the resist remains stable without cross-linking. Thus, it exhibits strong solubility in alkali aqueous solution, leading to the improvement in development performance.

In the first aspect of the present invention, the spacers 26 may be formed from positive type photoresist having a property of being softened by exposure to light, and the material of the spacer 26 is not restricted to polysilane resist by the present embodiment.

In the present embodiment, a rubbing treatment is performed after the spacers 26 have been converted to a semi-hardened state, so that the spacers 26 are hardly scraped off during the rubbing treatment. Therefore, the cell gap of the liquid crystal panel can be maintained at a desired value.

Figure 5:
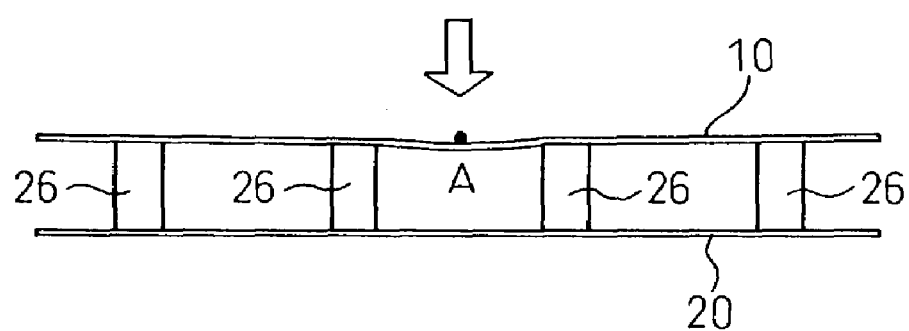
FIG. 5 is a schematic view showing a change of cell gap when an external pressure is applied to the liquid crystal panel according to an embodiment of the present invention.

In the present embodiment, since the spacers 26 are adhered both to the TFT substrate 10 and to the opposed substrate 20, resistance to an external pressure (stress resistance) is high. For example, as shown in FIG. 5, when an external pressure is applied to a portion A between spacers, the substrate 10 does not separate from the spacers 26, and large variation of cell gap can be avoided. Therefore, occurrence of interference fringes, fluctuation of color tone, or fluctuations of drive voltage characteristics can be avoided.

The present invention can be applied to a liquid crystal panel using twisted nematic (TN) type liquid crystal, super-twisted nematic (STN) type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect.

Although, in the above-described embodiment, the present invention is described in the case where the present invention is applied to a transmission type liquid crystal panel, it is to be understood that the scope of application of the present invention is not limited to transmission type liquid crystal panel. The present invention can be applied, besides transmission type liquid crystal panel, to a reflection type liquid crystal panel, or to a spatial light modulation device.

Figure 8:
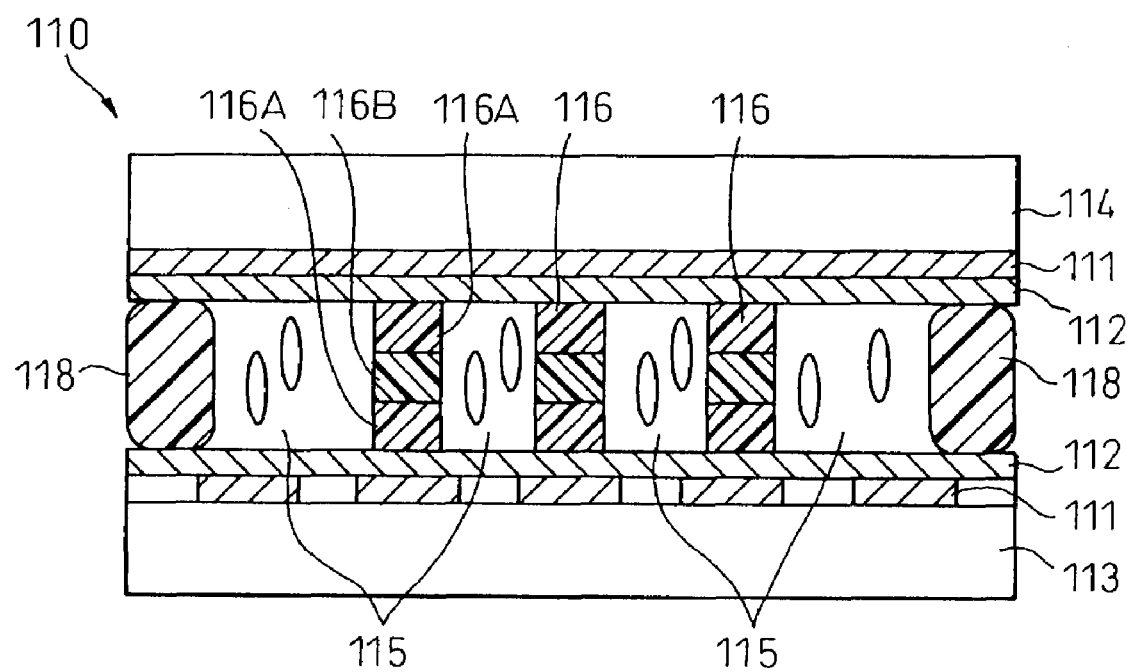
FIG. 8 is a view showing the schematic construction of a liquid crystal display according to another embodiment of the present invention.

Next, an embodiment of a liquid crystal display according to a second aspect of the present invention will be described with reference to FIG. 8 which is more schematic than FIG. 1. FIG. 8 shows the basic construction of a liquid crystal display common to all aspects of the present invention except material, form, and structure etc. of the spacers 116.

A liquid crystal display 110 of the present embodiment comprises two substrates 113, 114 having transparent electrodes 111 and orientation films 112 and the like formed on the inner surface, liquid crystal 115 sandwiched between the substrates 113, 114, a multiplicity of spacers 116, and a sealant 118 for sealing the liquid crystal.

As the substrates 113, 114, glass substrates of, for example, non-alkali glass or silica glass, of 0.5 mm–1.25 mm in thickness may be used. A transparent electrode 111 is formed on the upper surface of the lower substrate 113. As the transparent electrodes 111, ITO (Indium Tin oxide), for example, is used, and the electrodes 111 are formed in stripes in one direction. An orientation film 112 formed on the transparent electrode 111 is constructed, for example, from polyimide of 60 nm–200 nm in thickness, and its surface is subjected to a rubbing treatment. On the other hand, on the upper substrate 114, a color filter (not shown) is formed on the lower surface of the glass substrate. The color filter is formed of three color filters of R, G, B, and a black matrix. On the color filter, a transparent electrode 111 is formed with stripes in perpendicular direction relative to the transparent electrode 111 on the lower substrate. An orientation film 112 is formed on it.

Twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal or smectic A phase liquid crystal exhibiting electroclinic effect, may be used as the liquid crystal 115. Ferroelectric liquid crystal having high display response speed, in particular, can be used advantageously in the liquid crystal display of the present embodiment.

The spacer 116 is, for example, formed in the shape of cylinder of 1 μm–20 μm in diameter and 0.1 μm–6 μm in height. The shape is not restricted to cylinder, and may be a prism, a pyramid, a cone. The spacer 116 is composed of resin layers using photoresists of different modulus of elasticity. As shown in FIG. 8, 3 layers (116A/116B/116A), as shown in FIG. 8, are composed of a layer (hereinafter referred to as "hard resin layer") having high modulus of elasticity, for example Young's modulus, after hardening, and a layer (hereinafter referred to as "soft resin layer") having low Young's modulus after hardening. The spacer 116 shown in FIG. 8 is composed, specifically, of a hard resin layer 116A, a soft resin layer 116B and a hard resin layer 116A in this order from the bottom. Spacers are formed, in number per substrate area, at a rate of 20 pcs/mm$^2$–200 pcs/mm$^2$.

The hard resin layer 116A can be formed using a positive type photoresist, such as polyimide resin, phenol resin, novolac resin, and acrylic resin. On the other hand, as the photoresist for the soft resin layer 116B, polysilane, polycarbosilane, or polysiloxane resins, for example, may be used. Polysiloxane resist in which Si and oxygen is bonded is preferable in that the main chain is a single bond and is three-dimensional, and hence the resist is flexible and has a low Young's modulus. A solder resist may be used as the photoresist for the soft resin layer 116B. The solder resist contains, for example, partially acrylated epoxy resin, epoxy resin having a linear polymer and an acrylic oligomer combined, photodepolymerization resin having various modified polymer, or photodimerization resin of resins having chalcone group epoxy group in common, individually or in combination with heat curable resin such as epoxy resin, together with a photodepolymerization initiator, hardening agent, or the like, and is UV-curable and heat curable. By using a positive type resist for these resists, a portion exposed to light depolymerizes or changes to a structure soluble in the developing solution. An unexposed portion is left after development using a basic solution, and the unexposed portion forms spacers 116 and is hardened by application of heat as described later.

The photoresists for the hard resin layer 116A and the soft resin layer 116B are chosen such that the heat curing temperature is not higher than the temperature at which the effect of rubbing treatment is impaired. If the effect of rubbing treatment is impaired, a disturbance is produced in the orientation of liquid crystal, and it can be judged when the liquid crystal display is assembled and operated. The heat curing temperature of the photoresist is preferably in the range of 110° C.–180° C., and more preferably in the range of 110° C.–150° C. The upper bound of heat curing temperature is chosen to be 180° C. because it is the temperature at which the effect of rubbing treatment is not impaired in view of temperature distribution during the sticking process to be described later. Lower bound is chosen to be 110° C. because curing polymerization reaction needs to be completed in a predetermined duration of heating although a lower bound as low as possible is preferred. The heat curing temperature can be quantified, for example, by FT-IR analysis.

The soft resin layer 116B has Young's modulus lower than that of the hard resin layer 116A. Young's modulus of the soft resin layer 116B after hardening is preferably in the range of $5\times10^{-3}$ MPa –1 MPa at 25° C. –120° C. If Young's modulus is smaller than $5\times10^{-3}$ MPa, this may cause a change in the substrate gap, and if Young's modulus is larger than 1 MPa, the spacers cannot follow the volumetric change of the liquid crystal. By choosing the soft resin layer 116B with such characteristics, the spacers 116 can follow the change of substrate gap caused by the volumetric change of the liquid crystal due to thermal expansion or shrinkage of the liquid crystal, and the substrate gap can be maintained in the desired range while preventing breakage of spacers 116 or separation of spacers 116 from the substrate 113, 114. The overall Young's modulus of the spacer 116 may vary according to the ratio of the thickness of soft resin layer 116B and hard resin layer 116A. However, since the Young's modulus of hard resin layer 116A is 5–20 times that of soft resin layer 116B, the overall Young's modulus of the spacer 116 is approximately the same as Young's modulus of soft resin layer 116B.

Thickness of soft resin layer is set to be 5%–95% of the overall thickness of the spacer 116. If it is more than 95%, the thickness of hard resin layer 116A with higher adhesive capability becomes too small so that adhesion to the substrate 113, 114 or to the orientation film 112 may become inadequate, and if it is less than 5%, sufficient flexibility may not be obtained.

Thermal expansion coefficient of the spacer 116 is preferably approximately the same as the thermal expansion coefficient of the liquid crystal as described above in view of preventing the breakage of the spacer 116 or separation of the spacer 116 from the substrate 113, 114.

The sealant 118 is applied to the periphery of the substrates, and is composed of, for example, a heat curable resin or a photocurable resin 2 μm–10 μm in thickness. The sealant is applied to the periphery of the substrates in width of about 1 mm so as to prevent deviation of substrate gap and in the substrate plane as well as to prevent leakage of the liquid crystal. A liquid crystal injection port (not shown) is provided in a portion of the sealant to fill the liquid crystal.

Next, the manufacturing steps of the liquid crystal display of the present embodiment will be described with reference to FIGS. 9A–9E.

Figure 9A:
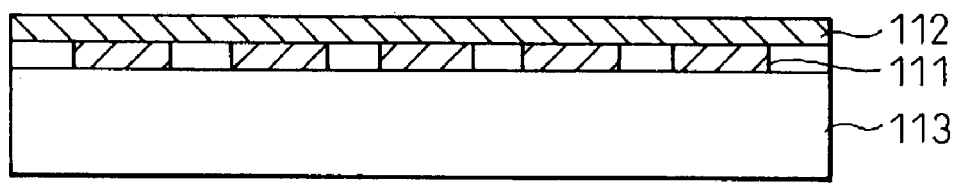
FIGS. 9A–9E are views useful for explaining a manufacturing method of the liquid crystal display shown in FIG. 8.

In the step shown in FIG. 9A, transparent electrodes 111 are formed on the substrate 113, 114. More specifically, an ITO layer of 50 nm in thickness, for example, is formed on a substrate such as a glass substrate using sputtering method, ion plating method, electron beam method, or the like. Then, patterning is performed using a photoresist to form transparent electrodes 111 in the shape of stripes. Insulating films such as silicon oxide films are formed between the neighboring electrodes.

In the step as shown in FIG. 9A, an orientation film 112 is further formed on the transparent electrodes 111, and a rubbing treatment is performed. More specifically, polyimide material is applied using spin coating method, printing method or the like, to a thickness of 0.1 μm or less, and is heat-cured at 180° C. to 200° C. Then, the surface of the orientation film is rubbed using a roller formed of nylon or the like in the direction of orientation of the liquid crystal molecules. In the same manner, transparent electrodes 111 and an orientation film 112 are formed on the other substrate, and a rubbing treatment is performed.

Figure 9B:
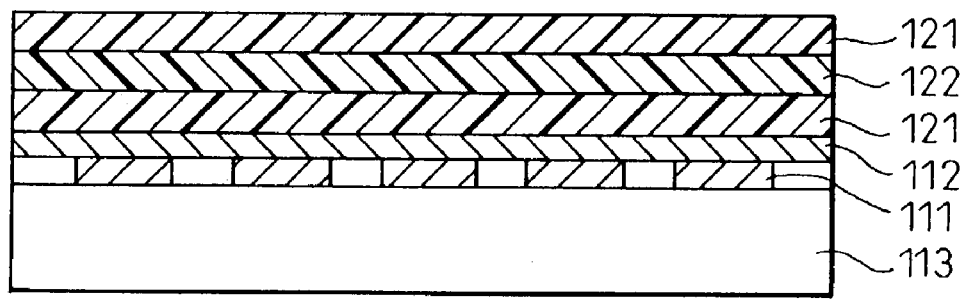

In the step shown in FIG. 9B, three layers of positive type photoresist films 121, 122, 121 are applied in superposition on the structure as shown in FIG. 9A, and etching is performed to form spacers 116 (FIG. 8). More specifically, a resist film 121 for a hard resin layer 116A is first applied using spin method, a slit and spin method, or the like, to a thickness in the range of 0.1 μm–6 μm (preferably 0.1 μm–3 μm). Then, the substrate is prebaked in a clean oven at about 100° C. for 1–3 minutes to evaporate the solvent remaining in the resist. Then, a resist film 122 for a soft resin layer 116B is applied in the same manner in thickness in the range of 0.1 μm–6 μm (preferably 0.1 μm–3 μm). Then, the substrate is similarly prebaked, and a resist film 121 for a hard resin layer 116A is applied in the same thickness. These prebakings accelerate the adherence of the resist film 121 to the orientation film 112 formed on the substrate 113, and stronger adhesion is thus achieved.

Figure 9C:
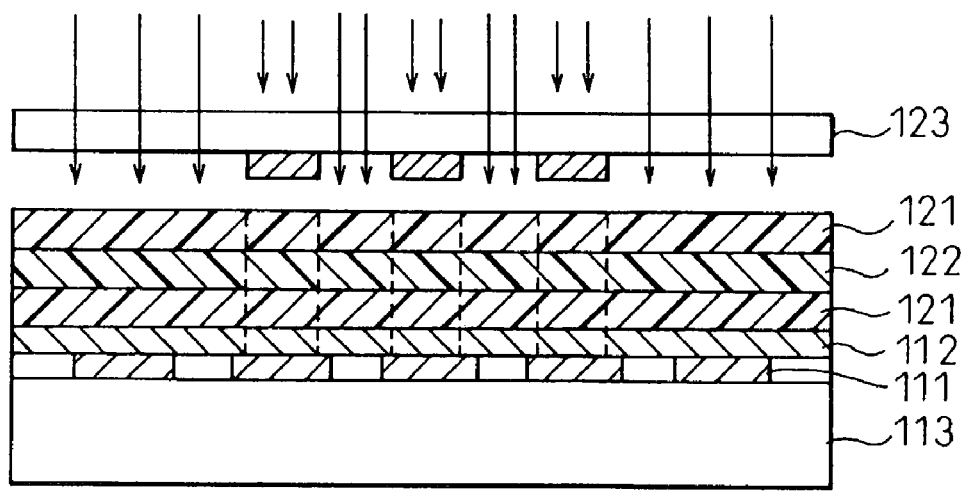

Next, in the step shown in FIG. 9C, a photolithographic method is used in patterning of the resist to form the spacers 116. More specifically, in order to form spacers 116 in the portion corresponding to the black matrix of a color filter, a mask 123 is prepared so as to mask the portion for spacers 116 from light. For example, in a color filter of pitch of 80 μm, the width of the black matrix is about 13 μm so that the diameter of a spacer 116 is preferably set to be 10 μm or less taking into account a possible deviation in alignment of two substrates. Thus, jutting out, by the spacer 116, into pixel area can be avoided and good display quality can be maintained. Then, using a stepper and this mask 123, the substrate is exposed to UV light or the like.

Figure 9D:
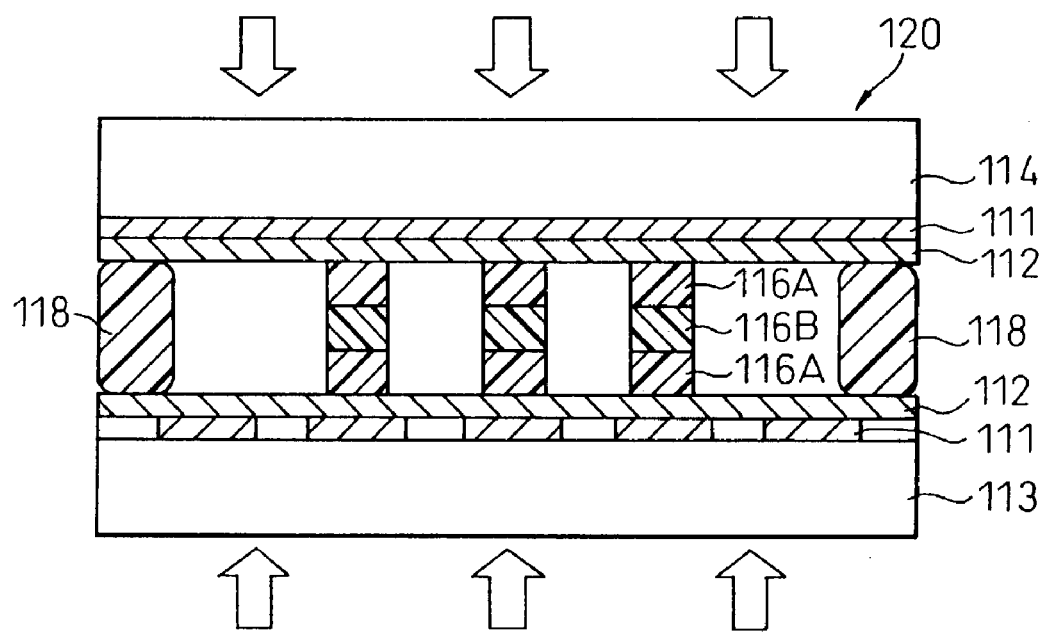

Next, in the step shown in FIG. 9D, the substrate after the exposure is developed in a basic aqueous solution. The soluble resist in the exposed portion is removed, and the surface of the substrate is washed and rinsed with pure water, and dried. Spacers 116 are thus formed. As the spacers 116 are formed from a photoresist, the height of the spacers is uniform throughout the substrates, and the respective thicknesses of three resist layers are also uniform. Therefore, the substrate gap can be advantageously maintained uniform over the whole display region. When the photoresist is composed of 3 or more layers, as light intensity is reduced in the lower layer more distant from the light source, a resist with high sensitivity is preferably used. For example, in the present embodiment, the photoresist for the soft resin layer 122 preferably has a high photosensitivity.

In the step shown in FIG. 9D, a sealant 118 is further applied, and after the other glass substrate 114 is superimposed, two substrates 113, 114 are adhered and fixed to each other by application of pressure and heat. More specifically, on the periphery of the surface on which the spacers 116 are formed, a sealant 118 of heat curable resin is applied in width of about 1 mm using printing method or the like. The sealant 118 is not restricted to heat curable resin, and a photocurable resin such as UV curable resin may be used. A portion having no sealant 118 applied is provided as a liquid crystal injection port.

Then, the substrates are superimposed after aligning the transparent electrodes to each other and spacers 116 to the color filter using a sticking apparatus, and then fixed to a jig. Pressure is applied uniformly from both sides of the substrates so as to adhere one end of the spacer 116 to the substrate, and heat is applied for heat curing of the sealant 118.

Next, the superimposed substrates are heated and adhered to each other in a clean oven at about 150° C. for 1 hour. More specifically, the spacers 116 are softened first and are adhered to the orientation films 112 on the substrates 113, 114 by curing polymerization or the like. The jig is used to apply uniform pressure to the entire substrates 113, 114 so that substrate gap is maintained constant over the whole surface of the substrates supported and fixed by the spacers 116. When the sealant 118 is a heat curable resin, the sealant 118 is heat-cured after the spacers 116 are adhered. This is because the curing speed of the sealant 118 is set slower than that of the spacers 116. As the sealant 118 is thus heat-cured after the spacers 116 are adhered to the substrate, excessive residual stress is not produced in the substrates. The heating temperature is preferably 180° C. or less (more preferably 110° C.–150° C.), since, if the heating temperature is too high, the effect of rubbing treatment is impaired. The heating temperature may be set in two steps such that each resin layer can be hardened at a lower temperature and the sealant can be hardened at a higher temperature. The substrates 113, 114, stuck together with spacers 116 and the sealant 118, form a liquid crystal panel 120.

Figure 9E:
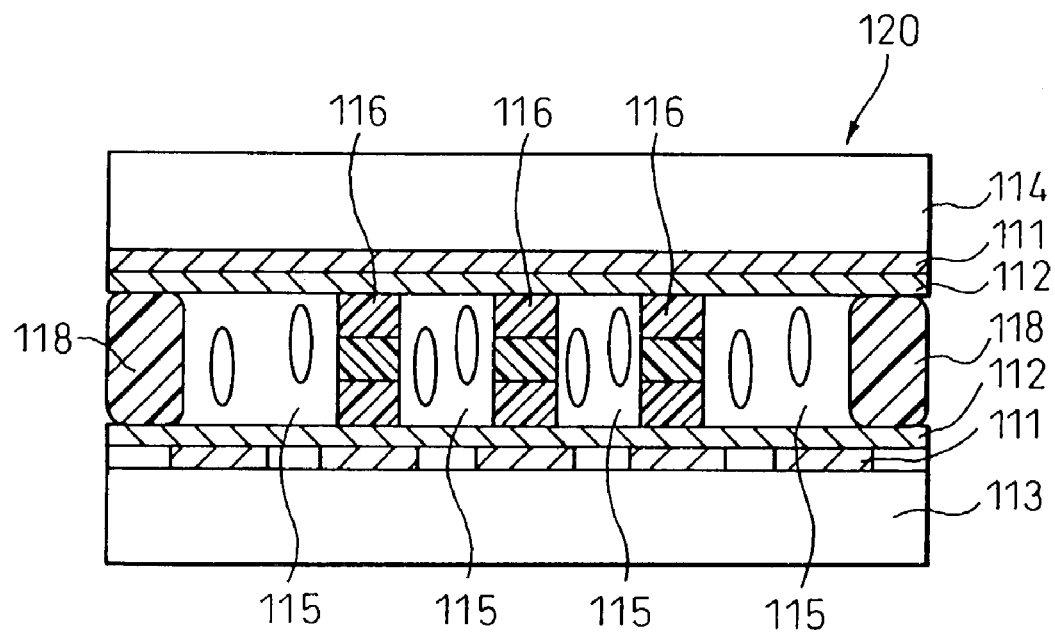

In the step shown in FIG. 9E, liquid crystal is injected into the empty panel 120 by a vacuum injection method using a bell jar as shown in FIG. 10. FIG. 10 shows the schematic construction of the bell jar. Referring to FIG. 10, the bell jar 130 is composed of a vacuum bath 131 capable of being evacuated in the inside, a liquid crystal reservoir 132 for supplying liquid crystal disposed in the vacuum bath, a conveyance mechanism 133 for conveying the empty panel 120, an air inlet and evacuation ports 135, 136, and the like. First, the empty panel 120 is placed in the vacuum bath 131, and the vacuum bath is evacuated using a vacuum pump (not shown) from the evacuation port 136 to reduced pressure, and the air inside the empty panel 120 to which liquid crystal 115 is to be injected is also evacuated. Then, the liquid crystal injection port 119 is immersed in the liquid crystal 115 in the liquid crystal reservoir 132, and then nitrogen, air or the like is introduced into the vacuum bath 131 with controlled flow rate to increase the pressure gradually so as to inject the liquid crystal 115 into the empty panel 120 by the pressure difference between the empty panel 120 and the vacuum bath 131.

Finally, the liquid crystal injection port 119 is sealed. The liquid crystal display of the present embodiment is formed as described above.

In place of the vacuum injection method as described in the step 9E, a dropping method may be used. When dropping method is used, after application of sealant 118 as described in FIG. 9D, drops of the liquid crystal are supplied using a dispenser and disposed on the substrate so that the liquid crystal does not stick to the spacers 116. Adherence of the spacer 116 can be thereby ensured.

According to the present embodiment, as described above, the two substrates of the liquid crystal display are adhered and held by spacers formed in a three layer structure of a hard resin layer, a soft resin layer and a hard resin layer in which Young's modulus of the soft resin layer is chosen to be lower than that of the hard resin layer, so that spacers can follow change of substrate gap due to thermal expansion of the liquid crystal or rapid change of substrate gap due to an external force, and can exert reaction force to the substrate so as to suppress change of the substrate gap. Therefore, the substrate gap can be maintained constant and uniform and, as a result, fluctuation of display response speed can be suppressed and quality of display can be improved.

Figure 11:
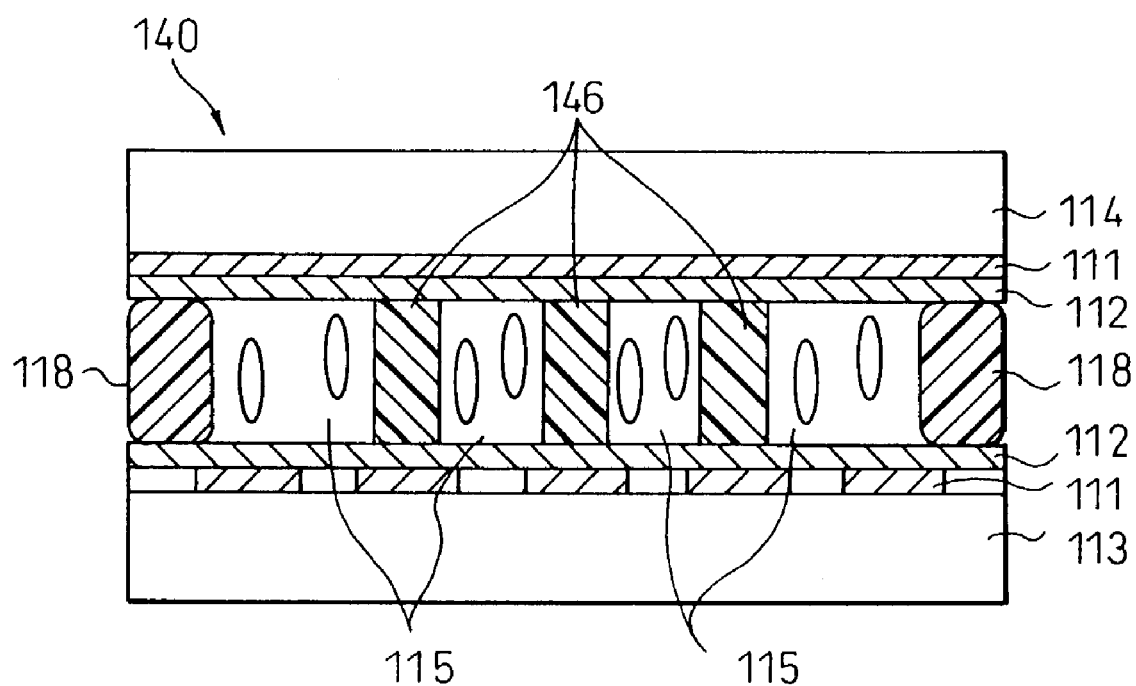
FIG. 11 is a view showing the schematic construction of a liquid crystal display according to a variant of the another embodiment of the present invention.

FIG. 11 is a view showing a liquid crystal display according to a variant of the present embodiment. In the Figure, parts corresponding to the parts described above are denoted by same reference numerals, and an explanation thereof is omitted.

Referring to FIG. 11, the liquid crystal display 140 according to this variant is constructed in the same manner as the embodiment described above, except that the spacers 146 are formed of one layer of soft resin layer. The soft resin layer can be formed using the resin as described above, and is preferably a silicone resist in view of adherence to the orientation film 111 or to the substrate 113, 114. Young's modulus of the soft resin layer after hardening under the heating condition of the substrate stuck as described above, is preferably in the range of $5 \times 10^{-3}$ MPa –1 MPa at temperature of 25° C.–120° C.

According to the present variant, as the spacers are formed from one layer of soft resin, the number of steps for the resist forming process can be decreased.

A liquid crystal display according to a third aspect of the present invention comprises a pair of substrates of which at least one is transparent, and liquid crystal is sealed between the substrates. Electrodes are formed on opposed surfaces of both substrates and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

In the liquid crystal display, spacers formed of photosensitive resin are disposed between the substrates. After the substrates are superimposed on each other, the photosensitive resin of the spacers hardens by heating and exhibits adhesive capability to both substrates, so that the two substrates are bonded firmly via the spacers, and the gap between the substrates is held uniform and constant.

The photosensitive resin used in the liquid crystal display permits patterning to be performed using a photolithographic method, and thus spacers can be easily formed in accordance with a predetermined pattern. Therefore, the spacers can be selectively disposed at positions effective for maintaining a constant gap between substrates excepting pixel region of the liquid crystal display. Separation of the opposing substrates can be easily controlled by adjusting the film thickness of the photosensitive resin layer prior to patterning.

As the photosensitive resin for forming the spacers of the liquid crystal display, various positive type and negative type photosensitive resins can be used. For example, at least one resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials. When a positive type photosensitive resin is used, the portion exposed to light is decomposed and removed by development processing. On the other hand, when a negative type photosensitive resin is used, the portion exposed to light is solidified by induced cross-linking reaction or polymerization reaction, so that an unexposed portion is selectively removed by development processing.

The opposing substrates with liquid crystal sealed therebetween are sealed at the periphery to prevent leakage of the liquid crystal as described above. Usually, a resin material is used for sealing, and serves as sealant, for example, by hardening upon application of heat. The photosensitive resin for forming spacers may be chosen to be heat-curable, and to have a curing temperature at or below the curing temperature of the periphery-sealing resin, so that bonding of substrates to each other by hardening of the photosensitive resin for spacers and sealing of the periphery of the liquid crystal display can be carried out as one step.

On a pair of substrates used in the liquid crystal display, transparent electrodes necessary for display operation of the liquid crystal display are provided as described above. An orientation film formed of resin is present on top of it, and the surface of the orientation film is subjected to a rubbing treatment for orientating liquid crystal molecules in a predetermined direction. When substrates are heated to harden the spacers after the substrates are superimposed to each other, it is important that heating is performed at a temperature which does not impair the effect of rubbing of the orientation film. The curing temperature of the spacers is preferably not higher than the curing temperature of the periphery sealing resin of the liquid crystal display as described above. As the temperature of anneal processing for reorientation of the liquid crystal after the liquid crystal is sealed between the substrates is generally about 110° C., the curing temperature of the heat curable resin for spacers and the heat curable resin for sealing periphery of the substrates is desired to be 110° C. or higher. If the curing temperature is higher than 150° C., the effect of the rubbing treatment on the orientation film may be lost. Therefore, heating to temperature above 150° C. should be avoided. Thus, the curing temperature of the heat curable resin for spacers and for sealing the periphery of the substrates is preferably in the range of 110° C.–150° C.

A pair of substrates in the liquid crystal display are, after being arranged so as to be opposed to each other with unhardened (or semi-hardened) spacers at a predetermined position, finally bonded to each other by hardening the spacers. Therefore, spacers before superimposition to substrate, or prior to hardening, should have adequate strength (100–1000 N/mm$^2$) to withstand pressing after the superimposition of the substrates. After hardening, in order to withstand an external pressure applied to the liquid crystal display, the spacers preferably exhibit a strength not less than 1.2 times the strength before hardening.

Strength of spacers in the liquid crystal display can be measured using a micro-compression testing machine (for example, MCTM-500 manufactured by Shimadzu Co.), by compressing the spacer with a press indentor of 50 μm in diameter under loading speed of 50 mN/s, as the hardness of the spacer corresponding to the surface pressure ($S_o$) at 20% compression relative to initial height of the spacer. The lower the surface pressure, the lower the hardness and smaller the strength of the spacer. Thus, the strength of spacers in the present invention is expressed as the surface pressure determined from the following formula.

$$S_o = P_o/A$$

$S_o$: surface pressure (N/mm$^2$)
$P_o$: load at 20% compression of spacer (N)
A: cross-sectional area of the spacer (mm$^2$)

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

As has been described above, the liquid crystal display can be manufactured by forming said spacers on one of the substrates, and after superimposing this substrate on the other substrate, adhering said spacers to the substrate by hardening of spacers by the application of heat.

Representative methods for filling liquid crystal in the gap between substrates are a vacuum method in which vacuum is used to fill and seal liquid crystal between substrates having been opposed to each other in advance, and dropping method in which a predetermined volume of liquid crystal is dropped on one of the substrates and the other substrate is superimposed on it. The liquid crystal display of the present invention can be manufactured by either method. For example, in the case of dropping method, aforementioned spacers are formed on one of a pair of substrates, and after liquid crystal is dropped on either one of a pair of substrates, two substrates are superimposed and heated with a member for sealing periphery of the substrates to adhere the spacers to both substrates.

The liquid crystal display can be manufactured with no peripheral sealing or substantially no peripheral sealing (with sealing in highly limited portion) for sealing between substrates, by attaching liquid crystal to all or a part of the portion of no or substantially no peripheral sealing, and then filling the liquid crystal between the substrates, and finally sealing all the unsealed periphery with a sealing member. With this method, liquid crystal can be injected efficiently between substrates, leading to improvement of throughput, reduction of manufacturing cost, and improvement of product yield.

In this case, pressure difference or temperature difference, or both, between before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it. Use of a dispenser permits liquid crystal to be attached quantitatively and easily.

Either a heat curable resin or a photocurable resin may be used as the material for sealing periphery of substrates. When a heat curable resin is used, the curing temperature is chosen to be equal to or higher than the curing temperature of spacers which are hardened by heating and exhibit adhesive capability to both substrates. Thus, in heating step, the spacers are hardened to set the inter-electrode gap of the display region of the liquid crystal display, and periphery of the substrates can be sealed while the inter-electrode gap is maintained. When a photocurable resin is used, sealing between substrates can be performed at lower temperature.

A liquid crystal display according to a fourth aspect of the present invention comprises a pair of substrates of which at least one is transparent and which are held at a separation by means of spacers, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display is characterized in that one of the substrates is joined to spacers by an adhesive. The two substrates are thereby firmly joined by spacers, and the gap between substrates is held uniform and constant.

The spacers in the liquid crystal display are formed on one of the substrates as spacers generally in the shape of pillars, for example, in the shape of cylinders, prisms, etc. Patterning by a photolithographic method can be used to form these pillar-shaped spacers, and a photosensitive resin that permits spacers to be formed in accordance with a predetermined pattern can be advantageously used. When a photosensitive resin is used, the spacers can be disposed at sites which are effective for maintaining a constant gap between substrates excepting the pixel region of the liquid crystal display. The distance between opposing substrates can be easily controlled by adjusting the film thickness of the photosensitive resin layer formed prior to patterning.

As the photosensitive resin for forming the spacers, various positive type and negative type photosensitive resins can be used. For example, at least one resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist material.

As adhesive disposed on the top of spacers, a material that is a soluble in a solvent or is in a liquid state prior to hardening can be used, such as general thermoplastic resins, heat curable resins, photocurable resins. In the present invention, as a thermoplastic resin, polyester, polyethylene, polyvinylterephthalate, polyvinyl chloride, polyvinyl acetate, epoxy, polycarbonate, styrene, nylon 6, etc., or mixture thereof can be used. As a heat curable resin, phenol resin, urea resin, melamine resin, epoxy resin, alkyd resin, unsaturated polyester resin, diallyl phthalate resin, etc., or mixture thereof can be used. Thermoplastic resins and heat curable resins exhibit adhesive capability by heating when the spacers are joined with one substrate. As photocurable resin, acrylate resin such as epoxy acrylate, urethane acrylate, polyester acrylate, etc., added with photopolymerization initiator such as benziphenone, benzoin, acetophenone, thioxanthone, etc., or mixture thereof can be used. These resins exhibit an adhesive capability by the action of light.

The thickness of adhesive placed between spacers and substrate is preferably 10% or less of spacer height. For this purpose, the thickness of adhesive layer disposed on top of spacers when manufacturing a liquid crystal display is preferably 10% or less of spacer height. If an adhesive of a thickness in excess of 10% of spacer height is present on top of spacer, the adhesive may enter into pixel region, leading to an undesirable display defect.

The liquid crystal display can be manufactured by forming spacers on one of the substrates, placing an adhesive on top of it, superimposing this substrate to the other substrate, causing the adhesive to develop adhesive capability by heating (when thermoplastic resin or heat curable resin is used as the adhesive) or by irradiation with light (when photocurable resin is used as the adhesive), and joining the spacers with the other substrate. When photocurable adhesive is used, the adhesive needs to be irradiated with light through the substrate on which the spacers has not been formed in advance. Therefore, this substrate should be transparent.

Method of placing an adhesive on top of spacers is not particularly restricted. A printing method may be applied, for example. In particular, multi-stage roller type printing method used in offset printing or the like can be advantageously used. In this method, the thickness of the adhesive layer attached to the top of spacers can be easily controlled, and continuous processing is possible.

Another method of placing an adhesive on top of spacers is to use an auxiliary material. In this method, after forming spacers, auxiliary material is filled between spacers to expose only top of the spacers. Then, an adhesive layer is formed so as to cover the top of spacers and the upper surface of the auxiliary material layer, and the adhesive on the auxiliary material layer is removed together with the auxiliary material layer to leave the adhesive on top of spacers.

As the auxiliary material, a water soluble resin can be used which permits the auxiliary material layer to be dissolved in water and the adhesive on the auxiliary material layer to be removed together with it. Examples of water soluble resin useful as the auxiliary material include general polyethylene oxide, polyacrylate resin, polyacrylamide, hydroxyethylcellulose, polyamidine resin, poly-N-vinylformamide, etc. A mixture of water soluble resins may be used.

When such a water soluble resin is used, an aqueous solution with a resin concentration of 2–40 wt % is prepared and can be applied on the substrate having spacers formed thereon to form the auxiliary material layer. If the resin concentration is less than 2 wt %, it is difficult to form a resin layer so as to cover spacers. If the resin concentration is more than 40 wt %, it is difficult to achieve uniform application on the substrate. Resin concentration is more preferably 10–40 wt %. Spin coating method can be used to apply the aqueous solution to the substrate. Water can be used as solvent for removing the water soluble resin on the substrate, and, for example, immersion of the substrate in water, or washing with water vapor (injection of water vapor) or the like, can be used.

In the present invention, spacers can be hardened before an adhesive containing a photo-heat generating agent is attached. By using hardened spacers, the gap between superimposed substrates can be maintained constant. Hardened spacers on one of the substrates can be firmly joined with the other substrate by the adhesive attached on top of it. Thus, the two substrates can be joined firmly while maintaining a constant gap between the substrates.

On a pair of substrates used in the liquid crystal display, as has been described before, transparent electrodes required for display operation of the liquid crystal display are provided, and an orientation film formed of resin is present on it. The surface of the orientation film has been subjected to rubbing treatment for orientating the liquid crystal molecules in a predetermined direction. In general, the effect of rubbing of the orientation film having been subjected to rubbing treatment is impaired when the orientation film is exposed to high temperature. Therefore, in the present invention, when thermoplastic resin or a heat curable resin that exhibits adhesive capability upon heating is used as an adhesive attached on top of spacers, the softening temperature or the curing temperature of the adhesive resin is preferably such that the effect of rubbing of the orientation film is not impaired. Also, curing temperature of the heat curable resin of the sealant for sealing periphery of substrates is preferably such that the effect of rubbing of the orientation film is not impaired. Particularly preferably, the curing temperature of the sealant is equal to or higher than the softening temperature or the curing temperature of the adhesive resin on top of spacers. This permits, in the heating/pressing step of the superimposed substrates, the periphery of the substrates to be sealed after the substrate gap is made constant or while the substrate gap is maintained constant.

In general, after the substrates are combined to form a panel, an annealing treatment for re-orientating liquid crystal is performed at about 110° C. Therefore, the softening temperature or the curing temperature of the adhesive resin on top of spacers, and the curing temperature of the heat curable resin in the periphery of substrates, need to be not lower than 110° C. After a panel is formed, as the effect of rubbing of the orientation film is lost at temperature of 150° C. or higher, heating at or above 150° C. should be avoided. Therefore, the softening temperature or the curing temperature of the adhesive resin on top of spacers, and the curing temperature of the heat curable resin in the periphery of substrates, are preferably in the range of 110° C.–150° C.

Time required for curing of the heat curable adhesive on top of spacers and of the sealant in the periphery of substrates, is preferably within 2 hours, and if possible, within 1 hour.

For filling liquid crystal into substrate gap, a vacuum method in which vacuum is used to fill and seal liquid crystal between substrates being opposed to each other in advance, and a dropping method in which a predetermined volume of liquid crystal is dropped on one of the substrates and then the other substrate is superimposed on it, are representative, and the liquid crystal display of the present invention can be manufactured by either method. For example, in a dropping method, said spacers are formed on one of a pair of substrates, and after liquid crystal is dropped on either one of the pair of substrates, two substrates are superimposed on each other. By heating the superimposed substrates together with a member for sealing periphery of the substrates (when thermoplastic or heat curable adhesive is used), spacers can be adhered to both substrates.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

A liquid crystal display according to a fifth aspect of the present invention comprises a pair of substrates of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

In the liquid crystal display, spacers for maintaining a constant gap between opposing substrates for filling and sealing liquid crystal are formed from a photosensitive material that permits both positive type patterning and negative type patterning. As a result, there are both types of spacers, that is, spacers adhered to both substrates and spacers adhered to only one of the substrates.

In manufacturing the liquid crystal display, spacers are provided on one of the substrates, and are adhered to the other substrate by adhesive capability exhibited upon hardening with the tip of spacer opposite to the substrate in contact with the other substrate. In the present invention, positive type patterning image and negative type patterning image are formed in the photosensitive material layer that permits both positive type patterning and negative type patterning, and unhardened spacers are formed from the former and hardened spacers are formed from the latter, respectively. Thus, on one of the substrates, spacers which exhibit adhesive capability to the other substrate (unhardened spacers) and spacers which exhibits no adhesive capability to the other substrate (hardened spacers) can be formed. As a result, when two substrates are superimposed and joined with each other via spacers by application of heat and pressure, the hardened spacers which have sufficient strength and do not deform under pressure, can maintain the constant gap between the substrates. While the gap between substrates is maintained constant, the superimposed substrates can be firmly joined with each other by hardening of the unhardened spacers. In this manner, problems associated with partial reduction of the gap between substrates joined with each other via spacers due to an external pressure, that is, problems such as occurrence of interference fringes in the display region of the liquid crystal display, fluctuation of the color tone of display, or fluctuations of drive voltage characteristics, can be avoided.

In the liquid crystal display of the present invention, as a result of spacers being formed from a photosensitive material that permits both positive type patterning and negative-type patterning, there are both types of spacers, that is, spacers adhered to both substrates, and spacers adhered to only one of the substrates.

Figure 15A:
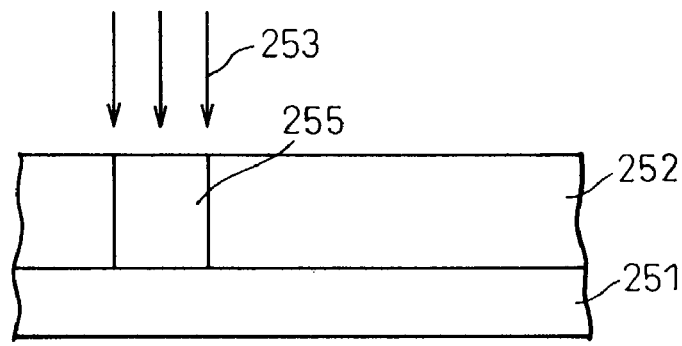
FIGS. 15A–15D are views useful for explaining the steps for forming spacers in a liquid crystal display according to a fifth aspect of the present invention.
Figure 15B:
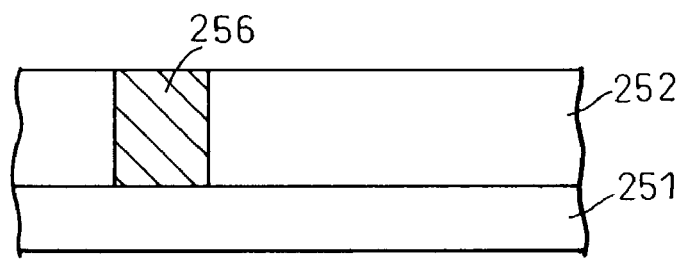
Figure 15C:
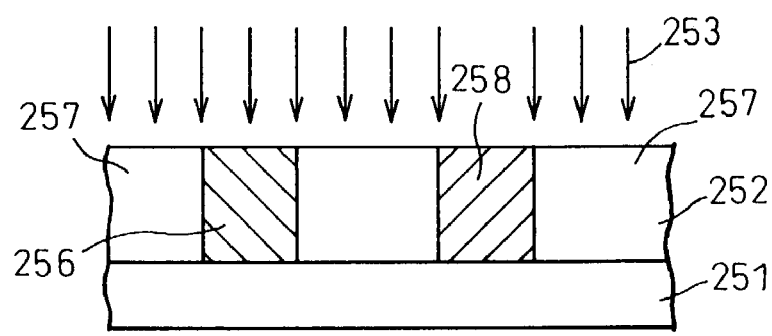
Figure 15D:
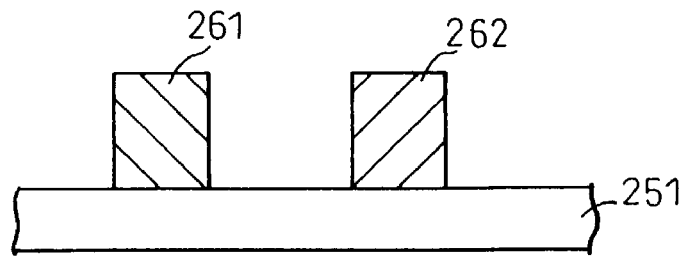

The photosensitive material which is used for forming spacers and permits both positive type patterning and negative type patterning, contains, in addition to a photosensitive base resin, a substance which generates acid upon exposure to light. As shown in FIG. 15A, when a photosensitive film 252 formed from this material on a substrate 251 is first exposed to light using a mask (not shown) of a predetermined pattern and radiation 253, acid is generated from the acid generating substance in the exposed portion 255. The acid generated hardens the base resin by heat treatment (reversal bake), and thereby forms a negative type patterning image 256 (FIG. 15B). Then, as shown in FIG. 15C, when the photosensitive film is exposed to light again, using a mask (not shown) of another pattern and a radiation 253, acid is generated from the exposed portion 257 (except the portion in which the negative type pattern image 256 is situated), and causing this portion 257 to be alkali-soluble, thereby forming a positive type patterning image 258 in the unexposed portion. Thus, both positive type and negative type pattern images 256, 258 are formed in the same photosensitive film. When these are developed using alkaline developing solution (same as ordinary positive development), hardened spacers 261 are obtained from the negative type patterning image 256 and unhardened spacers 262 are obtained from the positive type patterning image 258, as shown in FIG. 15D.

A photoresist material that is commercially available from Hoechst as Image Reversal Resist (Trade Name), for example, can be used as the photosensitive material that permits both positive type and negative type patterning. By using a photosensitive material to form spacers, a photolithographic method can be used to form spacers easily in accordance with a predetermined pattern, and spacers can be disposed only at sites effective for maintaining a constant gap between substrates excepting pixel region of the liquid crystal display. Also, the distance between opposing substrates can be controlled easily by adjusting the film thickness of the photosensitive resin layer that is formed prior to patterning.

In the liquid crystal display, the number of spacers adhered to both substrates (unhardened spacers formed on one of the substrates) is preferably 10–90% of the total number of spacers of the liquid crystal display. If the number of unhardened spacers exhibiting an adhesive capability is less than 10%, spacers adhered to both substrates after joining of opposing substrates by application of heat are relatively few so that the substrate gap tends to change under external pressure, causing problems such as occurrence of interference fringes. If the number of unhardened spacers exhibiting adhesive capability is more than 90%, hardened spacers exhibiting high strength are few so that, when the substrates are superimposed and pressure and heat are applied, unhardened spacers forming the majority with relatively low strength tend to collapse and a proper substrate gap cannot be obtained, leading to deterioration of display quality of the liquid crystal display.

In the liquid crystal display, not only the proportion of spacers adhered to both substrates relative to all spacers in the liquid crystal display, but also density per unit area of spacers adhered to both substrates expressed as the proportion of the number relative to the total number of spacers in a region of 1 cm$^2$, is important for realizing good display characteristics of the liquid crystal display. Even if proper mixing ratio of spacers adhered to both substrates and spacers adhered to only one of the substrates is obtained in overall display region, if distribution of this ratio is not uniform, proper display quality cannot be obtained for the liquid crystal display as a whole. This density of spacers adhered to both substrates is preferably 10–90%. If the density per 1 cm$^2$ of spacers adhered to both substrates is less than 10%, spacers adhered to both substrates are relatively few in the local region and the substrate gap tends to change under external pressure, leading to problems such as occurrence of interference fringes in the region. If the density is more than 90%, hardened spacers exhibiting high strength are few so that, when substrates are superimposed and pressure and heat are applied, the strength is insufficient in the local region and proper substrate gap cannot be obtained, which may lead to deterioration of display quality of the liquid crystal display.

In the liquid crystal display, good display characteristics can be obtained when the spacer is in the shape of cylinder or prism having the contact surface on the substrate as bottom surface. This is because the structure in this shape has same cross sectional shape parallel to the substrate and, therefore, does not deform unevenly under pressure applied from above and below the substrates, and gap can be controlled easily and fluctuation of the gap is small.

In the liquid crystal display, good display characteristics can be obtained if, when spacers to be adhered to both substrates are formed on one of the substrates, in the contact surface with the other substrate (end surface opposite to the substrate on which the spacer is formed), a peripheral portion is in hardened state and central portion is in unhardened state. This is because, by hardened an outer wall of the spacer, deformation of inner unhardened portion can be prevented and a predetermined contact area with superimposed opposing substrate can be assured, and hence a predetermined adhesive capability can be assured.

Further, especially good display characteristics can be obtained if, when spacers to be adhered to both substrates are formed on one of the substrates, in the contact surface with the other substrate (end surface opposite to the substrate on which the spacer is formed), a hardened portion and an unhardened portion are alternately arranged in concentric form. If the substrate gap is observed microscopically in the portion where the spacer is adhered to the substrate, the substrate gap is wide in the hardened portion of the spacer (where the spacer is adhered only to the substrate on which the spacer is formed before superimposition of substrates), and is narrow in the unhardened portion (where the spacer is adhered to both substrates by hardening of spacer material after superimposition of substrates). By concentric arrangement of a hardened portion and an unhardened portion, these are alternately arranged more closely to each other, and thus uniformity of the substrate gap can be improved. Preferably, each hardened portion and each unhardened portion are formed in the shape of ring (the innermost portion is a circle), and are arranged in the shape of concentric circles. An example of the spacer in such a concentric shape is found in the spacer of triple circular section as described in Example 56. In this case, the outer ring portion and the central portion are hardened portions, and intermediate portion is an unhardened portion, and this unhardened portion is to be adhered to the other substrate.

When spacers having a hardened portion and an unhardened portion before joining a pair of opposing substrates are used, good display characteristics can be obtained if, in the contact surface with the substrate having no spacer formed thereon (end surface opposite to the substrate having spacers formed thereon), the proportion of the unhardened portion is 10% or more of the total of the hardened portion and unhardened portion combined. If the proportion of the unhardened portion is less than 10%, when the portion is hardened by heating, the adhesive capability is weak and the substrate gap changes under external pressure, giving rise to problems such as occurrence of interference fringes.

The spacer which has a hardened portion and an unhardened portion before a pair of opposing substrates are joined with each other and which is adhered to both substrates after the opposing substrates are joined, can be easily formed by using a mask that permits the hardened portion of the spacer to be adhered to both substrates to be exposed to light when the negative type patterning image is formed by first exposure to light.

In the liquid crystal display, the curing temperature of spacers is preferably such that the effect of rubbing of the orientation film is not impaired. This is because, if the curing temperature of spacers is such that the effect of rubbing of the orientation film is impaired, the effect of rubbing of the orientation film is lost during curing of spacers so that good display characteristics cannot be obtained. In general, as the effect of rubbing of the orientation film is lost above 150° C., the curing temperature of spacers adhered to both substrates is preferably not higher than 150° C.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

The liquid crystal display can be manufactured by a method comprising the steps of forming a photosensitive film of a photosensitive material that permits both positive type and negative type patternings on a first substrate, subjecting the film to negative exposure to form a negative type patterning image, followed by positive exposure to form a positive type patterning image, performing development processing to form hardened spacers from the negative type patterning image and unhardened spacers from the positive type patterning image, respectively, and after superimposing the first substrate and a second substrate, adhering the unhardened spacers to the second substrate by the application of heat.

For filling liquid crystal into substrate gap, a vacuum method in which a vacuum is used to fill and seal liquid crystal between substrates being opposed to each other in advance, and dropping method in which a predetermined volume of liquid crystal is dropped on one of the substrates and then the other substrate is superimposed on it, are representative methods. The liquid crystal display of the present invention can be manufactured in either method. For example, in dropping method, spacers are formed on one of a pair of substrates, and after liquid crystal is dropped on either one of the pair of substrates, two substrates are superimposed on each other. By heating the superimposed substrates together with a member for sealing the peripheries of the substrates, spacers can be adhered to both substrates.

A liquid crystal display according to a sixth aspect of the present invention comprises a pair of substrates of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display contains, as spacers for maintaining a constant gap between opposing substrates for injecting and sealing liquid crystal, two types of spacers, that is, spacers adhered to both substrates and spacers adhered to only one of the substrates. By containing these two types of spacers, the present invention has following advantages.

A spacer develops adhesive capability when it is hardened with the tip in contact with the substrate. A spacer which is provided on one of the substrates and does not exhibit adhesive capability to the other substrate when the substrates are superimposed and joined with each other via spacers by application of heat and pressure, has already completed hardening, and has sufficient strength not to deform under pressure, and thus can serve to maintain a constant gap between the substrates. While the gap between the substrates is thus maintained constant, the substrates can be joined firmly with each other via spacers that exhibit adhesive capability to the other substrate. This prevents the gap between the substrates joined via spacers from being partially narrowed under external pressure, and thus can prevent problems such as occurrence of interference fringes in display region of the liquid crystal display, or fluctuation of color tone of display, or fluctuations of drive voltage characteristics.

The liquid crystal display having two types of spacers mixed therein, that is, spacers adhered to both substrates and spacers adhered to only one of the substrates, can be obtained by joining opposing substrates using both spacers having been hardened prior to joining of the opposing substrates and unhardened (semi-hardened) spacers which develop an adhesive capability when hardened.

A photosensitive resin can be used to form spacers. By using a photosensitive resin, photolithographic method can be used to form spacers easily in accordance with a predetermined pattern, and spacers can be disposed only at sites effective for maintaining a constant gap between substrates excepting a pixel region of the liquid crystal display. Also, the distance between opposing substrates can be controlled easily by adjusting the film thickness of the photosensitive resin layer that is formed prior to patterning.

When a substrate is used on which both spacers exhibiting adhesion to the other substrate and spacers not exhibiting adhesion to the other substrate are formed, a negative type photosensitive resin is used as the photosensitive resin. This is because a negative type photosensitive resin permits hardened spacers (spacers not exhibiting adhesion) and unhardened (semi-hardened) spacers (spacers exhibiting adhesion) to be easily formed by controlling the amount of exposure.

A substrate on which both spacers exhibiting adhesion and spacers not exhibiting adhesion are formed, can be formed by two stage exposure to light of a negative type photosensitive resin. More specifically, a negative type photosensitive resin layer is formed on one of the substrates and, using a photomask having exposure pattern corresponding to the sectional shape of spacers intended to be formed, the resin layer is exposed to light at 10–80% of total exposure necessary for hardening of the photosensitive resin (primary exposure). Then, the photomask is changed to one having a pattern suitable for exposure of spacers to be completely hardened, and the photosensitive resin layer is exposed to light at the remaining exposure (20–90%) of the total exposure necessary for hardening of the photosensitive resin (secondary exposure) to completely harden the exposed portion of the resin layer. Sum of the amount of exposure irradiated to the portion to be completely hardened in the secondary exposure (amount of secondary exposure) and the amount of exposure irradiated in the primary exposure (amount of primary exposure) needs to be equal to or greater than the total amount of exposure necessary for hardening of the photosensitive resin. The amount of exposure in the primary exposure is 10–80% of the total amount of exposure necessary for complete hardening of the resin because, if this is less than 10%, hardening does not proceed substantially, and if this is more than 80%, the semi-hardened portion is too hard to obtain sufficient adhesive capability when heated in subsequent step.

When one substrate on which spacers- exhibiting an adhesive capability to an opposed substrate are formed and the other substrate on which spacers exhibiting adhesive capability to an opposed substrate are formed, are used, either a negative type photosensitive resin or a positive type photosensitive resin may be used as the photosensitive resin.

In this case, the two kinds of substrates can be obtained by forming spacers to be provided on each substrate from a negative type photosensitive resin. When a negative type photosensitive resin is used to form spacers on each substrates, exposure condition can be controlled to form semi-hardened spacers exhibiting adhesive capability, as well as to form completely hardened spacers not exhibiting adhesive capability.

The two kinds of substrates can be obtained by forming spacers to be provided on each substrate from a positive type photosensitive resin. When a positive type photosensitive resin is used to form spacers on each substrates, prebake condition can be controlled so as to form semi-hardened spacers exhibiting adhesive capability, or post-baking is performed to complete hardening to form completely hardened spacers not exhibiting adhesive capability.

The two kinds of substrates can be obtained by forming spacers exhibiting adhesive capability from a positive type photosensitive resin on one of the substrates, and forming spacers not exhibiting adhesive capability from a negative type photosensitive resin on the other substrates. In this case, using a positive type photosensitive resin, semi-hardened spacers exhibiting adhesive capability can be formed by controlling prebake condition, and using a negative type photosensitive resin, completely hardened spacers not exhibiting adhesive capability can be formed by exposure to complete hardening.

Examples of a suitable photosensitive resin for use both in the case where spacers are formed on only one of the substrates and in the case where spacers exhibiting adhesive capability are formed on one of the substrates and spacers not exhibiting adhesive capability are formed on the other substrate, include polyimide, polyamide, polyvinyl alcohol, polyacrylamide, cyclized rubber, novolac resin, polyester, polyurethane, acrylate resin, bisphenol resin, or gelatin made to be a photosensitive resin. A mixture thereof can also be used. Resins listed above are commercially available as general resist material.

Spacers which exhibit adhesive capability to the opposing substrate when the substrates are superimposed to join with each other, and which are adhered to both substrates when the substrates are joined with each other, are preferably 10–90% in number of all the spacers of the liquid crystal display. If unhardened spacers exhibiting adhesive capability are less than 10% in number, spacers adhered to both substrates after joining of opposing substrates by heating are relatively few so that the gap between substrates tends to change under external pressure, causing problems such as occurrence of interference fringes, etc. If unhardened spacers exhibiting adhesive capability are more than 90% in number, hardened spacers exhibiting high strength are relatively few so that, when substrates are superimposed and pressure and heat are applied, unhardened spacers forming the majority with relatively low strength tend to collapse and proper substrate gap cannot be obtained, leading to deterioration of display quality of the liquid crystal display.

Not only the proportion of spacers which exhibit adhesive capability to the opposing substrate when the substrates are superimposed to join with each other relative to all spacers in the liquid crystal display, but also density per unit area of spacers adhered to both substrates expressed as the proportion of the number relative to the total number of spacers in a region of 1 $cm^2$, is important for realizing good display characteristics of the liquid crystal display. Even if proper mixing ratio of spacers adhered to both substrates and spacers adhered to only one of the substrates is obtained in overall display region, if distribution of this ratio is not uniform, a proper display quality cannot be achieved for the liquid crystal display as a whole. This density of spacers adhered to both substrates is preferably 10–90%. If the density per 1 $cm^2$ of spacers adhered to both substrates after the substrates are joined with each other is less than 10%, spacers adhered to both substrates are relatively few in the local region, the substrate gap tends to change under external pressure, leading to problems such as occurrence of interference fringes in the region. If the density is more than 90%, hardened spacers exhibiting high strength are few so that, when substrates are superimposed and pressure and heat are applied, strength is insufficient in the local region and proper substrate gap cannot be obtained, which may lead to deterioration of display quality of the liquid crystal display.

In the liquid crystal display, good display characteristics can be obtained when the spacers are in the shape of cylinder or prism having the contact surface on the substrate as bottom surface. This is because the structure in this shape has the same cross sectional shape parallel to the substrate, and therefore does not deform unevenly under pressure applied from above and under the substrates, and gap can be controlled easily and fluctuation of gap is small.

Also, good display characteristics can be obtained if, in spacer which exhibits adhesive capability to the opposing substrate when the substrates are superimposed to join with each other, and which is adhered to both substrates when the substrates are joined with each other, a peripheral portion is in hardened state and central portion is in semi-hardened state before substrates are joined. This is because, by hardened outer wall of the spacer, deformation of inner semi-hardened portion can be prevented and a predetermined contact area with superimposed opposing substrate can be assured, and hence a predetermined adhesive capability can be assured.

Further, especially good display characteristics can be obtained if a spacer which exhibits adhesive capability to the opposing substrate when the substrates are superimposed to join with each other, and which is adhered to both substrates when the substrates are joined with each other, has sectional shape (sectional shape parallel to substrates) in which hardened portion and semi-hardened portion are alternately arranged in concentric form before the substrates are joined. If the substrate gap is observed microscopically in the portion where the spacer is adhered to the substrate, the substrate gap is wide in the hardened portion of the spacer (where the spacer is adhered only to the substrate on which the spacer is formed before superimposition of substrates), and is narrow in the semi-hardened portion (where the spacer is adhered to both substrates by hardening of spacer material after superimposition of substrates). By concentric arrangement of hardened portion and semi-hardened portion, these are alternately arranged more closely to each other, and thus uniformity of the substrate gap can be improved. Preferably, each hardened portion and semi-hardened portion are formed in the shape of ring (the innermost portion is a circle), and arranged in the shape of concentric circles. An example of the spacer in such a concentric shape is found in the spacer of triple circular section as described in Example 78. In this case, the outer ring portion and the central portion are hardened portion, and intermediate portion is semi-hardened portion.

When spacers having a hardened portion and a semi-hardened portion before joining a pair of opposing substrates are used, good display characteristics can be obtained if, in the section parallel to the substrates, the proportion of the semi-hardened portion is 10% or more of the total of the hardened portion and semi-hardened portion combined. If the proportion of the semi-hardened portion is less than 10%, when the portion is hardened by heating, the adhesive capability of the substrate is weak and the substrate gap changes under external pressure, giving rise to problems such as occurrence of interference fringes.

Spacers having a hardened portion and a semi-hardened portion before joining of the opposing substrates can be formed by two-stage exposure, of a negative type photosensitive resin, to light. More specifically, a negative type photosensitive resin layer is formed on one of the substrates, and using a photomask having exposure pattern corresponding to the cross-sectional shape of the spacers to be formed, the resin layer is exposed to light at 10–80% of the total amount of exposure necessary for hardening of the photosensitive resin (primary exposure). Then, the photomask is replaced by one having a pattern corresponding to the portion of spacers to be completely hardened (in general, outer portion of the spacer cross-sectional shape), and the resin layer is exposed to light at the remaining amount (20–90%) of the total amount of exposure necessary for hardening of the photosensitive resin (secondary exposure) to completely harden the exposed portion of the resin layer. The sum of the amount of exposure irradiated to the portion to be completely hardened in the secondary exposure (amount of secondary exposure) and the amount of exposure irradiated in the primary exposure (amount of primary exposure) needs to be equal to or greater than the total amount of exposure necessary for hardening of the photosensitive resin. The amount of exposure in the primary exposure is 10–80% of the total amount of exposure necessary for complete hardening of the resin because, if this is less than 10%, hardening does not proceed substantially, and if this is more than 80%, the semi-hardened portion is too hard to obtain sufficient adhesive capability when heated in subsequent step.

A spacer having hardened portion and semi-hardened portion can be formed using a photomask which has light transmitting domains with light transmissivity varying from the outer portion toward the inner portion with this method, a spacer can be formed which has a hardened state varying continuously or in steps from outer portion to inner portion in one stage of exposure.

Two substrates opposed to each other with spacers sandwiched therebetween are sealed at the periphery with liquid crystal filled inside. Usually, a resin material is used for this sealing, and the sealing function is fulfilled by heat curing of the resin. By using, as the photosensitive resin used for forming spacers, a heat curable resin which has heat curing temperature equal to or lower than the heat curing temperature of the resin for sealing periphery portion, joining of two substrates by hardening of spacers exhibiting adhesive capability to the superimposed opposing substrate and sealing of the periphery of the liquid crystal display can be carried out in one step.

On a pair of substrates used in the liquid crystal display, as has been described before, transparent electrodes required for display operation of the liquid crystal display are provided, and an orientation film formed of resin is present on it. The surface of the orientation film is subjected to rubbing treatment for orientating the liquid crystal molecules in a predetermined direction. When semi-hardened portion of spacers is hardened by heating after superimposition of substrates, it is important that the heating is performed at a temperature at which effect of rubbing of the orientation film is not impaired. Also, as described above, the curing temperature of spacers is preferably equal to or lower than curing temperature of the resin for sealing the periphery of the liquid crystal display. In general, after liquid crystal is sealed between the substrates, an annealing treatment for re-orientating liquid crystal is performed at about 110° C. Therefore, the curing temperature of the heat curable resin of spacers, and the curing temperature of the heat curable resin for sealing the periphery of substrates are desirably not lower than 110° C. Since the effect of rubbing of the orientation film is lost at temperature of 150° C. or higher, heating at or above 150° C. should be avoided. Therefore, the curing temperature of the heat curable resin for spacers and for sealing the periphery of substrates, are preferably in the range of 110° C.–150° C.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting electroclinic effect, can be used.

The liquid crystal display can be manufacture by using a substrate on which both spacers exhibiting adhesion and spacers not exhibiting adhesion are formed or using one substrate on which spacers exhibiting adhesive capability to an opposed substrate are formed and the other substrate on which spacers exhibiting adhesive capability to an opposed substrate are formed, and after superimposing opposing substrates to each other such that the orientation films formed on respective substrates face each other, adhering spacers exhibiting adhesive capability to the substrate opposed to the substrate on which the spacers are provided.

For filling liquid crystal into a substrate gap, a vacuum method in which vacuum is used to fill and seal liquid crystal between substrates opposed to each other, and a dropping method in which a predetermined volume of liquid crystal is dropped on one of the substrates and then the other substrate is superimposed on it, are representative methods. The liquid crystal display of the present invention can be manufactured in either method. For example, in a dropping method, spacers are formed on one of a pair of substrates, and after liquid crystal is dropped on either one of the pair of substrates, two substrates are superimposed on each other and, by heating the superimposed substrates together with a member for sealing periphery of the substrates, spacers can be adhered to both substrates.

The liquid crystal display can be manufactured with no peripheral sealing or substantially no peripheral sealing (with sealing only in limited portion) for sealing between substrates, by attaching liquid crystal to all or a part of the portion with no or substantially no peripheral sealing, and then filling the liquid crystal between the substrates, and then sealing all the unsealed periphery with a sealing member. With this method, liquid crystal can be injected efficiently between substrates, leading to improvement of throughput, reduction of manufacturing cost, and improvement of product yield.

More specifically, the liquid crystal display can be manufactured, for example, with no or substantially no peripheral sealing for sealing between substrates, and after attaching liquid crystal to a part or all of the portion where no or substantially no peripheral sealing is performed, by filling liquid crystal between the substrates, and then sealing the entire unsealed peripheral portion with a sealing member. In this case, pressure difference or temperature difference, or both, between before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it use of a dispenser permits liquid crystal to be attached quantitatively and easily.

In the liquid crystal display, either a heat curable resin or a photocurable resin may be used as the material for sealing periphery of substrates. When a heat curable resin is used, the curing temperature is chosen to be equal to or higher than the curing temperature of spacers which are hardened by heating and exhibit adhesive capability to both substrates. Thus, in a heating step, the spacers are hardened first to set the inter-electrode gap of the display region of the liquid crystal display, and periphery of the substrates can be sealed while the inter-electrode gap is maintained. When a photocurable resin is used, sealing between substrates can be performed at a lower temperature.

A liquid crystal display according to a seventh aspect of the present invention comprises a pair of substrates which are held at a separation by spacers, and of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display is characterized in that the spacers disposed between the substrates are adhered to at least one of the substrates without interposed orientation film between the substrate and the spacers.

Usually, in manufacturing a liquid crystal display, one of the substrates on which spacers are formed in advance and the other substrate having no spacer formed thereon, are superimposed to each other with spacers sandwiched therebetween, and by application of heat and pressure, spacers are softened or hardened to be adhered to the other substrate. An orientation film (also called orientation control film) is formed on each substrate, and the spacers formed in advance on one of the substrates are strongly adhered to the orientation film on the substrate during the process of their formation. However, the spacers are not so strongly adhered to the orientation film on the other substrate to which the spacers are adhered in subsequent step. Therefore, the spacers are not so strongly adhered to the other substrate.

In the present invention, an orientation film is not interposed between the spacers and the other substrate on which spacers are not formed in advance, so that they can be adhered to each other strongly. As the portion where the spacers are formed is outside the effective display region of the liquid crystal display, and is the portion where electrodes for driving the liquid crystal display needs not be present, the surface of the substrate, for example, glass, may be exposed in the portion of the substrate having no spacer formed thereon in advance where the spacers are to be adhered. As tip of the spacers adhered by softening or hardening exhibits stronger adhesive capability to the material of the substrate such as glass than to material of the orientation film, the spacers in the liquid crystal display of the present invention can be adhered more strongly to the portion of the other substrate where orientation film is not present, that is, more strongly to the other substrate. In this manner, the spacers are preferably adhered directly to the substrate itself having no spacer formed in advance. In general, individual electrodes as pixel electrodes are provided on one of the substrates, and a common electrode is provided on the other substrate. Therefore, preferably, the substrate on which the spacers are formed in advance is the substrate on which the common electrode is provided, and the substrate on which the spacers are not formed in advance is the substrate on which individual electrodes are provided.

In the present invention, an aspect is possible in which the orientation film on the substrate on which spacers are formed in advance is removed at sites for forming spacers. However, spacers are adhered relatively strongly to the substrate on which spacers are formed in advance even if the orientation film is present. Therefore, usually, the orientation film on the substrate need not be removed.

Ideally, the orientation film should be removed at total number of sites at which spacers come into contact on the substrate having no spacer formed in advance (corresponding to total number of spacers). But, as regards joining of a pair of substrates by adhering spacers to the substrate, the substrates can be joined firmly if the orientation film is removed at least at 50% of total number of sites at which spacers come into contact.

Shape of the sites at which the orientation film is removed on the substrate having no spacer formed thereon in advance, is preferably analogous to the shape of end surface of the spacer (for example, a circle or a polygon) that comes into contact with it. The area of the site is preferably 70–130% of the area of the end surface of the spacer that comes into contact with it. If this area is less than 70%, the area of the spacer end surface which comes into contact with the orientation film increases and sufficient adherence of the spacer to the substrate cannot be obtained. If this is more than 130%, area of the region having no orientation film increases and orientation of liquid crystal is adversely affected, and in general, a good quality display cannot be obtained.

An orientation film on a substrate can be formed from resin material such as polyimide that is general material for orientation films. In the present-invention, the orientation film on the substrate having no spacer formed in advance needs to be formed in a predetermined pattern which has openings at sites that comes into contact with spacers. Therefore, this orientation film is advantageously formed from a photosensitive resin material such as photosensitive polyimide. By using a photosensitive resin, a photolithographic method can be used to form an orientation film of a predetermined pattern easily. Examples of photosensitive resin suitable for forming the orientation film in the liquid crystal display of the present invention include, besides above-mentioned photosensitive polyimide, polyamide, polyacrylamide, novolac resin, polyester, polyurethane, acrylate resin, etc. made to be photosensitive resins. A mixture of two or more of them can be used.

Orientation performance of the liquid crystal sandwiched between orientation films formed on a pair of substrates is good when the orientation films on both sides are formed of same material and, then, the display characteristics of the liquid crystal display are also good, accordingly. Therefore, in the present invention, the orientation film on the substrate having spacers formed in advance is preferably formed from the same material for forming the orientation film on the substrate having no spacer formed in advance, that is, a photosensitive resin such as photosensitive polyimide.

Not only adherence to substrates but also sufficient strength for maintaining a constant gap between substrates is required for spacers that join a pair of opposing substrates with each other. In order to satisfy this requirement, spacers which are in a hardened state in the outer portion and in semi-hardened state in center portion in the section parallel to substrate at the stage when spacers are formed on one of the substrates, that is, before a pair of opposing substrates are joined by spacers, can be used in the present invention. Spacers having such a double structure in section exhibit sufficient strength with the hardened outer portion, and can be adhered to the substrate strongly by hardening (complete hardening) of the central semi-hardened portion after a pair of substrates are superimposed with these two effects, the spacers can maintain a constant gap between the substrates, and can firmly join the two substrates, resulting in particularly good display quality of the liquid crystal display.

The spacer having double structure in cross-section has preferably an area of semi-hardened portion (center portion) adhered to the substrate which is 10–90% of the total cross sectional area of the spacer. If the area of the semi-hardened portion is less than 10%, adhesive strength to the substrate when the portion is hardened by heating is small and the substrate gap tends to change under external pressure, leading to problems such as occurrence of interference fringes. If the area of the semi-hardened portion is more than 90%, significant effect of increased strength cannot be expected.

The spacers in the liquid crystal display can be formed easily in accordance with a predetermined pattern from a photosensitive resin using a photolithographic method. The spacers can be arranged at positions effective for maintaining a constant gap between the substrates excepting the pixel region of the liquid crystal display. Also, the height of spacers and the distance between the opposing substrates can be easily controlled by adjusting the film thickness of the photosensitive resin layer formed prior to patterning.

Both positive type and negative type photosensitive resin can be used as a photosensitive resin for forming spacers. For example, at least one photosensitive resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials.

In the case of above-described spacers with double structure in cross section, a negative type photosensitive resin can be particularly effectively used. This is because a negative type photosensitive resin can be used to form a predetermined pattern with a mixed hardened portion and semi-hardened portion easily by controlling exposure. In order to use a negative type photosensitive resin to form spacers with double structure in cross section, for example, the negative type photosensitive resin layer is first formed on one of the substrates and, then, using a photomask having a pattern corresponding to the cross sectional shape of spacers to be formed, the resin layer is exposed to light at a portion (for example, 10–80%) of the total amount of exposure required to harden the photosensitive resin (primary exposure). Then, the photomask is replaced by one having a pattern corresponding to the portion to be hardened of spacers, and the resin layer is exposed to light at remaining amount of exposure required for hardening of the photosensitive resin (secondary exposure). The amount of exposure irradiated to the portion to be completely hardened in the secondary exposure (amount of secondary exposure) is such that the sum of the amount of secondary exposure and the amount of exposure in the primary exposure (primary amount of exposure) is not less than the total amount of exposure necessary for hardening of the resin.

On a pair of substrates used in the liquid crystal display, transparent electrodes required for display operation of the liquid crystal display are provided, and an orientation film formed of resin is present on it. The surface of the orientation film has been subjected to rubbing treatment for orientating the liquid crystal molecules in a predetermined direction. The curing temperature of the spacers is preferably such that the effect of rubbing of the orientation film is not impaired, because, if the curing temperature of spacers is above the temperature at which the effect of rubbing of the orientation film is impaired, the effect of rubbing of the orientation film is lost when a pair of substrates are superimposed and spacers are adhered to the substrate having no spacer formed thereon, and good display characteristics cannot be obtained.

Two substrates opposed to each other with spacers sandwiched therebetween are sealed at the periphery with liquid crystal filled inside. Usually, a resin material is used for this sealing, and the sealing function is fulfilled by heat curing of the resin. By using, as the photosensitive resin used for forming spacers, a heat curable resin which has heat curing temperature equal to or lower than the heat curing temperature of the resin for sealing periphery portion, joining of two substrates by hardening of spacers and sealing of the periphery of the liquid crystal display can be carried out in one step. As the effect of rubbing of the orientation film is lost, in general, at a temperature of 150° C. or higher, the curing temperature of spacers and of the resin for sealing the periphery is preferably 150° C. or lower.

On the other hand, after liquid crystal is sealed between the substrates, an annealing treatment for re-orientating liquid crystal is performed at about 110° C. Therefore, the curing temperature of the heat curable resin of spacers, and of the heat curable resin for sealing the periphery of substrates are preferably not lower than 110° C.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

The liquid crystal display can be manufactured by forming spacers on one of the substrates, and combining this substrate with the other substrate having no orientation film at positions corresponding to the position of the spacers, and adhering the spacers to the other substrate.

For filling liquid crystal into a substrate gap, a vacuum method in which vacuum is used to fill and seal liquid crystal between substrates opposed to each other in advance, and a dropping method in which a predetermined volume of liquid crystal is dropped on one of the substrates and then the other substrate is superimposed on it, are representative methods.

The liquid crystal display of the present invention can be manufactured by either method. For example, in a dropping method, spacers are formed on one of a pair of substrates, and after liquid crystal is dropped on either one of the pair of substrates, two substrates are superimposed on each other, and by heating the superimposed substrates together with a member for sealing periphery of the substrates, spacers can be adhered to both substrates.

The liquid crystal display can be manufactured with no peripheral sealing or substantially no peripheral sealing (with sealing only in limited portion) for sealing between substrates, by attaching liquid crystal to all or a part of the portion with no, or substantially no, peripheral sealing, and then filling the liquid crystal between the substrates, and then sealing all the unsealed periphery with a sealing member. With this method, liquid crystal can be injected efficiently between substrates, leading to improvement of throughput, reduction of manufacturing cost, and improvement of product yield.

More specifically, the liquid crystal display can be manufactured, for example, with no or substantially no peripheral sealing for sealing between substrates, and after attaching liquid crystal to a part or all of the portion where no or substantially no peripheral sealing is performed, by filling liquid crystal between the substrates, and then sealing the entire unsealed peripheral portion with a sealing member. In this case, a pressure difference or temperature differences or both, between before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it. Use of a dispenser permits liquid crystal to be attached quantitatively and easily.

In the liquid crystal display, as the material for sealing the periphery of substrates, either a heat curable resin or a photocurable resin may be used. When a heat curable resin is used, the curing temperature can be chosen to be equal to or higher than the curing temperature of spacers which exhibit adhesive capability to both substrates upon heating. Then, in a heating step, spacers are first hardened to set the gap between electrodes in the display region of the liquid crystal display, and then the periphery of the substrates can be sealed while maintaining the gap between electrodes. When a photocurable resin is used, the peripheries of the substrates can be sealed at lower temperature.

A liquid crystal display according to an eighth aspect of the present invention comprises a pair of substrates of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

In the liquid crystal display, substrates are joined with each other via spacers which have, before the substrates are superimposed on each other, a hardened portion and a semi-hardened portion in the plane to be brought into contact with the substrate, and the semi-hardened portion is hardened after superimposition of substrates. Spacers are disposed on one of the substrates before superimposition of substrates, and are formed to have hardened portion and semi-hardened portion in this state, and the semi-hardened portion is hardened after superimposition of substrates. Spacers which are first formed on one of the substrates (spacer-formed substrate) are already adhered to the spacer-formed substrate via the hardened portion, and are adhered to the spacer-formed substrate also via the semi-hardened portion by subsequent hardening of the semi-hardened portion. Spacers are adhered to the other substrate by the portion hardened after superimposition of substrates (semi-hardened portion before superimposition). In the present description, "hardened portion" and "semi-hardened portion" refer to the hardened portion and the semi-hardened portion before the superimposition of substrates.

In the liquid crystal display, because, before the substrates are superimposed, spacers have already hardened portion and semi-hardened portion in the plane to be brought into contact with the substrates, the following advantages are obtained. That is, when substrates are superimposed and spacers and sealing member for sealing the periphery of the substrates are hardened by application of heat and pressure, a hardened portion of spacers serves to maintain the sufficient strength so as not to deform under pressure, and semi-hardened portion develops adhesive capability to the substrates by hardening upon application of heat.

By using a photosensitive resin, spacers can be easily formed in accordance with a predetermined pattern by a photolithographic method, such that spacers are disposed at positions effective for maintaining a constant gap between the substrates excepting the pixel region of the liquid crystal display. The distance between the opposing substrates can be easily controlled by adjusting the film thickness of the photosensitive resin layer formed prior to patterning.

Negative type photosensitive resin can be used particularly effectively as the photosensitive resin. This is because, by controlling the amount of exposure, a negative type photosensitive resin permits a predetermined pattern with mixed hardened portion and semi-hardened portion to be easily formed. For example, at least one photosensitive resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials.

In the liquid crystal display, good display characteristics can be obtained if, in the plane of spacers to be brought into contact with the substrates, the proportion of the semi-hardened portion is 10–90% of the total of the hardened portion and semi-hardened portion combined. If the proportion of the semi-hardened portion is less than 10%, when the portion is hardened by heating, adhesive capability to the substrate is weak and the substrate gap changes under external pressure, giving rise to problems such as occurrence of interference fringes. If the proportion of the semi-hardened portion is more than 90%, a hardened portion is relatively small so that, when the substrates are superimposed and heat and pressure is applied, strength of spacers is insufficient and spacers may collapse and cannot maintain proper substrate gap, leading to deterioration of the quality of display.

Good display characteristics can be obtained when a spacer has the shape of a circle or a polygon as bottom surface at the contact plane with the substrate. This is because such a structure has same cross-sectional shape parallel to the substrate and does not deform unevenly under pressure from above and below the substrates, and hence, a gap can be controlled easily and fluctuation of gap is small.

Also, good display characteristics can be obtained when spacers are in hardened state in the outer portion and in semi-hardened state in the center portion in the contact plane with the substrate. This is because, by hardened outer wall of the spacer, deformation of inner unhardened portion can be prevented and a predetermined contact area with superimposed opposing substrate can be assured, and hence a predetermined adhesive capability can be assured.

Further, especially good display characteristics can be obtained if spacers have cross-sectional shape (shape of cross-section parallel to the substrate) in which hardened portion and semi-hardened portion are alternately arranged in concentric form. If the substrate gap is observed microscopically in the portion where the spacer is adhered to the substrate, the substrate gap is wide in the hardened portion of the spacer (where the spacer is adhered only to the substrate on which the spacer is formed before superimposition of substrates), and is narrow in the semi-hardened portion (where the spacer is adhered to both substrates by hardening of spacer resin material after superimposition of substrates). By concentric arrangement of hardened portion and semi-hardened portion, these are alternately arranged more closely to each other, and thus uniformity of the substrate gap can be improved. Preferably, each hardened portion and semi-hardened portion are formed in the shape of ring (the innermost portion is a circle), and arranged in the shape of concentric circles. An example of the spacer in such a shape of concentric circle is found in the spacer of triple circular section as described in Example 119. In this case, the outer ring portion and the central portion are hardened portions, and intermediate portion is a semi-hardened portion.

Spacers having hardened portion and semi-hardened portion before superimposition of the substrates can be formed by two-stage exposure of a negative type photosensitive resin to light. More specifically, a negative type photosensitive resin layer is formed on one of the substrates and, using a photomask having a pattern corresponding to the cross-sectional shape of spacers intended to be formed, the resin layer is exposed to light at 10–80% of total amount of exposure necessary for hardening of the photosensitive resin (primary exposure). Then, the photomask is replaced by one having a pattern corresponding to the portion of spacers to be completely hardened (in general, outer portion of the spacer cross-sectional shape), and the resin layer is exposed to light at the remaining amount (20–90%) of the total amount of exposure necessary for hardening of the photosensitive resin (secondary exposure) to completely harden the exposed portion of the resin layer. The sum of the amount of exposure irradiated to the portion to be completely hardened in the secondary exposure (amount of secondary exposure) and the amount of exposure irradiated in the primary exposure (amount of primary exposure) must be equal to or greater than the total amount of exposure necessary for hardening of the photosensitive resin. The amount of exposure in the primary exposure is 10–80% of the total amount of exposure necessary for complete hardening of the resin because, if this is less than 10%, hardening does not proceed substantially, and if this is more than 80%, the semi-hardened portion is too hard to obtain sufficient adhesive capability when heated in subsequent step.

Thus, the semi-hardened portion of a spacer corresponds to the portion with a smaller amount of exposure in the two stage exposure. Hardening proceeds halfway in this portion.

A photomask can be used in which light transmitting domains have varying light transmissivity from the outer portion toward the inner portion. By using such a photomask, a spacer can be formed which has hardened state varying continuously or in steps from the outer portion toward the inner portion in one stage of exposure. The spacer thus formed is also included in the spacer of the present invention which has hardened portion and semi-hardened portion.

Two substrates opposed to each other with spacers sandwiched therebetween are sealed at the periphery with liquid crystal filled inside. Usually, a resin material is used for this sealing, and the sealing function is fulfilled by heat curing of the resin. By using a heat curable resin which has heat curing temperature equal to or lower than the heat curing temperature of the resin for sealing periphery portion, as the photosensitive resin used for forming spacers, joining of two substrates by hardening of semi-hardened portion of spacers, and sealing of the periphery of the liquid crystal display, can be carried out in one step.

On a pair of substrates used in the liquid crystal display, transparent electrodes required for display operation of the liquid crystal display are provided, and an orientation film formed of resin is present on it. The surface of the orientation film has been subjected to rubbing treatment for orientating the liquid crystal molecules in a predetermined direction. When semi-hardened portion of spacers is hardened by heating after superimposition of substrates, it is important that the heating is performed at a temperature at which the effect of rubbing of the orientation film is not impaired. Also, as described above, the curing temperature of spacers is preferably equal to or lower than curing temperature of the resin for sealing periphery of the liquid crystal display. In general, after liquid crystal is sealed between the substrates, an annealing treatment for re-orientating liquid crystal is performed at about 110° C. Therefore, the curing temperature of the heat curable resin of spacers, and the curing temperature of the heat curable resin for sealing the periphery of substrates are desirably not lower than 110° C. As the effect of rubbing of the orientation film is lost at temperature of 150° C. or higher, heating at or above 150° C. should be avoided. Therefore, the curing temperature of the heat curable resin for spacers and for sealing the periphery of substrates, are preferably in the range of 110° C.–150° C.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferro-electric liquid crystal, anti-ferroelectric liquid crystal, twist grain boundary liquid crystal and smectic A phase liquid crystal exhibiting an electroclinic effect, can be used.

The liquid crystal display can be manufacture by forming spacers having hardened portion and semi-hardened portion in the plane to be brought in to contact with substrates on one of the substrates, and after superimposing this substrate to the other substrate, adhering spacers to the substrate by hardening the semi-hardened portion of spacers.

For filling liquid crystal into the substrate gap, vacuum method in which vacuum is used to fill and seal liquid crystal between substrates being opposed to each other in advance, and dropping method in which a predetermined volume of liquid crystal is dropped on one of the substrates and then the other substrate is superimposed on it, are representative methods. The liquid crystal display of the present invention can be manufactured in either method. For example, in dropping method, spacers are formed on one of a pair of substrates, and after liquid crystal is dropped on either one of the pair of substrates, two substrates are superimposed on each other, and by heating the superimposed substrates together with a member for sealing periphery of the substrates, spacers can be adhered to both substrates.

The liquid crystal display can be manufactured with no peripheral sealing or substantially no peripheral sealing (with sealing only in limited portion) for sealing between substrates, by attaching liquid crystal to all or a part of the portion of no or substantially no peripheral sealing, and then filling the liquid crystal between the substrates, and then sealing all the unsealed periphery with a sealing member. With this method, liquid crystal can be injected efficiently between substrates, leading to improvement of throughput, reduction of manufacturing cost, and improvement of product yield.

More specifically, the liquid crystal display can be manufactured, for example, with no or substantially no peripheral sealing for sealing between substrates, and after attaching liquid crystal to a part or all of the portion where no or substantially no peripheral sealing is performed, by filling liquid crystal between the substrates, and then sealing the entire unsealed peripheral portion with a sealing member. In this case, pressure difference or temperature difference, or both, before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it. Use of a dispenser permits liquid crystal to be attached quantitatively and easily.

In the present invention, either a heat curable resin or a photocurable resin may be used as the material for sealing periphery of substrates. When a heat curable resin is used, the curing temperature is chosen to be equal to or higher than the curing temperature of spacers which are hardened by heating and exhibit adhesive capability to both substrates. Thus, in a heating step, the spacers are hardened first to set the inter-electrode gap of the display region of the liquid crystal display, and periphery of the substrates can be sealed while the inter-electrode gap is maintained. When a photocurable resin is used, sealing between substrates can be performed at lower temperature.

A liquid crystal display according to a ninth aspect of the present invention comprises a pair of substrates which are held at a separation by spacers, and of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display is characterized in that the spacers disposed between the substrates contain an adhesive component, and thereby join the pair of substrates strongly and maintain the gap between the substrates uniform and constant.

The spacers can be formed using a photosensitive resin containing an adhesive component. A photosensitive resin permits a photolithographic method to be used for patterning, and spacers can be formed easily in accordance with a predetermined pattern. Thus, spacers can be disposed at positions effective for maintaining a constant gap between substrates excepting pixel region of the liquid crystal display. The distance between opposed substrates can be controlled easily by adjusting the film thickness of the photosensitive resin layer formed prior to patterning.

Both positive type and negative type photosensitive resin can be used as a photosensitive resin for forming spacers in the liquid crystal display. For example, at least one photosensitive resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials. When a positive type photosensitive resin is used, the exposed portion is decomposed and selectively removed by development processing. On the other hand, a negative type photosensitive resin is used, the exposed portion is solidified by induced cross-linking reaction or polymerization reaction, and unexposed portion is selectively removed by development processing.

An adhesive component is added to the spacer. The adhesive component may be a thermoplastic resin or a heat curable resin. Examples of thermoplastic resins that can be used in the spacer include general thermoplastic resin such as polyethylene, polyvinylterephthalate, polyester, polyvinyl chloride, polyvinyl acetate, epoxy, polycarbonate, styrene, nylon 6, etc., and mixture thereof. Heat curable resins which are soluble in solvent before curing and are hardened by heating can be used. Representative examples are phenol resin, epoxy resin, urea resin, melamine resin, polyimide resin, or silicone resin, etc., or mixture thereof.

The spacers are first formed on one of the substrates, and this substrate is superimposed to the other substrate and heated so that it is adhered to the other substrate while maintaining a constant gap between substrates so as to join a pair of substrates strongly. More specifically, spacers formed on one of the substrates are hardened (in the case of a negative type photosensitive resin, by exposure to light for patterning, and in the case of a positive type photosensitive resin, by post-baking after exposure to light) to exhibit strength. Then, by heating after superimposing the other substrate to this substrate, the adhesive component of the spacers is softened or hardened to develop adhesive capability so that a pair of substrates can be firmly joined while maintaining constant gap between substrates. Thus, if the adhesive component is a thermoplastic resin, the thermoplastic resin is softened by heating after superimposing the pair of substrates, and then is solidified again by cooling so that the spacers are adhered to the other substrate. If the adhesive component is a heat curable resin, the heat curable resin is hardened by heating after superimposing the pair of substrates so that the spacers are adhered to the other substrate.

The spacers in the liquid crystal display are formed on one of the substrates in advance, and are adhered to the other substrate by the adhesive component that is softened or hardened by heating after superimposing this substrate on the other substrate. In order to effectively achieve adherence to the other substrate, the adhesive component preferably forms a sea-island structure with the spacer main body as sea in the contact surface of the spacer with the other substrate. In order for the spacer main body and the adhesive component to form a sea-island structure, materials having no or little cosolubility are preferably used as the material for spacer main body and adhesive component. In this sense, when a negative type photosensitive resin is used as the material for spacer main body, a heat curable resin is advantageously used as the adhesive component, and when a positive type photosensitive resin is used as the material for spacer main body, a thermoplastic resin is advantageously used as the adhesive component.

The adhesive component is used, whether it is a heat curable resin or a thermoplastic resin, preferably in an amount of 0.5–20% of the mass of the photosensitive resin of the spacer. If it is less than 0.5%, adherence to the substrate may be insufficient, and if it is more than 20%, the adhesive component may spread out of the spacer region into the display electrode region when the spacer is adhered to the substrate, and may change the refractive index of the display electrode plane, causing deterioration of the quality of display.

When a thermoplastic resin is used as the adhesive component, the average molecular weight is preferably 500–10000. If the molecular weight is less than 500, the melting point of the thermoplastic resin is too low so that the resin may become molten state within the operating range of the liquid crystal display, and may degrade the display stability. If the molecular weight is more than 10000, the resin does not melt at temperature lower than the temperature at which the effect of rubbing of the orientation film is impaired.

On a pair of substrates used in the liquid crystal display, transparent electrodes required for display operation of the liquid crystal display are provided, and an orientation film formed of resin is present on it. The surface of the orientation film has been subjected to rubbing treatment for orientating the liquid crystal molecules in a predetermined direction. Generally, the effect of rubbing is lost at a temperature above 150–180° C. When spacers are adhered to the other substrate by heating after superimposition of substrates, it is important that the heating is performed at a temperature at which effect of rubbing of the orientation film is not impaired. Therefore, the softening temperature of thermoplastic resin or the curing temperature of heat curable resin of the adhesive component added to spacers is desirably 150° C. or lower. On the other hand, after liquid crystal is sealed between the substrates, an annealing treatment for re-orientating liquid crystal is performed generally at about 110° C. Therefore, the softening temperature or the curing temperature of the adhesive component of spacers needs to be 110° C. or higher. Thus, in general, the softening temperature or the curing temperature of the adhesive component of spacers is preferably in the range of 110° C.–150° C.

The opposing substrates with liquid crystal sealed therebetween are sealed at the periphery. Usually, resin material is used for this sealing, and the sealing function is fulfilled by hardening of the resin upon application of heat. In general, curing temperature of the sealant for sealing the periphery is preferably in the range of 110–150° C., in view of the above-mentioned anneal temperature for re-orientation of the liquid crystal and the temperature at which the effect of rubbing of an orientation film is lost. Generally, the curing temperature of the heat curable resin of the peripheral sealant may be equal to or higher than the softening temperature or the curing temperature of the resin used for spacers. Thus, in the heating step, the pillar-shaped spacers are first hardened to set the gap of the display electrodes of the liquid crystal display, and then, after opposing substrate is superimposed, the temperature is raised to temperature at which the thermoplastic resin or heat curable resin is softened or hardened to adhere the substrates to each other via spacers, and finally, substrates are sealed at the periphery by hardening of the heat curable resin while maintaining the gap between substrates.

A photocurable resin may also be used as the peripheral sealant. In this case, the periphery of the substrates can be sealed at lower temperature.

A material that hardens within 2 hours, if possible within 1 hour, may be used as the heat curable resin added as an adhesive component, and the heat curable resin for sealing the peripheries of the substrates.

The liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid-crystal and smectic A phase liquid crystal exhibiting an electroclinic effect, can be used.

The liquid crystal display can be manufactured by forming spacers containing an adhesive component on one of the substrates, and after superimposing the other substrate on this substrate, adhering the spacers to the other substrate via said adhesive component.

The spacers can be formed coating a solution of a photosensitive resin added with an adhesive component on one of the substrates to form a resin layer, and patterning the resin layer by exposure to light and development. When the photosensitive resin is of a negative type, it is hardened by exposure to light, and when the photosensitive resin is of a positive type, it is hardened by post-baking after exposure to light, thus giving a predetermined strength to spacers. Then, after the other substrate is superimposed on this substrate, heat and pressure is applied to soften or harden the adhesive component and to adhere the spacers to the other substrate. During this process, a constant gap between the substrates can be maintained by the spacers which have already acquired sufficient strength by hardening of the photosensitive resin.

Liquid crystal is filled in the gap between the substrates of the liquid crystal display. For filling liquid crystal into the substrate gap, a vacuum method in which vacuum is used to fill and seal liquid crystal between substrates being opposed to each other in advance, and a dropping method in which a predetermined volume of liquid crystal is dropped on one of the substrates and then the other substrate is superimposed on it, are representative methods. The liquid crystal display of the present invention can be manufactured by either method. For example, in dropping method, spacers are formed on one of a pair of substrates, and after liquid crystal is dropped on either one of the pair of substrates, two substrates are superimposed on each other, and by heating the superimposed substrates together with a member for sealing periphery of the substrates, spacers can be adhered to both substrates.

The liquid crystal display can be manufactured with no peripheral sealing or substantially no peripheral sealing (with sealing only in limited portion) for sealing between substrates, by attaching liquid crystal to all or a part of the portion of no or substantially no peripheral sealing, and then filling the liquid crystal between the substrates, and then sealing all the unsealed periphery with a sealing member. With this method, liquid crystal can be injected efficiently between substrates, leading to improvement of throughput, reduction of manufacturing cost, and improvement of product yield.

More specifically, the liquid crystal display of the present invention can be manufactured, for example, with no, or substantially no, peripheral sealing for sealing between substrates, and after attaching liquid crystal to a part or all of the portion where no or substantially no peripheral sealing is performed, by filling liquid crystal between the substrates, and then sealing the entire unsealed peripheral portion with a sealing member. In this case, pressure difference or temperature difference, or both, before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it. Use of a dispenser permits liquid crystal to be attached quantitatively and easily.

A liquid crystal display according to a tenth aspect of the present invention comprises a pair of substrates which are held at a separation by spacers, and of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display is characterized in that the spacers having photo-thermal conversion capability are adhered to at least one of the substrates having a thermoplastic orientation film formed thereon via the thermoplastic orientation film. The two substrates are thereby firmly joined with each other via spacers and the gap between the substrates is maintained uniform and constant.

The spacers used in the present invention and having photo-thermal conversion capability are formed from material consisting of base material composing spacers added with substance for giving photo-thermal conversion capability. As the base material composing the spacers, a photosensitive resin can be advantageously used in that a photolithographic method can be used for patterning to form spacers generally in the shape of pillar, for example, in the shape of cylinder, prism, etc., easily in a predetermined pattern. By using a photosensitive resin, spacers can be disposed at positions effective for a constant gap between substrates excepting the pixel region of the liquid crystal display, and the distance between the opposing substrates can be controlled easily by adjusting the film thickness of the photosensitive resin layer formed prior to patterning.

Various photosensitive resins of both positive type and negative type can be used as a photosensitive resin for forming spacers in the liquid crystal display. For example, at least one resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials.

As substance for giving photo-thermal conversion capability to the spacers in the present invention, substances such as carbon black, aminium compounds, diimonium compounds, vanadyl-naphthalocyanine, etc., which absorb infrared Light and convert it to heat can be used. Two or more photo-thermal conversion agents may be used in conjunction. Aminium compounds, diimonium compounds, and vanadyl-naphthalocyanine are expressed by following general formula (1), (2), and (3), respectively.

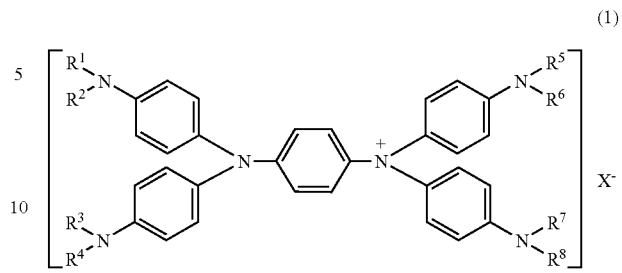

(In the above formula, each of $R^1$–$R^8$ represents hydrogen atom, halogen atom, alkyl group, aryl group, alkoxy group, nitro group, or carboxyl group, and $X^-$ represents an anion)

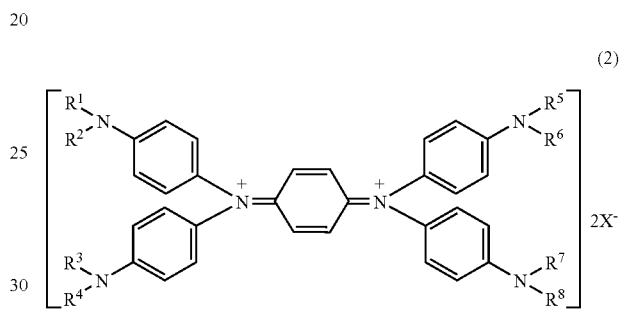

(In the above formula, each of $R^1$–$R^8$ represents hydrogen atom, halogen atom, alkyl group, aryl group, alkoxy group, nitro group, or carboxyl group, and $X^-$ represents an anion)

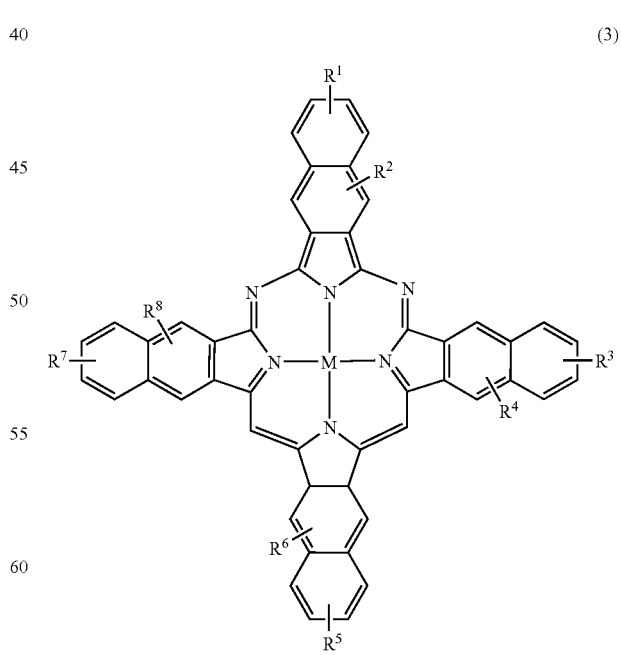

(Each of $R^1$–$R^8$ represents hydrogen atom, halogen atom, saturated or unsaturated hydrocarbon group of carbon number of 1–18, oxygen and/or nitrogen containing hydrocarbon of carbon number of 1–13, and M represents divalent metal, two hydrogen atoms, or an atomic group containing trivalent or quadrivalent atom combined with other atoms with total valence of 2)

Concentration of the substance giving photo-thermal conversion capability in the spacers is preferably 20 wt % or less of the base material such as the photosensitive resin. If this concentration of the substance giving photo-thermal conversion capability is more than 20 wt %, the heat generating efficiency of the substance becomes saturated and addition of the substance giving photo-thermal conversion capability does not improve the photo-thermal conversion efficiency. Solubility of the substance giving photo-thermal conversion capability in the resin is lowered. The lower bound of the concentration of the substance giving photo-thermal conversion capability can be suitably determined, depending upon the type of the substance giving photo-thermal conversion capability and base material used, as the minimum required amount for adhering spacers to the substrates.

The orientation film on at least one of the substrate used in the liquid crystal display is formed of a thermoplastic material. The orientation films on both substrates may be formed of a thermoplastic material. When the orientation film on only one of the substrates is formed of a thermoplastic material, the substrate must be the one on which spacers are not formed before the superimposition of a pair of substrates (the substrate to be brought into contact upon superimposition with the tip of spacers formed on the other substrate). This is because the spacers of the present invention having photo-thermal conversion capability generate heat upon irradiation with light after superimposition of the opposing substrates, and the tips soften the thermoplastic orientation film in contact with them. Spacers are adhered to the substrate via the orientation film which develops adhesive capability in this way.

As the material for the thermoplastic orientation film, various resins such as polyethylene, polyvinyl acetate, polyvinyl chloride, polyvinyl alcohol, polyvinylmethyl ketone, polyvinyl cinnamate, polystyrene, polybutylene terephthalate, polyethylene terephthalate, polyhexylene terephthalate, nylon 6, nylon 66, nylon 69, nylon 11, nylon 12, polyamide, polyester, polyimide, polymethyl methacrylate, polycarbonate, etc. Mixture of two or more of them may also be used.

In the liquid crystal display, spacers generate heat upon irradiation with light after the opposing substrates are superimposed, and tips of the spacers soften the thermoplastic orientation film only in the portion in contact with the tip. Therefore, the orientation film in the region outside this portion, that is, in the effective display region of the liquid crystal display is little, or not at all, affected by the heat of spacers. Thus, the softening temperature of the thermoplastic orientation film can be higher than that at which the orientation film is usually damaged by heat. However, if the softening temperature of the thermoplastic orientation film is excessively high, the orientation film around the portion in contact with spacers may be affected by heat. Therefore, in general, softening temperature of the thermoplastic orientation film is preferably 200° C. or lower.

The liquid crystal display can be manufactured by forming orientation films of which at least one is thermoplastic on a pair of substrates, respectively, forming spacers having photo-thermal conversion capability on one of the substrates, and after superimposing the substrate having spacers formed thereon on the substrate having a thermoplastic orientation film, irradiating the spacers with light to generate heat in the spacers, and adhering the spacers to the thermoplastic orientation film on the substrate.

In order to soften the thermoplastic orientation film, it is preferable to irradiate the spacers with light from the side of the orientation film to generate heat in spacers. Therefore, the thermoplastic orientation film to be adhered to spacers by heat generated upon irradiation with light is preferably formed on a transparent substrate.

The spacers can be hardened prior to superimposition of a pair of substrates. By using hardened spacers, the gap between superimposed substrates can be maintained constant. The hardened spacers formed on one of the substrates soften the thermoplastic orientation film by heat generated by the substance having photo-thermal conversion capability upon irradiation with light, and the spacers are adhered to the substrate via the softened orientation film. In this manner, the two substrates are firmly joined with each other while maintaining the constant gap between the substrates.

For filling liquid crystal into the substrate gap, vacuum method in which vacuum is used to fill and seal liquid crystal between substrates being opposed to each other in advance, and dropping method in which a predetermined volume of liquid crystal is dropped on one of the substrates and then the other substrate is superimposed on it, are representative methods. The liquid crystal display of the present invention can be manufactured in either method. For example, in a dropping method, said spacers are formed on one of a pair of substrates, and after liquid crystal is dropped on either one of the pair of substrates, two substrates are superimposed on each other, and spacers can be adhered to the orientation film on the other substrate by irradiation with light. Then, periphery of the opposed substrates is sealed to obtain the liquid crystal display.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

A liquid crystal display according to an eleventh aspect of the present invention comprises a pair of substrates which are held at a separation by spacers, and of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

The liquid crystal display is characterized in that spacers are adhered to one of a pair of substrates via an adhesive containing a photo-thermal heat generating agent. The two substrates are thereby firmly joined with each other via spacers and the gap between substrates is maintained uniform and constant.

As used herein, "photo-thermal heat generating agent" means a substance which can absorb light, change it to heat and deliver the heat to the outside, and "adhesive containing a photo-thermal heat generating agent" means an adhesive containing such a photo-thermal heat generating agent. Typically, an adhesive containing photo-thermal heat generating agent contains a photo-thermal heat generating agent component and a resin component as an adhesive base material.

Typical examples of the photo-thermal heat generating agent are substances such as carbon black, aminium compounds, diimonium compounds, vanadyl-naphthalocyanine, etc., which absorb infrared light and convert it to heat. Two or more photo-thermal heat generating agents may be used in conjunction. Aminium compounds, diimonium compounds, and vanadyl-naphthalocyanine are expressed by following general formula (4), (5), and (6), respectively.

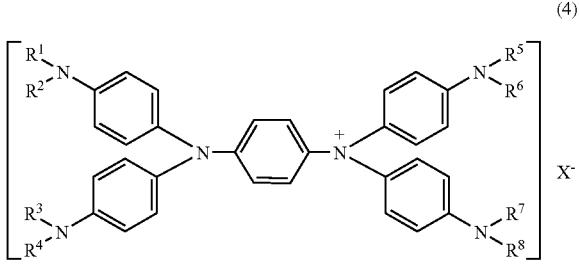

(4)

(In the above formula, each of R¹–R⁸ represents hydrogen atom, halogen atom, alkyl group, aryl group, alkoxy group, nitro group, or carboxyl group, and X⁻ represents an anion)

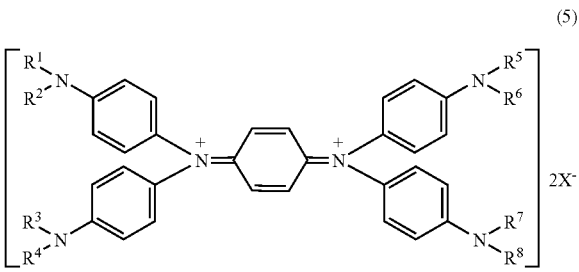

(5)

(In the above formula, each of R¹–R⁸ represents hydrogen atom, halogen atom, alkyl group, aryl group, alkoxy group, nitro group, or carboxyl group, and X⁻ represents an anion)

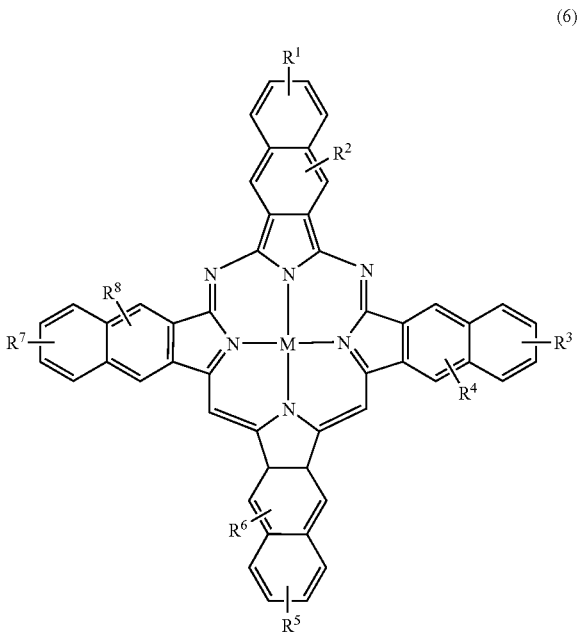

(6)

(Each of R¹–R⁸ represents hydrogen atom, halogen atom, saturated or unsaturated hydrocarbon group of carbon number of 1–18, oxygen and/or nitrogen containing hydrocarbon of carbon number of 1–13, and M represents divalent metal, two hydrogen atoms, or an atomic group containing trivalent or quadrivalent atom combined with other atoms with total valence of 2)

In order to compose an adhesive containing a photo-thermal heat generating agent, the photo-thermal heat generating agent is dispersed in base material such as general thermoplastic resin or heat curable resin used as an adhesive. In the present invention, as a base thermoplastic resin, general thermoplastic resin such as polyethylene, polyvinyl-terephthalate, polyester, polyvinyl chloride, polyvinyl acetate, epoxy, polycarbonate, styrene, nylon 6, etc., can be used. As a heat curable resin, phenol resin, urea resin, melamine resin, epoxy resin, alkyd resin, unsaturated polyester resin, diallylphthalate resin, etc., can be used. These base resins are preferably soluble in solvent or are liquid before hardening in order to facilitate disposing the adhesive containing a photo-thermal heat generating agent on top of spacers.

Concentration of the photo-thermal heat generating agent in the adhesive containing the photo-thermal heat generating agent is preferably 20 wt % or less of the resin adhesive as the base material. If this concentration of the photo-thermal heat generating agent is more than 20 wt %, heat generating efficiency of the photo-thermal heat generating agent becomes saturated and further addition of the photo-thermal heat generating agent does not improve the photo-thermal conversion efficiency. Solubility of the photo-thermal heat generating agent in the resin is also lowered. On the other hand, a lower bound of the content of the photo-thermal heat generating agent can be suitably determined, depending upon the type of the photo-thermal heat generating agent and resin base material used, as the minimum required amount for adhering spacers to the substrates.

The adhesive containing the photo-thermal heat generating agent is placed on top of spacers such that the thickness of the layer is 10% or less of the height of spacers. If the adhesive is present on top of spacers in thickness more than 10% of the height of spacers, the resin melted by the photo-thermal melting flows out to electrode region or to the bottom of spacers, leading to undesirable deterioration of display quality.

The spacers of the liquid crystal display are formed generally in the shape of pillars, for example, in the shape of cylinders, prisms, or the like, on one of the substrates, with the adhesive containing photo-thermal heat generating agent disposed at the top (upper end portion). A photolithographic method can be used to form such pillar-shaped spacers by patterning, and a photosensitive resin can be advantageously used to form spacers in accordance with a predetermined pattern. When a photosensitive resin is used, spacers can be arranged at positions effective for maintaining a constant gap between the substrate excepting pixel region of the liquid crystal display, and distance between opposing substrates can be easily controlled by adjusting the film thickness of the photosensitive resin layer formed prior to patterning.

Various photosensitive resins of positive type and negative type can be used as the photosensitive resin for forming spacers. For example, at least one resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials.

The liquid crystal display can be manufactured by forming spacers on one of the substrates, attaching the adhesive containing the photo-thermal heat generating agent, and after superimposing the other substrate on this substrate, irradiating with light from the side of the other substrate to thereby generate heat from the photo-thermal heat generating agent, and adhering the spacers to the other substrate via the adhesive using the generated heat.

The method for attaching the adhesive containing the photo-thermal heat generating agent on top of spacers formed on one of the substrates is not particularly restricted, and for example, a printing method can be used. In particular, multi-stage roller type printing method used in offset printing, etc., can be advantageously used. With this method, the thickness of the adhesive layer attached on top of spacers can be easily controlled and continuous processing is possible.

In order to soften or harden the resin base material in the adhesive, the photo-thermal heat generating agent in the adhesive on top of spacers absorbs the light irradiated through the other substrate (the substrate having spacers formed thereon in advance) with the pair of substrates superimposed to each other, and generates heat. Therefore, the substrate through which the adhesive is irradiated with light must be transparent.

The spacers used in the liquid crystal display can be hardened before the adhesive containing the photo-thermal heat generating agent is attached. By using such spacers, the gap between the superimposed substrates can be maintained constant. The hardened spacers formed on one of the substrates, can be firmly adhered to the other substrate by the adhesive containing the photo-thermal heat generating agent on top of the spacers. Thus, two substrates can be firmly joined with each other while maintaining the gap between substrates constant.

In the liquid crystal display, when a pair of substrates are joined, only the temperature of the adhesive containing the photo-thermal heat generating agent which absorbs light and generates heat is raised, and the temperature of other material does not substantially change. Therefore, two substrates can be joined, without being damaged due to heat, to the orientation film.

For filling liquid crystal into the substrate gap, a vacuum method in which vacuum is used to fill and seal the liquid crystal between substrates being opposed to each other in advance, and a dropping method in which a predetermined volume of liquid crystal is dropped on one of the substrates and then the other substrate is superimposed on it, are representative methods. The liquid crystal display of the present invention can be manufactured in either method. For example, in dropping method, spacers are formed on one of a pair of substrates, and after liquid crystal is dropped on either one of the pair of substrates, two substrates are superimposed on each other, and spacers can be adhered to the other substrate by irradiation with light. Then, the periphery of the opposing substrates is sealed to obtain the liquid crystal display.

Liquid crystal used in the liquid crystal display is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

A liquid crystal display manufactured by a method according to a twelfth aspect of the present invention comprises a pair of substrates of which at least one is transparent, and liquid crystal is sealed between the substrates. Electrodes are formed on opposed surfaces of both substrates, and an orientation film is formed on each electrode for regulating orientation of the liquid crystal molecules. Electrodes need to be transparent only on the transparent substrate, but may be formed as transparent electrodes on both substrates. In the description that follows, it is assumed that transparent electrodes are present on both substrates.

In the liquid crystal display manufactured by the method according to the twelfth aspect of the present invention, the two substrates are joined via spacers formed on one substrate prior to the superimposition of the two substrates, spacers having different degree of hardening in the direction perpendicular to the one substrate and having the lowest degree of hardening at the tip portion opposite to the side adhered to the one substrate, wherein the tip portion of spacers in the lowest degree of hardening is hardened after superimposition of the substrates to each other, and is thereby adhered to the other substrate so as to join two substrates.

Adhesive capability to the substrate is required only for the tip portion of spacers to be brought into contact with the substrate, and high hardness for withstanding pressure is required for the portion other than the tip portion. According to the present invention, by using spacers formed on one substrate such that spacers have different degree of hardening in the direction perpendicular to the one substrate before superimposition of two substrates with the lowest degree of hardening at the tip portion opposite to the side already adhered to the one substrate. Thus, the spacers have the structure consisting of a portion having high strength with high degree of hardening and a portion with low degree of hardening which develops adhesive capability upon subsequent hardening, so that, when the substrates are superimposed and spacers are hardened by application of heat and pressure, spacers can maintain sufficient strength with the highly hardened portion not to deform under pressure and adhesive capability to the other substrate of the superimposed substrates by further hardening of the spacer tip portion with low degree of hardening.

On the other hand, the inventors have found that the debris of spacers produced during rubbing treatment of the orientation film is mainly produced from the tip portion of spacers, and the higher the degree of hardening of spacers, the more debris is produced. With the spacer according to the twelfth aspect of the present invention, when spacers are disposed on one substrate (rubbing of the orientation film is performed in this state), the degree of hardening of the tip portion is low and, as the tip portion of spacers is soft, production of the debris of spacers can be effectively avoided.

The spacer may have, before superimposition of the substrates, different degree of hardening not only in the direction perpendicular to the surface of the substrate on which spacers are disposed, but also in a direction parallel to the substrate. When a spacer has different degree of hardening in a direction parallel to the substrate, the spacer has preferably the highest degree of hardening in the outer peripheral portion. With higher degree of hardening in the outer peripheral portion, a stronger spacer can be formed with increased strength in this portion. When strength of the outer peripheral portion of a spacer is low, the substrates are supported only by the center portion of a spacer, and outer peripheral portion may not come into contact with the substrate, leading to failure of adherence to the substrate.

The spacers can be formed from a photosensitive resin. With a photosensitive resin, a photolithographic method can be used to form spacers easily in accordance with a predetermined pattern, and spacers can be disposed at positions effective for maintaining a constant gap between the substrates excepting pixel region of the liquid crystal display. Also, the distance between the opposing substrates can be controlled easily by adjusting the film thickness of the photosensitive resin layer formed prior to patterning.

As the photosensitive resin, a negative type photosensitive resin can be used particularly effectively, because the degree of hardening of a negative type photosensitive resin can be easily changed by controlling the amount of exposure. For example, at least one resin selected from the group consisting of polyimide, polyamide, polyvinyl alcohol, polyacrylamide, cyclized rubber, novolac resin, polyester, polyurethane, acrylate resin, bisphenol resin, or gelatin made to be a photosensitive resin, can be used. The resins listed above are commercially available as general resist materials.

In order to use a negative type photosensitive resin to form spacers having different degrees of hardening in the direction perpendicular to the surface of the substrate, a back exposure method can be used. With this method, light absorbed by the photosensitive resin is used to expose the photosensitive resin using a photomask in a predetermined pattern from the back surface of the substrate having the photosensitive resin layer formed thereon. By exposing the photosensitive resin to light from the back surface of the substrate, the resin closer to the substrate absorbs more light, so that the degree of hardening of the resin is higher near the substrate, and becomes lower as the resin is farther away from the substrate. Distribution of the degree of hardening can be controlled easily by adjusting the condition of exposure.

On the other hand, a spacer which has different degree of hardening not only in the direction perpendicular to the surface of the substrate but also in the direction parallel to the substrate can be formed using, in the back exposure, a photomask of which the light-transmitting portion has light transmissivity that varies from the outer portion to the inner portion.

Two substrates opposed to each other with spacers sandwiched therebetween are sealed at the periphery with liquid crystal filled inside. Usually, a resin material is used for this sealing, and the sealing function is fulfilled by heat curing of the resin. By using a heat curable resin which has heat curing temperature equal to or lower than the heat curing temperature of the resin for sealing peripheral portion, as the photosensitive resin used for forming spacers, joining of two substrates, by complete hardening of the photosensitive resin of spacers and sealing of the periphery of the liquid crystal display, can be carried out in one step.

On a pair of substrates used in the liquid crystal display manufactured by the method of the present invention, transparent electrodes required for display operation of the liquid crystal display are provided, and an orientation film formed of resin is present on it. The surface of the orientation film has been subjected to rubbing treatment for orientating the liquid crystal molecules in a predetermined direction. When spacers are completely hardened by heating after superimposition of substrates, it is important that the heating is performed at a temperature at which effect of rubbing of the orientation film is not impaired. Also, as described above, the curing temperature of the spacers is preferably equal to or lower than curing temperature of the resin for sealing periphery of the liquid crystal display. In general, after liquid crystal is sealed between the substrates, an annealing treatment for re-orientating liquid crystal is performed at about 110° C. Therefore, the curing temperature of the heat curable resin of spacers, and the curing temperature of the heat curable resin for sealing the periphery of substrates are desirably not lower than 110° C. As the effect of rubbing of the orientation film is lost at a temperature above 150° C., heating at temperature above 150° C. should be avoided. Therefore, the curing temperature of the heat curable resin for spacers and for sealing the periphery of substrates, is preferably in the range of 110° C.–150° C.

Liquid crystal used in the liquid crystal display manufactured by the method of the present invention is not particularly restricted, and any known liquid crystal such as twisted nematic type liquid crystal, super-twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal and smectic A phase liquid crystal exhibiting an electroclinic effect, can be used.

For filling liquid crystal into the substrate gap, a vacuum method in which vacuum is used to fill and seal the liquid crystal between substrates opposed to each other in advance, and dropping method in which a predetermined volume of liquid crystal is dropped on one of the substrates and then the other substrate is superimposed on it, are representative methods. The liquid crystal display of the present invention can be manufactured by either method. For example, in a dropping method, spacers are formed on one substrate, and after liquid crystal is dropped on either one of the pair of substrates, two substrates are superimposed on each other, and spacers can be adhered to both substrates by heating in conjunction with the sealing member for peripheral sealing of substrates.

The liquid crystal display can be manufactured with no peripheral sealing or substantially no peripheral sealing (with sealing only in limited portion) for sealing between substrates, by attaching liquid crystal to all or a part of the portion of no or substantially no peripheral sealing, and then filling the liquid crystal between the substrates, and then sealing all the unsealed periphery with a sealing member. With this method, liquid crystal can be injected efficiently between substrates, leading to improvement of throughput, reduction of manufacturing cost, and improvement of product yield.

More specifically, the liquid crystal display can be obtained after spacers are formed on one of the substrates, for example, by combining the pair of substrates with no, or substantially no, peripheral sealing for sealing between substrates, and after attaching liquid crystal to a part or all of the portion where no, or substantially no, peripheral sealing is performed, by filling liquid crystal between the substrates, and then sealing the entire unsealed peripheral portion with a sealing member. In this case, a pressure difference or a temperature difference, or both, before and after the attachment of liquid crystal to the substrates, may be used to fill liquid crystal between the substrates. Liquid crystal can be thereby filled into the gap between the substrates in a shorter time. A dispenser can be used to drop liquid crystal to the portion to attach it. Use of a dispenser permits liquid crystal to be attached quantitatively and easily.

Either a heat curable resin or a photocurable resin may be used as the material for peripheral sealing of substrates. When a heat curable resin is used, the curing temperature of the resin is chosen to be equal to or higher than the curing temperature of spacers that are hardened to exhibit adhesive capability to both substrates by heating, so that, in a heating step, spacers are first hardened to set the gap between electrodes in the display region of the liquid crystal display, and then the periphery of the substrates is sealed while the gap between electrodes is maintained. When a photocurable resin is used, the periphery of the substrates can be sealed at a lower temperature.

EXAMPLES

Specific examples of the present invention will be described in the following. It is to be understood that the present invention is by no means limited to these examples.

Liquid crystal panels according to examples of the first aspect of the present invention were actually manufactured, and the result of examination of display quality when subjected to an external pressure is described below in comparison with comparative examples.

Example 1

Two glass substrates of 200 mm in length, 100 mm in width, and 1.1 mm in thickness were provided. An ITO film was formed on one surface of each glass substrate as a transparent electrode.

Next, after a spin coater was used to apply polyimide solution of 3 wt % in concentration on the transparent electrode at a rotation speed of 2,000 rpm to form polyimide film, the polyimide film was baked at 200° C. for 30 minutes to obtain an orientation film.

On one of two glass substrates on which the transparent electrode and the orientation film were thus formed, a spin coater was used to apply positive type polysilane resist to form a resist film of 2.0 μm in thickness.

Then, the glass substrate was placed on a hot plate for prebaking the resist film at 100° C. for 1 minute. Thereafter, the resist film was exposed to UV via a photomask provided with a predetermined pattern at energy of 800 mJ/cm$^2$, and then development processing was performed with alkaline developing solution (TMAH, 2.38%) to obtain spacers in the shape of cylinder of 10 μm in diameter arranged at a pitch of 100 μm in lateral direction and longitudinal direction. Then, after the surface of the glass substrate was washed with pure water, the glass substrate was heated on a hot plate at 130° C. for 1 minute and dried.

Next, the orientation film on both glass substrates was subjected to rubbing treatment. Then, using epoxy resin as a sealant, a printing method was used to apply the sealant on one of the glass substrates. The sealant was applied in the shape of frame along the peripheral edge of the glass substrate except a portion to form a liquid crystal injection port. The epoxy resin used as the sealant is hardened when heated at 150° C. for 1 hour.

Then, the spacers were re-exposed to UV, at an energy of 100 mJ/cm$^2$, to photo-decompose the resist composing the spacers.

It had been confirmed in advance that, when the polysilane resin used as the resist is re-exposed to light under above-described conditions, average molecular weight is reduced by about 30%. It has also been confirmed as a result of an IR (infrared) spectroscopic measurement that silanol is increased in the resist after re-exposure.

Next, the pair of glass substrates were stuck such that the transparent electrodes face each other, and placed in a vacuum bag. Then, the epoxy resin as the sealant was hardened by heating at 150° C. for 1 hour. By this heating, the spacers were first softened to join with the substrate, and then were hardened while being joined with substrates.

A ferroelectric liquid crystal was injected using vacuum injection method between the pair of substrates joined by the sealant spacers (empty panel), and the liquid crystal injecting port was sealed to obtain a ferroelectric liquid crystal display panel.

Polarizing plates were disposed above and beneath the liquid crystal display panel, respectively. The polarizing plates were disposed with polarization axis perpendicular to each other (cross nicol).

Then, using a pen with tip diameter of 0.8 mm, the center of the liquid crystal display panel was depressed with a pen-load of 100 g. However, a change of display color was not observed around the pen tip, suggesting stress resistance against the external force to reduce the cell gap.

Then, the liquid crystal display panel was supported at the center and load of 300 g was applied on the two ends. However, change of display color over the entire screen was not observed.

Example 2

A liquid crystal display panel was manufactured under same conditions as in example 1, except that, as a resist, a positive type novolac resist was used, the energy of UV exposure for forming spacers was 50 mJ/cm$^2$, and the energy of UV re-exposure was 30 mJ/cm$^2$.

This liquid display panel was tested in the same way as in example 1. It was confirmed that the panel has same good resistance, to stress, as example 1.

Example 3

A liquid crystal display panel was manufactured under same conditions as in example 1, except that, as a positive type photoresist for forming spacers, a photoresist of polysilane which has phenyl group, as an aryl group, introduced into the side chain was used.

This liquid display panel was tested in the same way as in example 1. It was confirmed that the panel has same good resistance to stress as example 1.

Example 4

A liquid crystal display panel was manufactured under same conditions as in example 1, except that twisted nematic type liquid crystal was used as the liquid crystal sealed between the substrates and the cell gap was 6 μm.

This liquid display panel was tested in the same way as in example 1. It was confirmed that the panel has same good resistance to stress as example 1.

Example 5

A liquid crystal display panel was manufactured under same conditions as in example 1, except that super twisted nematic type liquid crystal was used as the liquid crystal sealed between the substrates and the cell gap was 6 μm.

This liquid display panel was tested in the same way as in example 1. It was confirmed that the panel has same good resistance to stress as example 1.

Example 6

A liquid crystal display panel was manufactured under same conditions as in example 1, except that nematic cholesteric phase transition type liquid crystal was used as the liquid crystal sealed between the substrates and the cell gap was 6 μm.

This liquid display panel was tested in the same way as in example 1. It was confirmed that the panel has same good resistance to stress as example 1.

Example 7

A liquid crystal display panel was manufactured under same conditions as in example 1, except that ferroelectric liquid crystal was used as the liquid crystal sealed between the substrates.

This liquid display panel was tested in the same way as in example 1. It was confirmed that the panel has same good resistance to stress as example 1.

Example 8

A liquid crystal display panel was manufactured under same conditions as in example 1, except that twist grain boundary liquid crystal was used as the liquid crystal sealed between the substrates and the cell gap was 6 μm.

This liquid display panel was tested in the same way as in example 1. It was confirmed that the panel has same good resistance to stress as example 1.

Example 9

A liquid crystal display panel was manufactured under same conditions as in example 1, except that smectic A phase liquid crystal was used as the liquid crystal sealed between the substrates and the cell gap was 6 μm.

This liquid display panel was tested in the same way as in example 1. It was confirmed that the panel has same good resistance to stress as example 1.

Example 10

Figure 6:
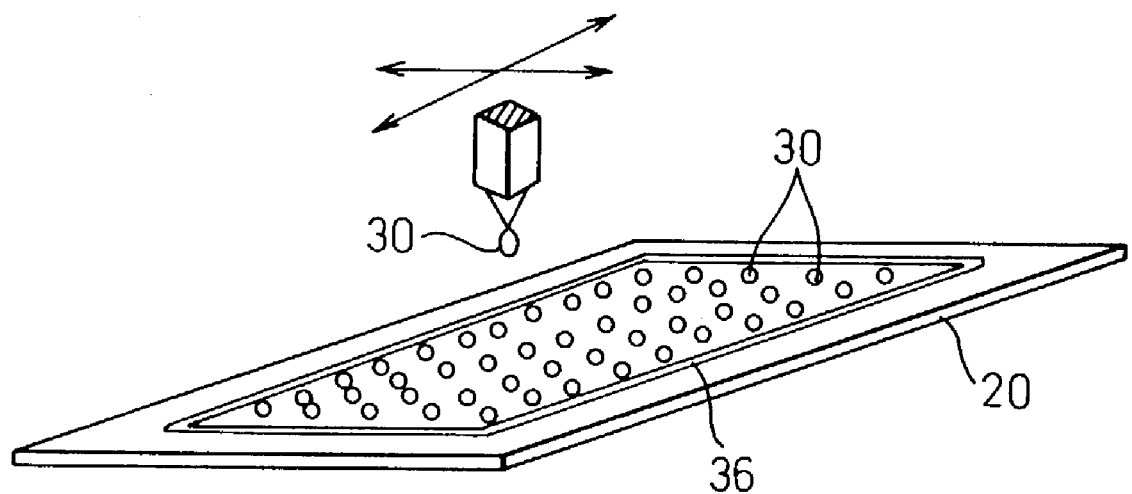
FIG. 6 is a schematic view showing a dropping injection method.
Figure 7:
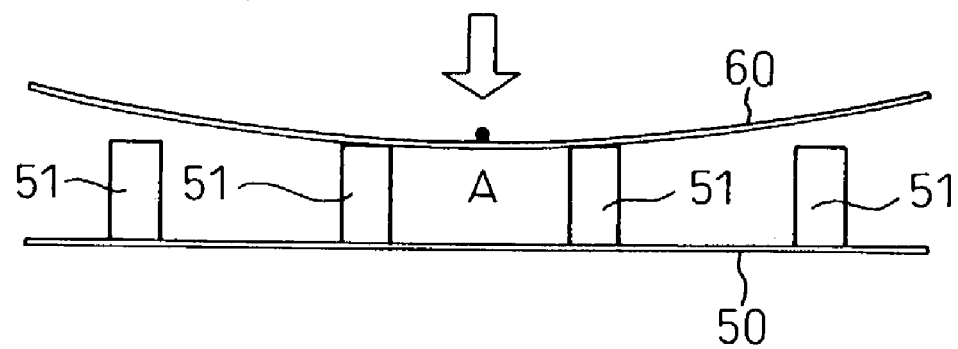
FIG. 7 is a schematic view showing a change of cell gap when an external pressure is applied to the liquid crystal panel according to a prior art.

A liquid crystal display panel was manufactured under same conditions as in example 1, except that dropping injection method was used to inject liquid crystal between the substrates. As shown in FIG. 6, a sealant 36 was applied on a TFT substrate 20 having spacers formed thereon so as to surround the display region. Then, a dispenser was used to drop ferroelectric liquid crystal 30 on the TFT substrate 20. The amount of liquid crystal 30 to be dropped was determined in accordance with the size of the panel and the cell gap, and the liquid crystal 30 was dropped so as to be distributed over the TFT substrate 20. Then, an opposing substrate (not shown) was superimposed on the TFT substrate 20, and the sealant 36 was hardened by application of heat.

The liquid display panel was tested in the same way as in example 1. It was confirmed that the panel has same good resistance to stress as example 1. As a dropping injection method was used to seal liquid crystal between the substrates, time required for the manufacture was greatly reduced as compared to example 1.

Comparative Example 1

A liquid crystal display panel was manufactured under same conditions as in example 1, except that, after being subjected to rubbing treatment, spacers were not re-exposed to light.

This liquid display panel was tested in the same way as in example 1. As a result, a display failure was found in that, when center of the was depressed under a pen-load of 100 g using a pen with tip diameter of 0.8 mm, change of display color was observed around the pen tip, suggesting that the spacers were not joined with one substrate.

Comparative Example 2

A liquid crystal display panel was manufactured under same conditions as in example 1, except that a negative type polysilane resist was used in place of a positive type polysilane resist.

This liquid display panel was tested in the same way as in example 1. As a result, a display failure was found in that, when center of the was depressed under a pen-load of 100 g using a pen with tip diameter of 0.8 mm, change of display color was observed around the pen tip, suggesting that the spacers were not joined with one substrate.

As has been explained above, in the liquid crystal panel according to the first aspect of the present invention, spacers are joined with both of a pair of substrates, so that, even if external pressure is applied to the liquid crystal panel, the substrates do not separate from the spacers and large change of the cell gap (distance between substrates) can be avoided. Occurrence of interference fringes, fluctuation of color tone and fluctuation of drive voltage characteristics can be thereby avoided.

According to the manufacturing method of the liquid crystal panel according to the first aspect of the present invention, spacers are formed using a positive type photosensitive resin, and after re-exposure to light, the first substrate and the second substrate are superimposed, so that spacers can be firmly joined with both the first and the second substrates. Thus, even if external pressure is applied, a large change of the cell gap can be avoided, and an occurrence of interference fringes, fluctuation of color tone and fluctuation of drive voltage characteristics can be thereby avoided.

Next, examples of liquid crystal display according to the second aspect of the present invention will be described.

Example 11

Polyimide solution was applied by spin coating method to two glass substrates of 200×100 mm in size and 1.1 mm in thickness having transparent electrodes thereon. Polyimide solution (concentration of 3% by mass, manufactured by Nippon Shokubai Co.) was used, and was applied at rotation speed of 2000 rpm. Then, baking was performed at 200° C. for 30 minutes to obtain the orientation film of 100 nm in thickness. This orientation film was subjected to rubbing treatment by a known method.

Next, on the orientation film on one of the glass substrates, a positive type photoresist (Trade name; AZ-5200; manufactured by Clariant Co.) for forming a hard resin layer was applied, by a spin coating method, to a thickness set at 1 μm to form a resist film. Prebaking was performed in a clean oven at 100° C. for 1 minute to evaporate the residual solvent in the resist. Then, a positive type photoresist (Trade name; Glasia; manufactured by Nippon Paint Co.) for forming a soft resin layer was applied by spin coating method in thickness set at 1 μm. Prebaking was performed as described above, and then the same positive type photoresist (Trade name; AZ-5200; manufactured by Clariant Co.) for forming a hard resin layer as described above was applied by spin coating method in thickness set at 1 μm. A photoresist laminate of 3 μm in thickness with three-layer laminate structure of hard resin layer/soft resin layer/hard resin layer was thus formed.

Then, the substrate was exposed to UV light using a mask for forming cylinder-shaped spacers of 10 μm in diameter arranged at interval of 100 μm, and was developed. The surface of the substrate was washed with pure water and dried to obtain pillar-shaped spacers of 3 μm in height.

An epoxy resin as a sealant (Trade name; KAYATORON; manufactured by Nippon Kayaku Co.) was applied to the glass substrate having the cylinder-shaped spacers formed thereon using printing method to 5 μm in thickness. The portion of the liquid crystal injection port was left unapplied. The pair of glass substrates was aligned in the corresponding portion of transparent electrodes and stuck to each other, and was placed in a vacuum bag and was evacuated and heated at 150° C. for 1 hour. The spacers were adhered to the stuck substrate, and the epoxy resin as the sealant was hardened. The substrate gap was determined by measurement to be 1.5 μm.

A ferroelectric liquid crystal was injected by the method as described above through the liquid crystal injection port into the empty panel thus obtained, and the liquid injection port was sealed. A liquid crystal display of the present example was thus completed.

The liquid crystal display of the present example was inserted between two polarizer plates in the cross nicol state, and when the center of the liquid crystal display was depressed using a ball-pen with ball diameter of 0.8 mm vertically with a force of 0.98 N (100 gf), no change in the brightness was observed around the pen tip. Thus, it has been found that the display has stress resistance against an external force to reduce thickness of the liquid crystal layer. This liquid crystal display was in the normally white state.

Further, the liquid crystal display of the present example was supported and fixed at the center, and when the peripheral portion was pushed vertically using the above-mentioned ball pen with a force of 2.94 N (300 gf), no change of brightness was observed.

Further, after the liquid crystal display of the present example was left in an environment of −40° C. for 1 hour, the two tests as described above were conducted. No change of brightness was observed in either of the two tests. No change was observed in display quality, either, and followability of the display to the volumetric change due to thermal contraction of the liquid crystal was confirmed.

With the liquid crystal display of the present example, the Young's modulus of the spacer having 3-layer structure was measured before glass substrates were stuck together when heated in the same heating condition of the liquid crystal display of the present example, that is, at 150° C. for 1 hour. Young's modulus was $9 \times 10^{-1}$ MPa $-9 \times 10^{-3}$ MPa in the temperature range of 25° C.–120° C. Measurement was conducted using Thermal Analysis Rheology System (Trade Name; EXSTAR6000; manufactured by Seiko Instruments Co.), under the measurement condition of temperature rise rate at 10° C./min from 25° C. and at frequency of 10 Hz, and storage modulus was determined and the Young's modulus was calculated from the value.

Example 12

In the example 12 as compared to example 11, a liquid crystal display was manufactured in the same way as in example 11, except that a solder resist (Trade name; SK-66; manufactured by Shin-Etsu Silicone Co.) was used as the positive type photoresist for forming the soft resin layer.

When same tests were conducted as in example 11, same results were obtained as in example 11, and good results were obtained.

Examples 13–18

A liquid crystal display was manufactured in examples 13–18 in the same way as in example 11, except that, as compared to example 11, the liquid crystal was replaced by twisted nematic (TN) type liquid crystal (example 13), super twisted nematic (STN) type liquid crystal (example 14), nematic cholesteric type liquid crystal (example 15), anti-ferroelectric liquid crystal (example 16), twist grain boundary type liquid crystal (example 17), smectic A phase (example 18), respectively.

When the same tests were conducted as in example 11, in all of examples 13–18, the same results were obtained as in example 11, and good results were obtained.

Example 19

A liquid crystal display was manufactured in example 19 in the same way as in example 11, except that in example 19 as compared to example 11, the photoresist was a 2-layer structure in which the first layer was a soft resin layer (Glasia; manufactured by Nippon Paint Co.) and the second layer was a hard resin layer (AZ-5200; manufactured by Clariant Co.) with thicknesses of 4.75 μm and 0.25 μm, respectively.

When the same tests were conducted as in example 11, the same results were obtained as in example 11, and good results were obtained.

Example 20

A liquid crystal display was manufactured in example 20 in the same way as in example 11, except that, in example 20 as compared to example 11, total thickness of 3-layer photoresist was 5 μm and layer thickness of the hard resin layer/soft resin layer/hard resin layer was 2 μm/0.25 μm/2.75 μm.

When same tests were conducted as in example 11, same results were obtained as in example 11, and good results were obtained.

Examples 21–28

A liquid crystal display was manufactured in examples 21–28 in the same way as in example 11–18, except that, in examples 21–28 as compared to examples 11–18, total thickness of 3-layer photoresist was 6 μm and layer thickness of each layer was 2 μm.

When the same tests were conducted as in example 11, in all of examples 21–28, the same results were obtained as in example 11, and good results were obtained.

Example 29

A liquid crystal display was manufactured in the same way as in example 11, except that, in example 29 as compared to example 11, as the method for injecting liquid crystal, a dropping method was used in place of vacuum injection method and a dispenser was used to supply liquid crystal to the glass substrate.

In the dropping method, before the glass substrates were stuck together, epoxy resin as a sealant was applied by printing method to one substrate to 3 μm in thickness, and then a dispenser was used to drop ferroelectric liquid crystal. Subsequent steps were conducted in the same way as in example 11 to obtain a liquid crystal display.

When the same tests were conducted as in example 11, the same results were obtained as in example 11, and good results were obtained.

Comparative Example 3

A liquid crystal display was manufactured in the same way as in example 11, except that, as in comparative example 3 not using the present invention, as compared to example 11, spacers were composed only of hard resin layer, and soft resin layer was not provided.

In the spacers, the thickness of hard resin layer was set to 3 μm, and the substrate gap after substrates were stuck together was 1.5 μm. The spacers were composed only of hard resin layer. Tests were conducted in the same way as in example 11.

The liquid crystal display of the present comparative example was inserted between two polarizer plates in the cross nicol state, and when the center of the liquid crystal display was depressed using a ball-pen with ball diameter of 0.8 mm vertically with a force of 0.98 N (100 gf), no change in the brightness was observed around the pen tip. Thus, it has been found that the display has stress resistance against an external force to reduce thickness of the liquid crystal layer.

Further, the liquid crystal display of the present comparative example was supported and fixed at the center, and when the peripheral portion was pushed vertically using the above-mentioned ball pen with a force of 2.94 N (300 gf), no change of brightness was observed.

Further, after the liquid crystal display of the present comparative example was left in an environment of –40° C. for 1 hour, the two tests as described above were conducted. A change in brightness was observed in both tests. Disturbance of liquid crystal layer and degradation of display quality were observed. This is considered to be caused by inability of the liquid crystal panel to follow the volumetric change when the volume of the liquid crystal changed due to the thermal environment.

With the liquid crystal display of the present comparative example, the Young's modulus of the spacer having 1-layer structure was measured before the glass substrates were stuck together when heated in the same heating condition of the liquid crystal display of the present comparative example, that is, at 150° C. for 1 hour. The Young's modulus was 5 MPa –2 MPa in the temperature range of 25° C.–120° C.

Comparative Example 4

A liquid crystal display was manufactured in the same way as in example 11, except that, as in comparative example 4 not using the present invention as compared to example 11, the heating temperature for hardening the sealant was 190° C.

In the liquid crystal display of the present comparative example, disturbance of orientation was observed, and degradation of display quality was found. This is considered to be caused by the high heating temperature leading to partial loss of the effect of rubbing of the orientation film.

A liquid crystal display according to the second aspect of the present invention has been described with reference to an example in which a hard resin layer 16A (FIG. 8) is adhered to the orientation film 112 on a substrate. However, a liquid crystal display may be constructed such that a soft resin layer 16B is adhered to the orientation film on a substrate, that is, spacers 16 may be constructed as hard resin layer 16A/soft resin layer 16B, or as soft resin layer 16B/hard resin layer 16A/soft resin layer 16B.

As is evident from the detailed description in the foregoing, according to the second aspect of the present invention, spacers formed of resin layers are adhered to the inner surface of the substrates and the soft resin layer has low elastic modulus, so that the substrates can follow thermal expansion of liquid crystal or an external force, and the substrate gap can be thereby maintained uniform and constant, resulting in provision of a liquid crystal display that permits display quality to be improved.

Next, examples of liquid crystal display according to the third aspect of the present invention will be described in conjunction with comparative examples.

First, the step of sealing the liquid crystal display while maintaining the uniform and constant gap between electrodes will be described. The material used and the like will be described more specifically in subsequent examples.

A photoresist material was spin-coated at a film thickness of 2 μm to the glass substrate having transparent electrodes and an orientation film formed thereon. This resist film was prebaked and then exposed to light using a photomask and a UV exposure apparatus, and developed. Spacers were thus formed on the substrate in a pattern with cylinders of 10 μm in diameter longitudinally and laterally arranged at interval of 100 μm. The obtained spacers were washed with pure water, and dried.

An adhesive sealant was disposed on the periphery of the glass substrate having spacers formed thereon with a portion left to form a liquid crystal injection port. Then, the other glass substrate was placed on this glass substrate to form an assembly. This assembly was loaded in a heat treatment apparatus, and was heated under pressure at a curing temperature (110° C.–150° C.) of the spacers and the heat curable resin of the adhesive sealant. By this treatment, the spacers were hardened under the pressure and two glass substrates were joined firmly with each other to form an empty panel. At the same time, the periphery of the empty panel was sealed by the adhesive sealant.

Then, liquid crystal was injected through the liquid crystal injection port into the empty panel, and the liquid crystal injection port was finally sealed.

Example 30

A liquid crystal display of example 30 was manufacture in accordance with above-described manufacturing method of liquid crystal display as follows.

3 wt % polyimide solution was applied using a spin coater at rotation speed of 2000 rpm to a pair of glass substrates of 200×100×1.1 mm having transparent ITO electrodes provided on one surface thereof, respectively, and was baked at 200° C. for 30 minutes to form orientation films.

On the orientation film on one of the glass substrates, a negative type photoresist material (TLOR-N; manufactured by Tokyo Ohka Kogyo Co.) was spin-coated to film thickness of 2 μm. Prebaking of the formed resist film was performed on a hot plate at 100° C. for 1 minute, and then the resist film was exposed to light using a UV exposure apparatus at 50 mJ/cm$^2$. Then, the resist film was developed to form spacers in a pattern of cylinders of 10 μm in diameter arranged longitudinally and laterally at the interval of 100 μm, and was washed with pure water, and then was dried.

Then, rubbing treatment was performed on the orientation films on both glass substrates.

Next, epoxy resin to be hardened by heating at 150° C. for 1 hours was attached using a printing method to the periphery of one of the glass substrates except the portion for a liquid crystal injection port. The pair of glass substrates were superimposed so as to oppose the transparent electrodes to each other, and were placed in a vacuum bag, and heated at 150° C. for 1 hour to harden the epoxy resin for sealing the periphery as well as to harden the spacers to join the glass substrates with each other.

Then, a ferroelectric liquid crystal was injected through the liquid crystal injection port (vacuum method), and the liquid crystal injection port was then sealed to obtain a liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force to reduce the thickness of the liquid crystal layer.

Further, when the liquid crystal display was supported at the center and a load of 300 g was applied to both end portions, no change in display color was observed over the entire display screen, and thickness of the liquid crystal layer did not change over the whole screen.

When the experiment was repeated under same conditions as described above, the strength of spacers before hardening was 1000 N/mm$^2$, and the strength after hardening without superimposition of the glass substrates was 2000 N/mm$^2$.

Comparative Example 5

An example is described below in which, in order to make comparison with the liquid crystal display of example 30, the length of exposure time of the negative type photoresist for forming spacers was increased five times that in example 30 to thereby increase the strength of the spacers before superimposition of the substrates, with other conditions such as size and shape of glass substrates, material of the orientation films, spacers, and liquid crystal, etc., being the same as in example 30.

After the formation of an orientation film on each of two substrates as in example 30, a resist film was formed on one of the substrates, and was then exposed at 250 mJ/cm$^2$ to have the same exposed pattern as that in example 30. Subsequently, the exposed film was developed, rinsed, and dried. A liquid crystal display was then fabricated according to the procedure as in example 30.

When this liquid crystal display was placed under a cross nicol arrangement and was depressed at the center of the display region using a pen tip of 0.8 mm in tip diameter with a pen load of 100 g, change in display color was observed around the pen tip. It was shown from this observation that this liquid crystal display was inferior in stress resistance against an external force to reduce the thickness of the liquid crystal layer.

Further, when the liquid crystal display was supported at the center and a load of 100 g was applied to both end portions, a change in display color was observed over the entire display screen. This is due to change of the panel gap under the load, which arose because the spacers already hardened before superimposition of substrates were not adhered adequately to the other substrate.

When the experiment was repeated under same conditions as described above, the strength of hardened spacers before superimposition of the glass substrates was 2100 N/mm$^2$.

From these results, it is considered that hardening of spacers had proceeded before superimposition of substrates so far that adherence of spacers by heating after superimposition became inadequate leading to poor display characteristics and poor strength to an external force.

Example 31

A liquid crystal display was manufactured under same conditions as in example 30, except that a positive type resist material (TPAR-PO12MP, manufactured by Tokyo Ohka Kogyo Co.) was used as the material for forming spacers and the photomask was replaced by one for a positive type.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force to reduce the thickness of the liquid crystal layer.

Further, when the liquid crystal display was supported at the center and a load of 300 g was applied to both end portions, no change in display color was observed over the entire display screen, and thickness of the liquid crystal layer did not change over the whole surface.

When the experiment was repeated under same conditions as described above, the strength of spacers before superimposition of substrates (before hardening) was 110 N/mm$^2$, and the strength after hardening without superimposition of the glass substrates was 2000 N/mm$^2$.

Comparative Example 6

A liquid crystal display was manufactured under same conditions as in example 31, except that the prebaking temperature of the positive type resist as the material for forming spacers was changed to 140° C.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that this liquid crystal display was inferior in stress resistance against an external force to reduce the thickness of the liquid crystal layer.

Further, when the liquid crystal display was supported at the center and a load of 100 g was applied to both end portions, a change in display color was observed over the entire display screen. This is due to change of the panel gap under the load, which arose because hardening of spacers had proceeded due to heating at a higher temperature and the spacers were not adhered to the other substrate.

When the experiment was repeated under same conditions as described above, the strength of hardened spacers before superimposition of the glass substrates was 1100 N/mm$^2$.

From these results, it is considered that hardening of spacers had proceeded before superimposition of substrates so far that degree of hardening is too high and spacers in the liquid crystal display did not exhibit adhesive capability by heating after superimposition, leading to poor display characteristics and poor strength to an external force.

Comparative Example 7

A liquid crystal display was manufactured in the same way as in example 30, except that a negative type resist that is hardened at 190° C. for 1 hour was used as spacer material, and was hardened by heating at 190° C. for 1 hour. As a result, damage due to heating was observed in the orientation films, which resulted in degradation of the display quality of the liquid crystal display.

Comparative Example 8

A liquid crystal display was manufactured in the same way as in example 30, except that a negative type resist that is hardened at 150° C. for 1 hour was used as spacer material, and epoxy resin that is hardened at 140° C. for 1 hour was used as a sealant. As a result, the spacers were hardened after the sealant in the periphery of the panel was hardened, so that the center portion of the display region bulged out, leading to non-uniform gap and degradation of the display quality of the liquid crystal display.

Comparative Example 9

A liquid crystal display was manufactured in the same way as in example 30, except that a negative type resist that is hardened at 100° C. for 1 hour was used as spacer material, and epoxy resin that is hardened at 100° C. for 1 hour was used as a sealant, and after liquid crystal was filled in the panel by liquid crystal dropping method while warming the liquid crystal, the substrates were superimposed and heated at 100° C. for hardening. As a result, as the curing temperature of the negative type resist and the sealant was low, the negative type resist began to be hardened when the liquid crystal was filled in warmed state (100° C.), leading to a failure of adherence to the substrate.

Comparative Example 10

A liquid crystal display was manufactured in the same way as in example 30, except that a negative type resist that is hardened at 160° C. for 1 hour was used as spacer material, and epoxy resin that is hardened at 160° C. for 1 hour was used as a sealant, and these were hardened at 160° C. As a result, damage due to heating was observed in the orientation films, which resulted in degradation of the display quality of the liquid crystal display.

Example 32

This example was the same as example 30, except that a dispenser was used to drop liquid crystal (dropping method). Spacers were formed on one of a pair of glass substrates. Then, after liquid crystal was dropped, the two glass substrates were stuck together so as to oppose transparent electrodes to each other, and were placed in a vacuum bag and heated at 150° C. for 1 hour to harden the epoxy resin as the sealant of periphery as well as the negative type resist for spacers to obtain a liquid crystal display.

This liquid crystal display exhibited, as example 30, good display characteristics and good stress resistance against an external force. When the experiment was repeated under same conditions, the strength of spacers before superimposition of substrates (before hardening) was 800 N/mm$^2$, and the strength after hardening without superimposition of the glass substrates was 2000 N/mm$^2$.

As has been described above, in the third aspect of the present invention, a pair of substrates are firmly adhered to each other by spacers which are formed exclusively of resin without being mixed with beads or the like using a photolithographic method on an orientation film formed on a substrate having electrodes, so that the gaps between electrodes are maintained uniform and constant in the display region. Uniformity of contrast and response speed in the effective display region is thereby improved and the display quality is improved in the liquid crystal display of the present invention.

Next, examples of liquid crystal display according to the fourth aspect of the present invention will be described in conjunction with comparative examples.

First, the step of sealing the liquid crystal display while maintaining the uniform and constant gap between electrodes, will be described. Material used and the like will be described more specifically in subsequent examples.

A photoresist material was spin-coated to the glass substrate having transparent electrodes and the orientation film formed thereon. This resist film was prebaked at 100° C. for 1 minute, and then exposed to light using a photomask and a UV exposure apparatus, and developed. Spacers were thus formed on the substrate in a pattern with cylinders of 10 μm in diameter longitudinally and laterally arranged at interval of 100 μm. Spacers thus formed were washed with pure water, and dried, and then, post-baking was performed at 180° C. for 60 minutes to obtain hardened spacers.

Figure 12:
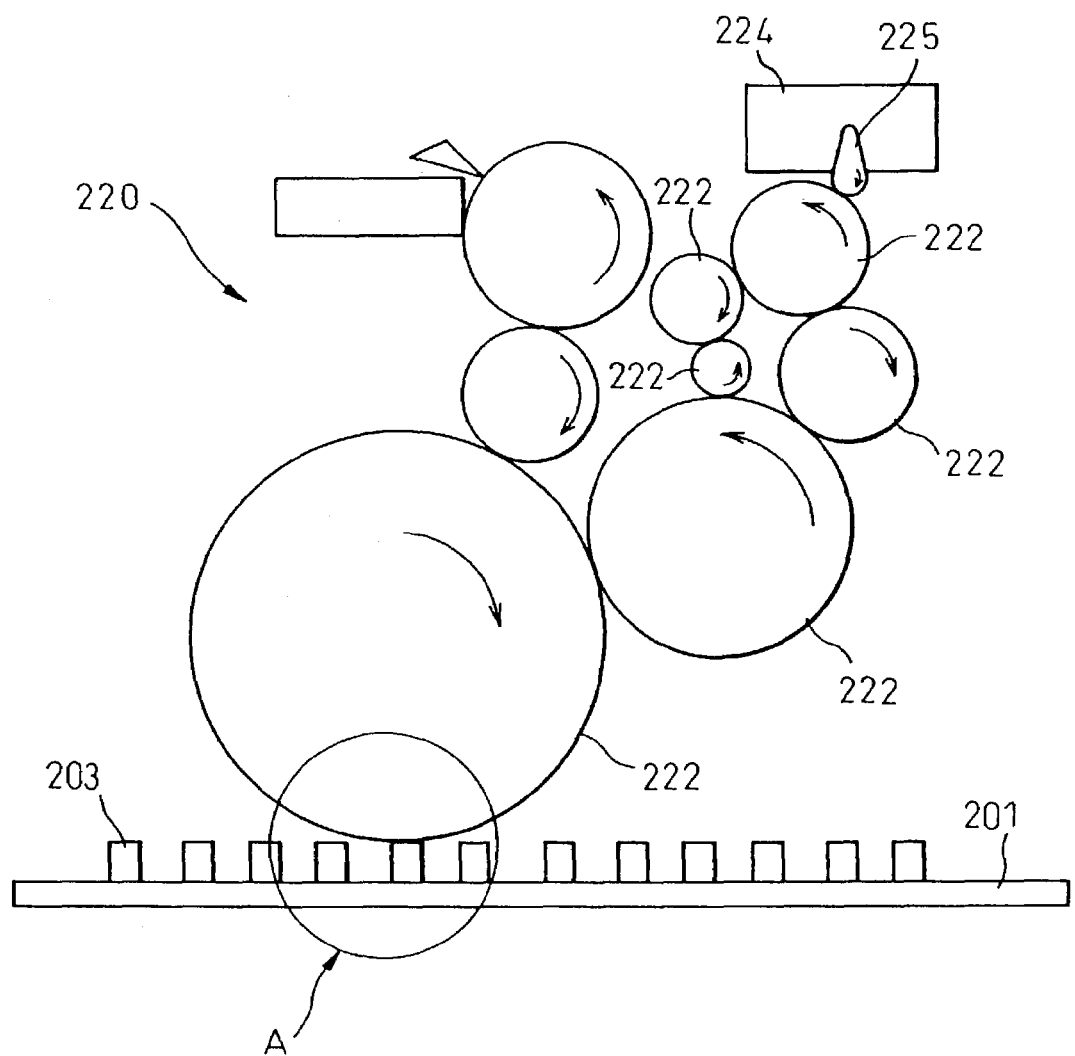
FIG. 12 is a schematic view useful for explaining an adhesive application apparatus.
Figure 13:
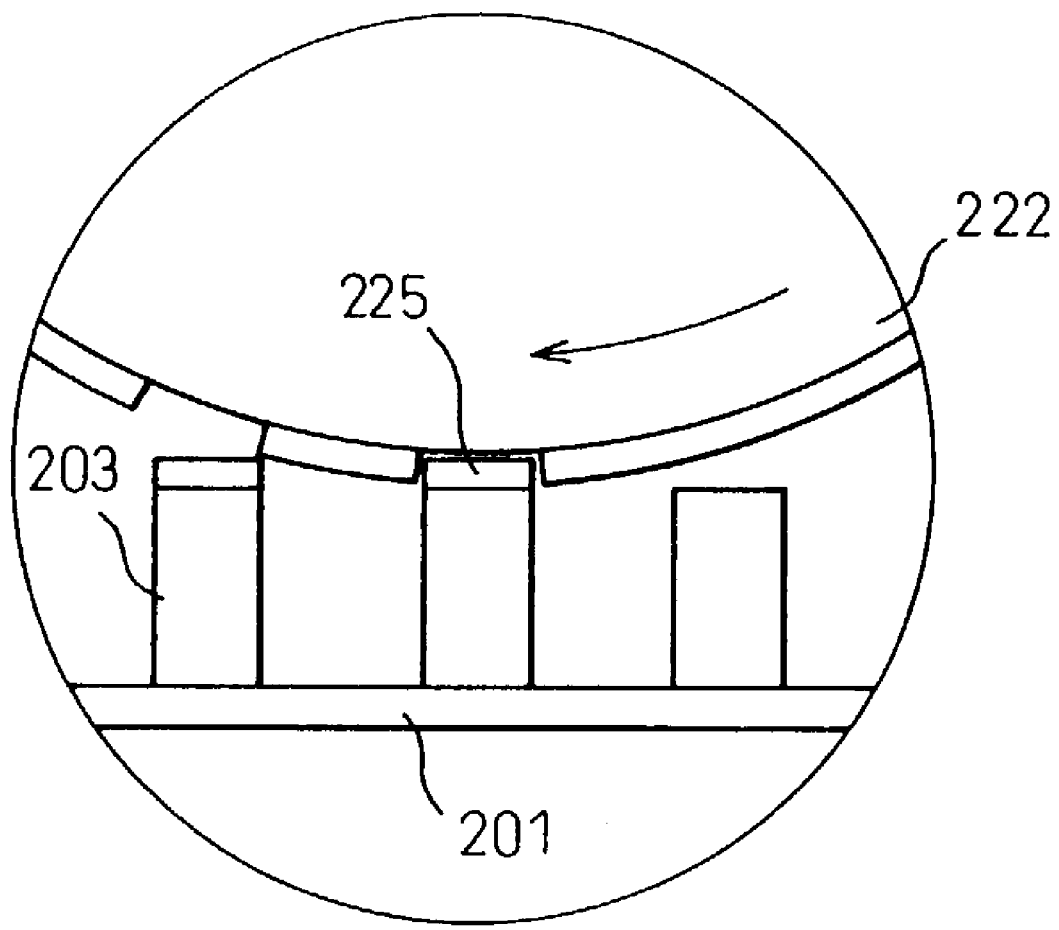
FIG. 13 is a schematic view showing application of an adhesive on top of a spacer using the adhesive application apparatus shown in FIG. 12.

Then, on top of spacers, an adhesive was continuously applied using an adhesive applicator 220 shown in FIG. 12. This adhesive applicator is a multi-roller type printing machine used in offset printing and the like. When this applicator 220 is used, an adhesive 225 supplied from an adhesive supply 224 is transferred between multiple rollers 222 so that thickness of the adhesive 225 can be easily controlled, and the adhesive 225 can be continuously applied to the top of spacers 203 as shown in FIG. 13 which is an enlarged view of a portion A in FIG. 12. In the example that follows, the adhesive applied on top of spacers 203 was stabilized by heating at 100° C. for 1 minute.

An adhesive sealant was disposed on the periphery of the glass substrate 201 comprising spacers 203 with an adhesive applied on top thereof, and the other glass substrate was placed on this glass substrate to form an assembly. This assembly was loaded in a heat treatment apparatus, and heat and pressure is applied at curing temperature of the adhesive on top of the spacers and the heat curable resin of the adhesive sealant (110° C.–150° C.). By this treatment, the spacers with the adhesive applied on top thereof firmly joined two glass substrates with each other by the hardened adhesive. Also, the periphery of the glass substrates was sealed by the adhesive sealant, and an empty panel was thereby obtained.

Then, liquid crystal was injected through the liquid crystal injection port, and the liquid crystal injection port was finally sealed.

Example 33

A liquid crystal display of example 33 was manufactured in accordance with the above-described manufacturing method of liquid crystal displays.

3 wt % polyimide solution was applied using a spin-coater at rotation speed of 2000 rpm to a pair of glass substrates of 200×100×1.1 mm having transparent ITO electrodes provided thereon, and was baked at 200° C. for 30 minutes to form orientation films. Then, a rubbing treatment was performed on these orientation films.

On the orientation film on one of the glass substrates, a negative type photoresist material (TLOR-N; manufactured by Tokyo Ohka Kogyo Co.) was spin-coated to film thickness of 2 µm. Prebaking of the formed resist film was performed on a hot plate at 100° C. for 1 minute, and then the resist film was exposed to light using a UV exposure apparatus at 60 mJ/cm². Then, the resist film was developed to form spacers in a pattern of cylinders of 10 µm in diameter arranged longitudinally and laterally at the interval of 100 µm, and was washed with pure water, and then was dried. Post-baking was further performed at 180° C. for 1 hour to harden the spacers.

An epoxy adhesive (Technodyne AH3052T; manufactured by Okada Chemical Co.) was rolled to thickness of 0.05 µm and transferred to the top of the formed spacers using the adhesive applicator described above with reference to FIG. 12. Then, an epoxy resin that is hardened at 150° C. for 1 hour was attached by printing method to the periphery of this glass substrate except the portion for liquid crystal injection port. The pair of glass substrates were superimposed so as to oppose the transparent electrodes to each other, placed into a vacuum bag, and were subjected to heat treatment at 150° C. for 1 hour to harden the top of spacers and the sealant for peripheral sealing.

Then, a ferroelectric liquid crystal was injected through the liquid crystal injection port (vacuum method), and the liquid crystal injection port was sealed to obtain a liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force to reduce the thickness of the liquid crystal layer.

When the liquid crystal display was supported at the center and a load of 300 g was applied to both end portions, no change in display color was observed over the entire display screen, and the thickness of the liquid crystal layer did not change over the whole surface.

Comparative Example 11

An example is described below in which, in order to make comparison with the liquid crystal display of example 33, a liquid crystal display was formed without using an adhesive, with other conditions such as size and shape of glass substrates, material of the orientation films, spacers, and liquid crystal, etc., being the same as in example 33. More specifically, after spacers were formed on one of the substrates as in example 33, an epoxy resin for peripheral sealing was attached to the periphery of this glass substrate without disposing an adhesive on top of the spacers, and after the other substrate was superimposed on this substrate and heat treatment was performed, liquid crystal was injected between the substrates to obtain a liquid crystal display.

When this liquid crystal display was placed under a cross nicol arrangement and was depressed at the center of the display region using a pen tip of 0.8 mm in tip diameter with a pen load of 100 g, change in display color was observed around the pen tip. It was shown from this observation that this liquid crystal display was inferior in stress resistance against an external force to reduce the thickness of the liquid crystal layer.

When the liquid crystal display was supported at the center and a load of 100 g was applied to both end portions, change in display color was observed over the entire display screen. This is due to change of the gap between the substrates under the load, which arose because spacers already hardened before superimposition of substrates were not adhered to the other substrate.

Example 34

A liquid crystal display was manufactured under the same conditions as in example 33, except that an acrylic adhesive (Vistex V101; manufactured by Matsumoto Chemical Industry Co.) was used as the adhesive attached on top of spacers.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Comparative Example 12

A liquid crystal display was manufactured in the same way as in example 33, except that same epoxy resin as in example 33 was used as the adhesive and an epoxy resin that is hardened by heating at 190° C. for 1 hour was used as the sealant. Since temperature as high as 190° C. was required for sealing with the sealant, damage due to heat was observed in the orientation films in this liquid crystal display, and the display quality was degraded accordingly.

Comparative Example 13

A liquid crystal display was manufactured in the same way as in example 33, except that same epoxy resin as in example 33 was used as the adhesive (curing temperature 150° C.) and an epoxy resin that is hardened by heating at 140° C. for 1 hour was used as the sealant and heat treatment in a vacuum bag was performed at 140° C. for 1 hour. In the obtained liquid crystal display, the substrates were not joined with each other sufficiently by the adhesive, and center portion of the display region bulged out due to the hardening shrinkage of the peripheral sealant, leading to a non-uniform gap between substrates and degradation of display quality.

Example 35

A liquid crystal display was manufactured under the same conditions as in example 33, except that the thickness of the adhesive layer on top of the spacers was 10% (0.2 µm) of the pillar height.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Comparative Example 14

A liquid crystal display was manufactured under the same conditions as in example 33, except that the thickness of the adhesive layer on top of the spacers was 15% (0.3 µm) of the pillar height.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer. When the liquid crystal display was supported at the center and a load of 300 g was applied to both end portions, no change in display color was observed over the entire display screen, and the thickness of the liquid crystal layer did not change over the whole surface. However, excessive adhesive spread out to the region of display electrodes, leading to change in refractive index of the display electrode surface and degradation of display quality of the liquid crystal display.

Comparative Example 15

A liquid crystal display was manufactured under the same conditions as in example 33, except that the thickness of the adhesive layer on top of the spacers was 20% (0.4 µm) of the pillar height.

In this liquid crystal display, when an adhesive is transferred to the top of spacers, the adhesive is transferred also to the orientation film, leading to orientation failure, and satisfactory display quality was not obtained.

Example 36

A liquid crystal display was manufactured under the same conditions as in example 33, except that the ferroelectric liquid crystal was replaced by twisted nematic type liquid crystal and the substrate gap was set at 6 µm.

When the obtained liquid crystal display was evaluated in the same way as in example 33, it was found that the liquid crystal display exhibits the same good characteristics as example 33.

Example 37

A liquid crystal display was manufactured under the same conditions as in example 33, except that the ferroelectric liquid crystal was replaced by super twisted nematic type liquid crystal and the substrate gap was set at 6 µm.

When the obtained liquid crystal display was evaluated in the same way as in example 33, it was found that the liquid crystal display exhibits the same good characteristics as example 33.

Example 38

A liquid crystal display was manufactured under the same conditions as in example 33, except that the ferroelectric liquid crystal was replaced by nematic cholesteric phase transition type liquid crystal and the substrate gap was set at 6 µm.

When this liquid crystal display was evaluated in the same way as in example 33, it was found that the liquid crystal display exhibits the same good characteristics as example 33.

Example 39

A liquid crystal display was manufactured under the same conditions as in example 33, except that the ferroelectric liquid crystal was replaced by anti-ferroelectric liquid crystal.

When this liquid crystal display was evaluated in the same way as in example 33, it was found that the liquid crystal display exhibits the same good characteristics as example 33.

Example 40

A liquid crystal display was manufactured under the same conditions as in example 33, except that the ferroelectric liquid crystal was replaced by twist grain boundary liquid crystal and the substrate gap was set at 6 µm.

When this liquid crystal display was evaluated in the same way as in example 33, it was found that the liquid crystal display exhibits the same good characteristics as example 33.

Example 41

A liquid crystal display was manufactured under the same conditions as in example 33, except that the ferroelectric liquid crystal was replaced by smectic A phase liquid crystal and the substrate gap was set at 6 µm.

When this liquid crystal display was evaluated in the same way as in example 33, it was found that the liquid crystal display exhibits the same good characteristics as example 33.

Example 42

A liquid crystal display was manufactured under the same conditions as in example 33, except that dropping method was adopted in place of vacuum method for liquid crystal injection, and an adhesive was disposed on top of spacers formed on one of the substrates, and a sealant was disposed on the periphery for sealing the periphery of the substrates, and after ferroelectric liquid crystal was dropped on the substrate, the other substrate was superimposed on this substrate and the substrates were heated to join with each other as well as to seal the peripheral portion. As time required for liquid crystal injection under reduced pressure was eliminated, the time required for manufacturing was shortened as compared to example 33.

When the obtained liquid crystal display was evaluated in the same way as in example 33, it was found that the liquid crystal display exhibits the same good characteristics as example 33.

Next, examples of liquid crystal display will be described in which a liquid crystal display was manufactured by using an auxiliary material to dispose an adhesive on top of spacers.

Figure 14A:
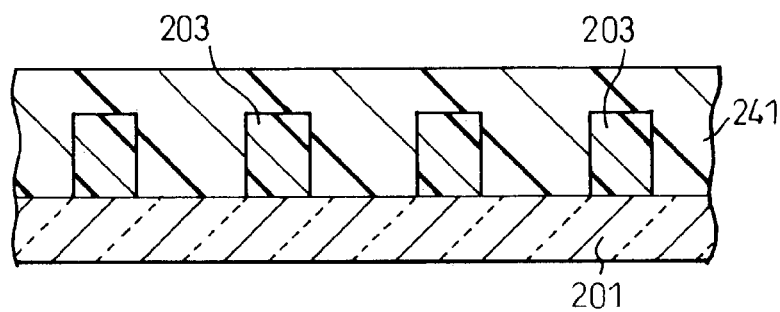
FIGS. 14A–14D are views useful for explaining the use of auxiliary material for application of an adhesive on top of a spacer.
Figure 14B:
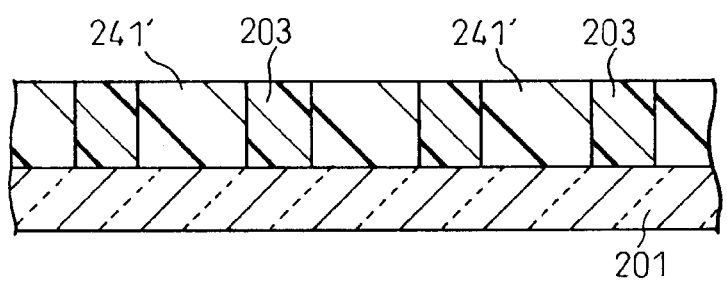
Figure 14C:
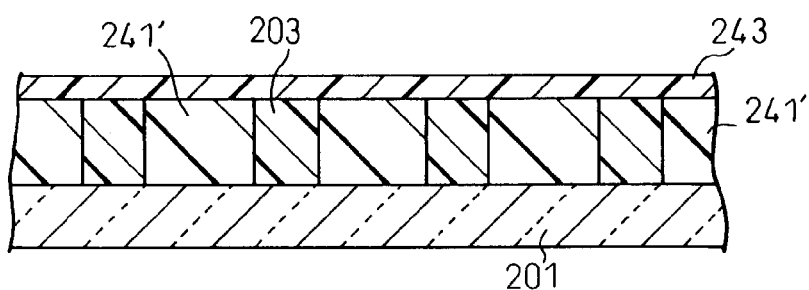
Figure 14D:
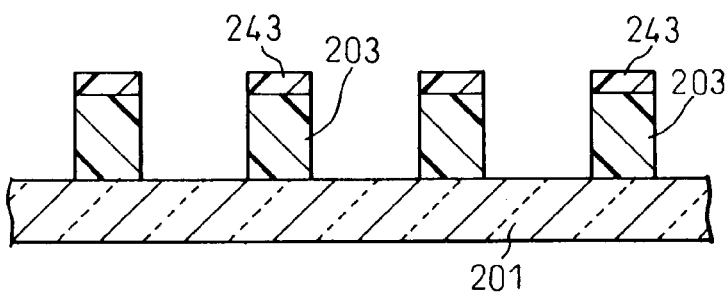

Referring to FIGS. 14A–14D, a method of disposing an adhesive on top of spacers is described below. As shown in FIG. 14A, after spacers 203 were formed on one of the substrates 201 as described in previous examples, 10% aqueous solution of a water soluble resin was dropped on this substrate, and was applied using a spin coater to form a water soluble resin layer 241 so as to cover the spacers 203 all over the surface. Next, a part of the water soluble resin layer 241 was removed by steam washing to expose the top of spacers 203 and to leave the water soluble resin 241 between spacers, as shown in FIG. 14B. Then, as shown in FIG. 14C, an adhesive layer 243 was formed so as to cover the top of spacers and the resin 241 between them. Then, the water soluble resin 241 was removed by steam washing together with the adhesive on it to obtain spacers having the adhesive layer 243 on top thereof as shown in FIG. 14D.

Thereafter, a liquid crystal display was manufactured in accordance with procedures as described schematically before, by constructing an assembly of glass substrates, performing heat treatment, filling liquid crystal and finally sealing the periphery of the glass substrates.

Example 43

A liquid crystal display of example 43 was manufactured in accordance with above-described manufacturing method as follows.

3 wt % polyimide solution was applied using a spin coater at rotation speed of 2000 rpm to a pair of glass substrates of 200×100×1.1 mm having transparent ITO electrodes provided thereon, and was baked at 200° C. for 30 minutes to form orientation films. Then, a rubbing treatment was performed on these orientation films.

On the orientation film on one of the glass substrates, a negative type photoresist material (TLOR-N; manufactured by Tokyo Ohka Kogyo Co.) was spin-coated to film thickness of 2 μm. Prebaking of the formed resist film was performed on a hot plate at 100° C. for 1 minute, and then the resist film was exposed to light using a UV exposure apparatus at 60 mJ/cm². Then, the resist film was developed to form spacers in a pattern of cylinders of 10 μm in diameter arranged longitudinally and laterally at the interval of 100 μm, and was washed with pure water, and then was dried. Post-baking was further performed at 180° C. for 1 hour to harden the spacers.

10% aqueous solution of a water soluble resin (DYNAFLOW; manufactured by JSR) was dropped on the glass substrate provided with spacers, and was applied using a spin coater to a thickness of 3 μm, and then was dried at 90° C. for 2 minutes to form a resin layer. Then, steam washing was performed for etching the water soluble resin to expose the top of the spacers.

Then, an epoxy adhesive (Technodyne AH3052T; manufactured by Okada Chemical Co.) was applied using a spin coater to the substrate with the exposed spacer top, and dried to form an adhesive layer of 0.2 μm in thickness. Then, the water soluble resin filled between spacers was removed together with the adhesive on top of it by steam washing to obtain spacers having the adhesive layer 243 on top of them as shown in FIG. 14D.

An epoxy resin that is hardened at 150° C. for 1 hour was attached by printing method to the periphery of the glass substrate provided with spacers except the portion for liquid crystal injection port. The pair of glass substrates were superimposed so as to oppose transparent electrodes to each other, placed into a vacuum bag, and were subjected to heat treatment at 150° C. for 1 hour to harden the adhesive on top of spacers and the sealant for peripheral sealing. Then, a vacuum injection method was used to inject ferroelectric liquid crystal through the liquid crystal injection port, and the injection port was sealed finally to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Example 44

A liquid crystal display was manufactured under the same conditions as in example 43, except that an acrylic resin (Visset 112; manufactured by Matsumoto Chemical Industry Co.) was used as the adhesive disposed on top of spacers.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 16

A liquid crystal display was manufactured under the same conditions as in example 43, except that a polyester resin with low softening temperature (GA-6300, softening temperature of 100° C.; manufactured by Toyobo Vylon Co.) was used as the adhesive, and a sealant that is hardened at 190° C. for 1 hour was used. Since temperature as high as 190° C. was required for sealing with the sealant, damage due to heat was observed in the orientation films in this liquid crystal display, and display quality was degraded accordingly.

Comparative Example 17

A liquid crystal display was manufactured under the same conditions as in example 43, except that a polyester resin with a softening temperature of 163° C. (GH-480, manufactured by Toyobo Vylon Co.) was used as the adhesive. In the liquid crystal display, as the softening temperature of the adhesive was higher than the curing temperature 150° C. of the sealant, joining of the substrates with each other via the adhesive was unsatisfactory with the result that center portion of the display region bulged out due to hardening shrinkage of the peripheral sealant, leading to non-uniform gap between substrates and degradation of the display quality.

Example 45

A liquid crystal display was manufactured under the same conditions as in example 43, except that the concentration of the water soluble resin used as the auxiliary material for disposing an adhesive on top of spacers was 40%.

When this liquid crystal display was placed under a cross nicol arrangement and was depressed at the center of the display region using a pen tip of 0.8 mm in tip diameter with a pen load of 100 g, no change in display color was observed around the pen tip, and it was confirmed that the liquid crystal display has stress resistance against an external force to reduce the thickness of the liquid crystal layer.

When the liquid crystal display was supported at the center and a load of 500 g was applied to both end portions, no change in display color was observed over the entire display screen, and thickness of the liquid crystal layer did not change over the whole surface.

Comparative Example 18

A liquid crystal display was manufactured under the same conditions as in example 43, except that the concentration of the water soluble resin used as the auxiliary material for disposing an adhesive on top of spacers was 45%.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that this liquid crystal display was inferior in stress resistance against an external force to reduce the thickness of the liquid crystal layer.

When the liquid crystal display was supported at the center and a load of 500 g was applied to both end portions, change in display color was observed over the entire display screen. This is considered to be due to separation of the adhesive, which arose because, when the water soluble resin used as the auxiliary material was removed, an increased water pressure was required for removing the water soluble resin at higher concentration.

Example 46

A liquid crystal display was manufactured under the same conditions as in example 43, except that the ferroelectric liquid crystal was replaced by twisted nematic type liquid crystal and the substrate gap was set at 6 μm.

When this liquid crystal display was evaluated in the same way as in example 43, it was found that the liquid crystal display exhibits the same good characteristics as example 43.

Example 47

A liquid crystal display was manufactured under the same conditions as in example 43, except that the ferroelectric liquid crystal was replaced by super twisted nematic type liquid crystal and the substrate gap was set at 6 μm.

When this liquid crystal display was evaluated in the same way as in example 43, it was found that the liquid crystal display exhibits the same good characteristics as example 43.

Example 48

A liquid crystal display was manufactured under the same conditions as in example 43, except that the ferroelectric liquid crystal was replaced by nematic cholesteric phase transition type liquid crystal and the substrate gap was set at 6 μm.

When this liquid crystal display was evaluated in the same way as in example 43, it was found that the liquid crystal display exhibits the same good characteristics as example 43.

Example 49

A liquid crystal display was manufactured under the same conditions as in example 43, except that the ferroelectric liquid crystal was replaced by anti-ferroelectric liquid crystal.

When this liquid crystal display was evaluated in the same way as in example 43, it was found that the liquid crystal display exhibits the same good characteristics as example 43.

Example 50

A liquid crystal display was manufactured under the same conditions as in example 43, except that the ferroelectric liquid crystal was replaced by twist grain boundary liquid crystal.

When this liquid crystal display was evaluated in the same way as in example 43, it was found that the liquid crystal display exhibits the same good characteristics as example 43.

Example 51

A liquid crystal display was manufactured under the same conditions as in example 43, except that the ferroelectric liquid crystal was replaced by smectic A phase liquid crystal.

When this liquid crystal display was evaluated in the same way as in example 43, it was found that the liquid crystal display exhibits the same good characteristics as example 43.

Example 52

A liquid crystal display was manufactured in the same way as in example 43, except that a dropping method was adopted in place of vacuum injection method for liquid crystal injection, and an adhesive was disposed on top of spacers formed on one of the substrates, and a sealant was disposed on the periphery for sealing the periphery of the substrates, and after ferroelectric liquid crystal was dropped on the substrate, the other substrate was superimposed on this substrate and the substrates were heated to join with each other as well as to seal the peripheral portion. Since time required for liquid crystal injection under reduced pressure was eliminated, the required time for manufacturing was shortened as compared to example 43.

When the obtained liquid crystal display was evaluated in the same way as in example 43, it was found that the liquid crystal display exhibits the same good characteristics as example 43.

As has been described above, in the liquid crystal display according to the fourth aspect of the present invention, the gap between a pair of superimposed substrates can be maintained constant using hardened spacers with sufficient strength without being mixed with beads or the like, and the substrate and the spacers can be firmly adhered to each other by the adhesive on top of the spacers. Uniformity of contrast and response speed in the effective display region is thereby improved and display quality is improved in the liquid crystal display of the present invention.

Next, examples of liquid crystal display according to the fifth aspect of the present invention will be described in conjunction with comparative examples.

First, the step of sealing the liquid crystal display while maintaining the uniform and constant gap between electrodes, will be described. The materials used and the like will be described more specifically in subsequent examples.

As shown in FIG. 15A, a photoresist material which permits both positive type and negative type patterning was spin-coated to the glass substrate 251 having transparent electrodes and the orientation film formed thereon to form a resist film 252. After this resist film 252 was prebaked at 100° C. for 1 minute, the resist film was exposed to light using a negative photomask and a UV exposure apparatus, and a negative type patterning image 256 (FIG. 15B) was thus formed in the resist film 252 in a pattern with cylinders of 10 μm in diameter longitudinally and laterally arranged at interval of 200 μm.

Next, the resist film was exposed to light using a positive photomask and the UV exposure apparatus, and a positive type patterning image 258 (FIG. 15C) was formed in the resist film 252 in a pattern with cylinders of 10 μm in diameter longitudinally and laterally arranged at interval of 200 μm and composing, together with the previously formed negative type patterning image 256, a patterning image like a checkerboard with intervals of 100 μm.

Then, the patterning image was developed, washed with pure water, and dried to form a group of spacers 261, 262 with hardened one and unhardened one alternately arranged longitudinally and laterally at intervals of 100 μm.

An adhesive sealant was disposed on the periphery of the glass substrate 251 having spacers 261, 262 formed thereon, with a portion left to form a liquid crystal injection port. Then, the other glass substrate was placed on this glass substrate to form an assembly. This assembly was loaded in a heat treatment apparatus, and was heated under pressure at the curing temperature (110° C.–150° C.) of the spacers and the heat curable resin of the adhesive sealant. By this treatment, the unhardened spacers were hardened under the pressure so as to be adhered to the other glass substrate and two glass substrates were joined firmly with each other. At the same time, the periphery of the glass substrates was sealed by the adhesive sealant to obtain an empty panel.

Then, liquid crystal was injected through the liquid crystal injection port into the empty panel, and the liquid crystal injection port was finally sealed.

Example 53

A liquid crystal display of example 53 was manufactured in accordance with the above-described manufacturing method of liquid crystal displays.

3 wt % polyimide solution was applied using a spin-coater at the rotation speed of 2000 rpm to a pair of glass substrates of 200×100×1.1 mm provided with transparent ITO electrodes, and was baked at 200° C. for 30 minutes to form orientation films.

On the orientation film on one of the glass substrates, an image reversal resist material (AZ5200; manufactured by Hoechst) was spin-coated to a film thickness of 2 μm. Prebaking of the formed resist film was performed on a hot plate at 100° C. for 1 minute. Then, the resist film was exposed to light for 30 seconds using a negative photomask and a UV exposure apparatus so as to form a pattern of cylinders of 10 μm in diameter arranged longitudinally and laterally at the interval of 200 μm on the substrate, and was then subjected to heat treatment at 100° C. for 30 minutes to form a negative type patterning image. Then, the resist film was exposed to light for 120 seconds using a positive photomask and a UV exposure apparatus so as to form a positive patterning image of cylindrical spacers of 10 μm in diameter arranged at equal interval between the previously formed patterning image. Then, both patterning images were developed, washed with pure water, and dried to form hardened spacers and unhardened spacers alternately arranged longitudinally and laterally at intervals of 100 μm.

Then, a rubbing treatment was performed on the orientation films of both glass substrates.

Next, an epoxy resin that is hardened at 150° C. for 1 hour was attached by printing method to the periphery of one glass substrate except the portion for a liquid crystal injection port. The pair of glass substrates were superimposed so as to oppose the transparent electrodes to each other, placed into a vacuum bag, and were subjected to heat treatment at 150° C. for 1 hour to harden the epoxy resin as a sealant as well as to harden the unhardened spacers so that the spacers were adhered to the other substrate and the two glass substrates were joined with each other. Then, ferroelectric liquid crystal was injected through the liquid crystal injection port (vacuum injection method), and the injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was shown from this observation that this liquid crystal display had stress resistance against an external force to reduce the thickness of the liquid crystal layer.

When the liquid crystal display was supported at the center and a load of 300 g was applied to both end portions, no change in display color was observed over the entire display screen, and thickness of the liquid crystal layer did not change all over the surface.

Example 54

A liquid crystal display was manufactured under the same conditions as in example 53, except that the proportion of the unhardened spacers was 10%.

When this liquid crystal display was evaluated in the same way as in example 53, it was found that the liquid crystal display exhibits the same good characteristics as example 53.

Example 55

A liquid crystal display was manufactured under the same conditions as in example 53, except that the proportion of the unhardened spacers was 90%.

When this liquid crystal display was evaluated in the same way as in example 53, it was found that the liquid crystal display exhibits the same good characteristics as example 53.

Example 56

A liquid crystal display was manufactured under the same conditions as in example 53, except that the mask for the first exposure was modified such that the cross-sectional shape of the unhardened spacers was triple concentric circles composed of an inner circle (of 2 μm in diameter) of hardened portion, an intermediate ring (of 6 μm in outer diameter and 2 μm in width) of unhardened portion, and outer ring (of 10 μm in outer diameter and 2 μm in width) of hardened portion.

When this liquid crystal display was evaluated in the same way as in example 53, it was found that the liquid crystal display exhibits the same good characteristics as example 53.

Example 57

A liquid crystal display was manufactured under the same conditions as in example 53, except that the mask for the first exposure was modified such that the unhardened spacer has outer hardened portion and inner unhardened portion with the cross-sectional area of the hardened portion is 10% of the total cross-sectional area of the spacer.

When this liquid crystal display was evaluated in the same way as in example 53, it was found that the liquid crystal display exhibits the same good characteristics as example 53.

Example 58

A liquid crystal display was manufactured under the same conditions as in example 53, except that the mask for the first exposure was modified such that the unhardened spacer has outer hardened portion and inner unhardened portion with the cross-sectional area of the hardened portion is 90% of the total cross-sectional area of the spacer.

When this liquid crystal display was evaluated in the same way as in example 53, it was found that the liquid crystal display exhibits the same good characteristics as example 53.

Example 59

A liquid crystal display was manufactured under the same conditions as in example 53, except that the mask for the first exposure was modified such that spacers are pillars with square cross-section and have outer hardened portion and inner unhardened portion with the cross-sectional area of the hardened portion is 10% of the total cross-sectional area of the spacer.

When this liquid crystal display was evaluated in the same way as in example 53, it was found that the liquid crystal display exhibits the same good characteristics as example 53.

Example 60

A liquid crystal display was manufactured under the same conditions as in example 53, except that the mask for the first exposure was modified such that spacers are pillars with square cross-section and have outer hardened portion and inner unhardened portion with the cross-sectional area of the hardened portion is 90% of the total cross-sectional area of the spacer.

When this liquid crystal display was evaluated in the same way as in example 53, it was found that the liquid crystal display exhibits the same good characteristics as example 53.

Example 61

A liquid crystal display was manufactured under the same conditions as in example 53, except that the ferroelectric liquid crystal was replaced by twisted nematic type liquid crystal and the substrate gap was set at 6 μm.

When this liquid crystal display was evaluated in the same way as in example 53, it was found that the liquid crystal display exhibits the same good characteristics as example 53.

Example 62

A liquid crystal display was manufactured under the same conditions as in example 53, except that the ferroelectric liquid crystal was replaced by super twisted nematic type liquid crystal and the substrate gap was set at 6 μm.

When this liquid crystal display was evaluated in the same way as in example 53, it was found that the liquid crystal display exhibits the same good characteristics as example 53.

Example 63

A liquid crystal display was manufactured under the same conditions as in example 53, except that the ferroelectric liquid crystal was replaced by nematic cholesteric phase transition type liquid crystal and the substrate gap was set at 6 μm.

When this liquid crystal display was evaluated in the same way as in example 53, it was found that the liquid crystal display exhibits the same good characteristics as example 53.

Example 64

A liquid crystal display was manufactured under the same conditions as in example 53, except that the ferroelectric liquid crystal was replaced by anti-ferroelectric liquid crystal.

When this liquid crystal display was evaluated in the same way as in example 53, it was found that the liquid crystal display exhibits the same good characteristics as example 53.

Example 65

A liquid crystal display was manufactured under the same conditions as in example 53, except that the ferroelectric liquid crystal was replaced by twist grain boundary liquid crystal and the substrate gap was set at 6 μm.

When this liquid crystal display was evaluated in the same way as in example 53, it was found that the liquid crystal display exhibits the same good characteristics as example 53.

Example 66

A liquid crystal display was manufactured under the same conditions as in example 53, except that the ferroelectric liquid crystal was replaced by smectic A phase liquid crystal and the substrate gap was set at 6 μm.

When this liquid crystal display was evaluated in the same way as in example 53, it was found that the liquid crystal display exhibits the same good characteristics as example 53.

Example 67

A liquid crystal display was manufactured under the same conditions as in example 53, except that dropping method was adopted in place of vacuum injection method for injecting liquid crystal, and after ferroelectric liquid crystal was dropped on the substrate having spacers formed thereon, the other substrate was superimposed on this substrate and heated so as to join the two substrates via the peripheral sealant and the spacers. As the time required for injection of liquid crystal under reduced pressure was eliminated, the time required for manufacture was shortened as compared to example 53.

When this liquid crystal display was evaluated in the same way as in example 53, it was found that the display shows same good characteristics as example 53.

Comparative Example 19

A liquid crystal display was manufactured under the same conditions as in example 53, except that all the circles of 10 μm in diameter corresponding to all the spacers in the resist film were exposed to light at the same time for 1 minutes, and after being baked, were developed to form spacers.

The obtained liquid crystal display was evaluated in the same way as in example 53. All the spacers were hardened and were not adhered to the other substrate, so that, when center of the display region was depressed using a pen tip of 0.8 mm in tip diameter with a pen load of 100 g, change of display color was observed around the pen tip, and a display defect was thus recognized.

Comparative Example 20

A liquid crystal display was manufactured under the same conditions as in example 53, except that all the circles of 10 μm in diameter corresponding to all the spacers in the resist film were exposed to light at the same time for 10 seconds, and after being baked, were developed to form spacers.

The obtained liquid crystal display was evaluated in the same way as in example 53. Since all spacers were in unhardened state and had low strength, the spacers collapsed when substrates were superimposed and heat and pressure were applied. Thus, good liquid crystal display could not be realized with this device.

Comparative Example 21

A liquid crystal display was manufactured under the same conditions as in example 53, except that the photomask was modified such that the number of unhardened spacers was 8% of the total number of spacers.

The obtained liquid crystal display was evaluated in the same way as in example 53. Adequate adherence of spacers to the other substrate could not be realized, so that, when center of the display region was depressed using a pen tip of 0.8 mm in tip diameter with a pen load of 100 g, change of display color was observed around the pen tip, and display defect was thus recognized.

Comparative Example 22

A liquid crystal display was manufactured under the same conditions as in example 53, except that the photomask was modified such that the number of unhardened spacers was 95% of the total number of spacers.

The obtained liquid crystal display was evaluated in the same way as in example 53. As the number of hard spacers (spacers already hardened before superimposition of substrates) required for maintaining the substrate gap was insufficient, the spacers collapsed when substrates were superimposed and heat and pressure were applied. Thus, good liquid crystal display could not be realized with this device.

Comparative Example 23

A liquid crystal display was manufactured under the same conditions as in example 57, except that the photomask was modified such that the cross sectional area of the outer portion, that is, hardened portion of an unhardened spacer was 95% of the total cross-sectional area of the spacer.

The obtained liquid crystal display was evaluated in the same way as in example 53. Adequate adherence of spacers to the other substrate could not be realized, so that, when the center of the display region was depressed using a pen tip of 0.8 mm in tip diameter with a pen load of 100 g, change of display color was observed around the pen tip, and display defect was thus recognized.

Comparative Example 24

A liquid crystal display was manufactured under the same conditions as in example 59, except that the photomask was modified such that the cross sectional area of the outer portion, that is, hardened portion of an unhardened spacer was 95% of the total cross-sectional area of the spacer.

The obtained liquid crystal display was evaluated in the same way as in example 53. Adequate adherence of spacers to the other substrate could not be realized, so that, when the center of the display region was depressed using a pen tip of 0.8 mm in tip diameter with a pen load of 100 g, change of display color was observed around the pen tip, and display defect was thus recognized.

Comparative Example 25

A liquid crystal display was manufactured under the same conditions as in example 53, except that an image reversal resist material (AZ-5200; manufactured by Hoechst) which is hardened at 190° C. for 1 hour was used as spacer material and unhardened spacers were adhered to the other substrate by hardening the unhardened spacers at 190° C. for 1 hour.

Since this temperature for hardening spacers was higher than the temperature at which the effect of rubbing of the orientation film was lost (180° C.), damage due to heat was observed in the orientation films and the display quality of the liquid crystal display was thereby degraded.

As has been described above, in the liquid crystal display according to the fifth aspect of the present invention, the gap between a pair of superimposed substrates can be maintained uniform and constant in the effective display region of the liquid crystal display by using hardened spacers with sufficient strength without being mixed with beads or the like and spacers exhibiting adhesive capability to one substrate when a pair of substrates are superimposed and joined with each other, and the joining of substrates with each other can also be assured. Uniformity of contrast and response speed in the effective display region is thereby improved, and thus, display quality can be improved in the liquid crystal display of the present invention.

Next, examples of liquid crystal display according to the sixth aspect of the present invention will be described in conjunction with comparative examples.

First, examples of a liquid crystal display which is manufactured using a substrate having both spacers exhibiting adhesive capability to the other substrate and spacers not exhibiting adhesive capability to the other substrate formed thereon will be described.

Figure 16:
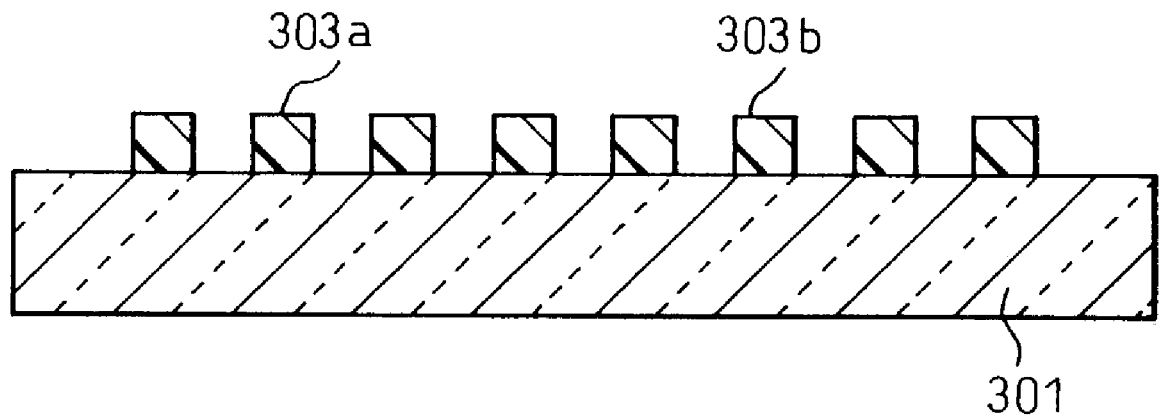
FIG. 16 is a schematic view showing a substrate on which both spacers exhibiting an adhesive capability and spacers not exhibiting an adhesive capability, with regard to the other substrate, are formed.

A photoresist material was spin-coated on a glass substrate having transparent electrodes and an orientation film formed thereon. After being prebaked at 100° C. for 1 minute, this resist film was exposed to light using a photomask and a UV exposure apparatus, and then developed to form spacers on the substrate in a pattern of cylinders of 10 μm in diameter arranged longitudinally and laterally at interval of 100 μm. The spacers thus formed were washed with pure water, and dried. The substrate 301 having spacers thus formed thereon is shown schematically in FIG. 16. A part of spacers on the substrate 301 were spacers 303a exhibiting adhesive capability to the other substrate, and the rest were spacers 303b not exhibiting adhesive capability to the other substrate.

An adhesive sealant was disposed on the periphery of the glass substrate 301 provided with spacers 303a, 303b except a portion left for forming a liquid crystal injection port, and the other glass substrate (not shown) was placed on the glass substrate 301 to form an assembly. This assembly was loaded in a heat treatment apparatus, and was heated under pressure at the curing temperature (110° C.–150° C.) of the spacers 303a and the heat curable resin of the adhesive sealant. By this treatment, the spacers 303a were hardened under pressure so as to join two glass substrates firmly with each other. At the same time, the periphery of the glass substrates was sealed by the adhesive sealant and an empty panel was thus obtained.

Then, liquid crystal was injected through the liquid crystal injection port into the empty panel, and the liquid crystal injection port was finally sealed.

Example 68

A liquid crystal display of example 68 was manufactured in accordance with the above-described manufacturing method of liquid crystal displays.

3 wt % polyimide solution was applied using a spin-coater at the rotation speed of 2,000 rpm to a pair of glass substrates of 200×100×1.1 mm provided with transparent ITO electrodes, and was baked at 200° C. for 30 minutes to form orientation films.

On the orientation film on one of the glass substrates, a negative type photoresist material (TLOR-N; manufactured by Tokyo Ohka Industry Co.) was spin-coated to a film thickness of 2 μm. Prebaking of the formed resist film was performed on a hot plate at 100° C. for 1 minute. Then, the resist film was exposed to light using photomasks and a UV exposure apparatus so as to form a pattern of spacers in the shape of cylinders of 10 μm in diameter arranged longitudinally and laterally at the interval of 200 μm on the substrate. More specifically, the resist film was first exposed to light using a first mask in all the circles (of 10 μm in diameter) for forming spacers at energy of 40 mJ/cm², and then, replacing the first mask with a second mask which permits half of previously exposed circles to be exposed to light in the same pattern as before, the resist film was re-exposed to light at energy of 100 mJ/cm². Then, the resist film was developed to form a pattern of spacers exhibiting adhesive capability to the other substrate and spacers not exhibiting adhesive capability to the other substrate alternately arranged at interval of 200 μm. The proportion of semi-hardened spacers exhibiting adhesive capability to the other substrate was 50% of all the spacers.

Then, a rubbing treatment was performed on the orientation films of both glass substrates.

Next, an epoxy resin that is hardened at 150° C. for 1 hour was attached by printing method to the periphery of one glass substrate except the portion for liquid crystal injection port. The pair of glass substrates were superimposed so as to oppose transparent electrodes to each other, placed into a vacuum bag, and were subjected to heat treatment at 150° C. for 1 hour to harden the epoxy resin as a sealant as well as to harden the spacers exhibiting adhesive capability to the opposing substrate so that the two glass substrates were joined with each other via the spacers. Then, ferroelectric liquid crystal was injected through the liquid crystal injection port (vacuum method), and the injection port was sealed and a ferroelectric liquid crystal display was thus obtained.

When this liquid crystal display was placed under a cross nicol arrangement and was depressed at the center of the display region using a pen tip of 0.8 mm in tip diameter with a pen load of 100 g, no change in display color was observed around the pen tip. It was shown from this observation that this liquid crystal display had stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change all over the surface.

Example 69

A liquid crystal display was manufactured under the same conditions as in example 68, except that the proportion of the semi-hardened spacers was 10%.

When this liquid crystal display was evaluated in the same way as in example 68, it was found that the liquid crystal display exhibits the same good characteristics as example 68.

Example 70

A liquid crystal display was manufactured under the same conditions as in example 68, except that the proportion of the semi-hardened spacers was 90%.

When this liquid crystal display was evaluated in the same way as in example 68, it was found that the liquid crystal display exhibits the same good characteristics as example 68.

Example 71

A liquid crystal display was manufactured under the same conditions as in example 68, except that the spacer exhibiting adhesive capability to the other substrate had outer hardened portion and inner semi-hardened portion with the cross-sectional area of the hardened portion being 10% of the total cross-sectional area of the spacer. As shown schematically in FIG. 17, the semi-hardened spacer 303a exhibiting adhesive capability to the other substrate is formed on the one substrate 301 in the shape of a cylinder which has outer hardened portion 312 and inner semi-hardened portion 314. The bottom surface of the hardened portion 312 was adhered to the substrate 301, and the semi-hardened portion 314 was hardened by heating after the other substrate is superimposed so as to be adhered to the substrate 301 as well as to the other substrate.

When the obtained liquid crystal display was evaluated in the same way as in example 68, it was found that the liquid crystal display exhibits the same good characteristics as example 68.

Example 72

A liquid crystal display was manufactured under the same conditions as in example 68, except that the spacer exhibiting adhesive capability to the other substrate had outer hardened portion and inner semi-hardened portion with the cross-sectional area of the hardened portion being 90% of the total cross-sectional area of the spacer.

When this liquid crystal display was evaluated in the same way as in example 68, it was found that the liquid crystal display exhibits the same good characteristics as example 68.

Example 73

A liquid crystal display was manufactured under the same conditions as in example 68, except that the spacers were pillars with square cross-section and the spacer exhibiting adhesive capability to the other substrate had outer hardened portion and inner semi-hardened portion with the cross-sectional area of the hardened portion being 10% of the total cross-sectional area of the spacer.

When this liquid crystal display was evaluated in the same way as in example 68, it was found that the liquid crystal display exhibits the same good characteristics as example 68.

Example 74

A liquid crystal display was manufactured under the same conditions as in example 68, except that the spacers were pillars with square cross-section and the spacer exhibiting adhesive capability to the other substrate had outer hardened portion and inner semi-hardened portion with the cross-sectional area of the hardened portion being 90% of the total cross-sectional area of the spacer.

When this liquid crystal display was evaluated in the same way as in example 68, it was found that the liquid crystal display exhibits the same good characteristics as example 68.

Example 75

A liquid crystal display was manufactured under the same conditions as in example 68, except that the whole circle (10 µm in diameter) to form a spacer was first exposed to light at 10% of the amount of exposure required for hardening of the resist and then only the outer ring portion (of 6 µm in inner diameter and 2 µm in width) was exposed to light at the rest of the amount of exposure.

When the obtained liquid crystal display was evaluated in the same way as in example 68, it was found that the liquid crystal display exhibits the same good characteristics as example 68.

Example 76

A liquid crystal display was manufactured under the same conditions as in example 68, except that the whole circle (10 µm in diameter) to form a spacer was first exposed to light at 80% of the amount of exposure required for hardening of the resist and then only the outer ring portion (of 6 µm in inner diameter and 2 µm in width) was exposed to light at the rest of the amount of exposure.

When the obtained liquid crystal display was evaluated in the same way as in example 68, it was found that the liquid crystal display exhibits the same good characteristics as example 68.

Example 77

A liquid crystal display was manufactured under the same conditions as in example 68, except that a photomask having light transmissivity varying from peripheral portion to inner portion of circles such that outer ring portion of about 3 µm in width was completely hardened and the inner portion was irradiated at 80% of the amount of exposure required for hardening of the resist.

When this liquid crystal display was evaluated in the same way as in example 68, it was found that the liquid crystal display exhibits the same good characteristics as example 68.

Example 78

A liquid crystal display was manufactured under the same conditions as in example 68, except that the resin film was exposed to light such that the cross-sectional shape of a spacer exhibiting adhesive capability to the other substrate was triple concentric circles composed of an inner circle (of 2 µm in diameter) of hardened portion, an intermediate ring (of 6 µm in outer diameter and 2 µm in width) of semi-hardened portion, and outer ring (of 10 µm in outer diameter and 2 µm in width) of hardened portion.

When this liquid crystal display was evaluated in the same way as in example 68, it was found that the liquid crystal display exhibits the same good characteristics as example 68.

Example 79

A liquid crystal display was manufactured under the same conditions as in example 68, except that the ferroelectric liquid crystal was replaced by twisted nematic type liquid crystal and the substrate gap was set at 6 µm.

When the obtained liquid crystal display was evaluated in the same way as in example 68, it was found that the liquid crystal display exhibits the same good characteristics as example 68.

Example 80

A liquid crystal display was manufactured under the same conditions as in example 68, except that the ferroelectric liquid crystal was replaced by super twisted nematic type liquid crystal and the substrate gap was set at 6 µm.

When this liquid crystal display was evaluated in the same way as in example 68, it was found that the liquid crystal display exhibits the same good characteristics as example 68.

Example 81

A liquid crystal display was manufactured under the same conditions as in example 68, except that the ferroelectric liquid crystal was replaced by nematic cholesteric phase transition type liquid crystal and the substrate gap was set at 6 µm.

When this liquid crystal display was evaluated in the same way as in example 68, it was found that the liquid crystal display exhibits the same good characteristics as example 68.

Example 82

A liquid crystal display was manufactured under the same conditions as in example 68, except that the ferroelectric liquid crystal was replaced-by anti-ferroelectric liquid crystal.

When this liquid crystal display was evaluated in the same way as in example 68, it was found that the liquid crystal display exhibits the same good characteristics as example 68.

Example 83

A liquid crystal display was manufactured under the same conditions as in example 68, except that the ferroelectric liquid crystal was replaced by twist grain boundary liquid crystal and the substrate gap was set at 6 µm.

When this liquid crystal display was evaluated in the same way as in example 68, it was found that the liquid crystal display exhibits the same good characteristics as example 68.

Example 84

A liquid crystal display was manufactured under the same conditions as in example 68, except that the ferroelectric liquid crystal was replaced by smectic A phase liquid crystal and the substrate gap was set at 6 µm.

When this liquid crystal display was evaluated in the same way as in example 68, it was found that the liquid crystal display exhibits the same good characteristics as example 68.

Example 85

A liquid crystal display was manufactured under the same conditions as in example 68, except that a dropping method was adopted in place of vacuum injection method for injecting liquid crystal, and after ferroelectric liquid crystal was dropped on the substrate having spacers formed thereon, the other substrate was superimposed on this substrate and heated so as to join the two substrates via the peripheral sealant and the spacers. As time required for injection of liquid crystal under reduced pressure was eliminated, the time required for the manufacture was shortened as compared to example 68.

When the obtained liquid crystal display was evaluated in the same way as in example 68, it was found that the display shows same good characteristics as example 68.

Comparative Example 26

A liquid crystal display was manufactured under the same conditions as in example 68, except that all the circles of 10 µm in diameter for forming all the spacers were exposed to light at the same time at an energy of 100 mJ/cm$^2$.

The obtained liquid crystal display was evaluated in the same way as in example 68. All the spacers were completely hardened and were not adhered to the other substrate, so that, when center of the display region was depressed using a pen tip of 0.8 mm in tip diameter with a pen load of 100 g, change of display color was observed around the pen tip, and display defect was thus recognized.

Comparative Example 27

A liquid crystal display was manufactured under the same conditions as in example 68, except that all the circles of 10 µm in diameter for forming all the spacers were exposed to light at the same time at energy of 40 mJ/cm$^2$.

The obtained liquid crystal display was evaluated in the same way as in example 68. Every spacer was in semi-hardened state exhibiting adhesive capability to the other substrate so that spacers collapsed when forming a liquid crystal panel, and the gap of 2 µm could not be formed. Therefore, a good liquid crystal display was not realized with this device.

Comparative Example 28

A liquid crystal display was manufactured under the same conditions as in example 68, except that the photomask and exposure condition were controlled such that the number of spacers exhibiting adhesive capability to the other substrate was 8% of the total number of spacers.

This liquid crystal display was evaluated in the same way as in example 68. Adequate adherence of spacers to the other substrate could not be realized, so that, when center of the display region was depressed using a pen tip of 0.8 mm in tip diameter with a pen load of 100 g, change of display color was observed around the pen tip, and a display defect was thus recognized.

Comparative Example 29

A liquid crystal display was manufactured under the same conditions as in example 68, except that the photomask and exposure condition were controlled such that the number of spacers exhibiting adhesive capability to the other substrate was 95% of the total number of spacers.

This liquid crystal display was evaluated in the same way as in example 68. As the number of completely hardened strong spacers required for maintaining the gap between substrates was short, spacers which were adhered to the other substrate when forming an empty panel collapsed, and the gap of 2 µm could not be formed. Therefore, a good liquid crystal display could not be realized with this device.

Comparative Example 30

A liquid crystal display was manufactured under the same conditions as in example 72, except that the photomask and exposure condition were controlled such that the cross-sectional area of the outer portion, that is, a hardened portion of a spacer exhibiting adhesive capability to the other substrate, was 95% of the total cross-sectional area of the spacer.

This liquid crystal display was evaluated in the same way as in example 68. The spacers exhibiting adhesive capability were not adhered to the other substrate sufficiently, so that, when the center of the display region was depressed using a pen tip of 0.8 mm in tip diameter with a pen load of 100 g, a change of display color was observed around the pen tip, and a display defect was thus recognized.

Comparative Example 31

A liquid crystal display was manufactured under the same conditions as in example 73, except that the photomask and exposure condition were controlled such that the cross-sectional area of the outer portion, that is, hardened portion of a spacer exhibiting adhesive capability to the other substrate was 95% of the total cross-sectional area of the spacer.

This liquid crystal display was evaluated in the same way as in example 68. The spacers exhibiting adhesive capability were not adhered to the other substrate sufficiently, so that, when center of the display region was depressed using a pen tip of 0.8 mm in tip diameter with a pen load of 100 g, change of display color was observed around the pen tip, and display defect was thus recognized.

Comparative Example 32

A liquid crystal display was manufactured under the same conditions as in example 75, except that the amount of the first exposure of all the circles forming spacers was 5% of the total amount of exposure required for the resist to be hardened.

As the amount of the primary exposure was insufficient, the resin in the semi-hardened inner portion of spacers was removed in development after the secondary exposure and adherence of spacers to the other substrate was not obtained, so that, when the center of the display region was depressed using a pen tip of 0.8 mm in tip diameter with a pen load of 100 g, change of display color was observed around the pen tip, and display defect was thus recognized.

Comparative Example 33

A liquid crystal display was manufactured under the same conditions as in example 75, except that the amount of the first exposure of all the circles forming spacers was 85% of the total amount of exposure required for resist to be hardened.

This liquid crystal display was evaluated in the same way as in example 68. Before substrates were superimposed on each other, hardening had proceeded far into the inner portion of the spacers which are to exhibit adhesive capability to the other substrate, so that adherence of spacers to the other substrate was not obtained. Therefore, when the center of the display region was depressed using a pen tip of 0.8 mm in tip diameter with a pen load of 100 g, a change of display color was observed around the pen tip, and a display defect was thus recognized.

Comparative Example 34

A liquid crystal display was manufactured under the same conditions as in example 68, except that a negative type resist which is hardened at 190° C. for 1 hour was used as spacer material and was hardened at 190° C. for 1 hour.

Since the curing temperature of spacers was higher than the temperature at which the effect of rubbing of the orientation film was lost (180° C.), damage due to heat was observed in orientation film, and a display quality of the liquid crystal display was degraded.

Next, examples of a liquid crystal display that is manufactured using one substrate having spacers exhibiting adhesive capability formed thereon and the other substrate having spacers not exhibiting adhesive capability formed thereon.

The spacers exhibiting adhesive capability to the other substrate was formed in following procedure. A photoresist material was spin-coated to a first glass substrate having transparent electrodes and an orientation film formed thereon to a film thickness of 2.2 μm. After being prebaked, the resist film was exposed to light using a photomask and a UV exposure apparatus, and developed to form spacers in a pattern of cylinders of 10 μm in diameter arranged longitudinally and laterally at interval of 200 μm on the substrate. The spacers thus formed were washed with pure water and dried.

Next, spacers not exhibiting adhesive capability to the other substrate was formed on a second glass substrate having transparent electrodes and an orientation film formed thereon in the same procedure as described above, except that the photoresist material was spin-coated to a film thickness of 2 μm.

Figure 18:
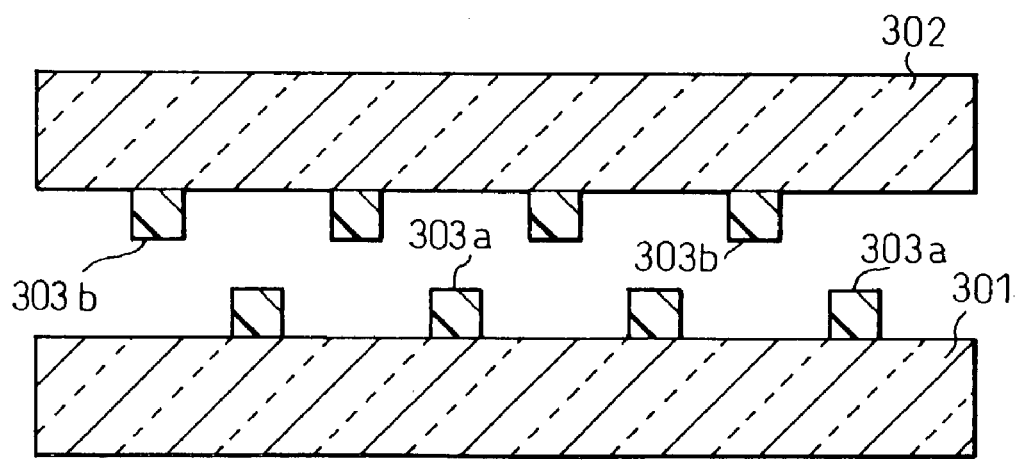
FIG. 18 is a view useful for explaining a first substrate having spacers formed thereon which exhibit an adhesive capability with regard to the other substrate and a second substrate having spacers formed thereon which exhibit no adhesive capability with regard to the other substrate.

As shown in FIG. 18 schematically, the first substrate 301 having spacers 303a exhibiting adhesive capability to the other substrate formed thereon and the second substrate 302 having spacers 303b not exhibiting adhesive capability to the other substrate formed thereon, were opposed to each other, such that the orientation films (not shown) on respective substrates face each other, to form an assembly with the substrate 302 placed on the substrate 301. An adhesive sealant (not shown) was disposed at this time on the periphery of one substrate except the portion for a liquid crystal injection port. This assembly was loaded into a heat treatment apparatus (not shown), and heat and pressure were applied at the curing temperature (110° C.–150° C.) of the spacers 303a and the adhesive sealant. By this treatment, spacers 303a were hardened under pressure so as to adhere the glass substrate 301 firmly to the glass substrate 302. At the same time, the periphery of the glass substrates was sealed by the adhesive sealant and an empty panel was thus obtained.

Then, liquid crystal was injected through the liquid crystal injection port into the empty panel, and the liquid crystal injection port was finally sealed.

Example 86

A liquid crystal display of example 86 was manufactured in accordance with the manufacturing method of liquid crystal display as described above.

3 wt % polyimide solution was applied using a spin-coater at the rotation speed of 2,000 rpm to a pair of glass substrates of 200×100×1.1 mm provided with transparent ITO electrodes over the whole surface, and was baked at 200° C. for 30 minutes to form orientation films.

On the orientation film on the first glass substrate, a negative type photoresist material (TLOR-N; manufactured by Tokyo Ohka Kogyo Co.) was spin-coated to film thickness of 2.2 μm. Prebaking of the formed resist film was performed on a hot plate at 100° C. for 1 minute. Then, the resist film was exposed to light using a photomask and a UV exposure apparatus at energy of 40 mJ/cm² to form a pattern of cylinders of 10 μm in diameter arranged longitudinally and laterally at the interval of 200 μm on the substrate, developed, washed with pure water, and dried at 140° C. to form spacers exhibiting adhesive capability to the other substrate.

Then, on the orientation film on the second glass substrate, the same negative type photoresist material (TLOR-N; manufactured by Tokyo Ohka Kogyo Co.) was spin-coated to film thickness of 2 μm. Prebaking of the formed resist film was performed on a hot plate at 100° C. for 1 minute. Then, the resist film was exposed to light using a UV exposure apparatus at energy of 60 mJ/cm$^2$ and a photomask which has a pattern for forming spacers in the shape of cylinder of 10 µm in diameter arranged longitudinally and laterally at intervals of 200 µm on the second substrate, such that, when the second substrate was superimposed on the first substrate, spacers exhibiting adhesive capability and spacers not exhibiting adhesive capability to the other substrate were alternately arranged. Then, the resist film was developed, washed with pure water, and dried at 140° C. to obtain spacers not exhibiting adhesive capability to the other substrate.

Then, the orientation films on both substrates were subjected to rubbing treatment.

An epoxy resin that is hardened at 150° C. for 1 hour was attached by a printing method to the periphery of one of the glass substrates except the portion for a liquid crystal injection port. The pair of glass substrates were superimposed so as to oppose transparent electrodes to each other, placed into a vacuum bag, and were subjected to heat treatment at 150° C. for 1 hour to harden the epoxy resin as the peripheral sealant as well as to harden the spacers exhibiting adhesive capability to the opposed substrate to thereby join the two glass substrates with each other. Then, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was shown from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Example 87

A liquid crystal display was manufactured under the same conditions as in example 86, except that the orientation films were subjected to rubbing treatment before spacers were formed.

When the obtained liquid crystal display was evaluated in the same way as in example 86, it was found that the liquid crystal display exhibits the same good characteristics as example 86.

Example 88

A liquid crystal display was manufactured under the same conditions as in example 86, except that a positive type photoresist (MICROPOSIT S1818, manufactured by Shipley Far East Co.) was used as the material for forming semi-hardened spacers having adhesive capability to the other substrate, and prebaking of resist film was performed at 100° C. for 5 minutes for semi-hardening, and same positive type photoresist (MICROPOSIT S1818, manufactured by Shipley Far East Co.) was used as the material for forming hardened spacers not having an adhesive capability to the other substrate, and completely hardened spacers were formed by post-baking after development.

When this liquid crystal display was evaluated in the same way as in example 86, it was found that the liquid crystal display exhibits the same good characteristics as example 86.

Example 89

A liquid crystal display was manufactured under the same conditions as in example 86, except that a positive type photoresist (MICROPOSIT S1818, manufactured by Shipley Far East Co.) was used as the material for forming semi-hardened spacers having adhesive capability to the other substrate, and prebaking of the resist film was performed at 100° C. for 5 minutes to obtain semi-hardened spacers.

When this liquid crystal display was evaluated in the same way as in example 86, it was found that the liquid crystal display exhibits the same good characteristics as example 86.

Example 90

A liquid crystal display was manufactured under the same conditions as in example 86, except that the proportion of the number of the semi-hardened spacers having adhesive capability to the other substrate was 10% of total number of spacers.

When this liquid crystal display was evaluated in the same way as in example 86, it was found that the liquid crystal display exhibits the same good characteristics as example 86.

Example 91

A liquid crystal display was manufactured under the same conditions as in example 86, except that the proportion of the number of the semi-hardened spacers having adhesive capability to the other substrate was 90% of total number of spacers.

When this liquid crystal display was evaluated in the same way as in example 86, it was found that the liquid crystal display exhibits the same good characteristics as example 86.

Example 92

A liquid crystal display was manufactured under the same conditions as in example 86, except that the proportion of the number of the semi-hardened spacers having adhesive capability to the other substrate was 90% of total number of spacers per 1 cm$^2$ of display region.

When this liquid crystal display was evaluated in the same way as in example 86, it was found that the liquid crystal display exhibits the same good characteristics as example 86.

Example 93

A liquid crystal display was manufactured under the same conditions as in example 86, except that the unhardened spacer having adhesive capability to the other substrate was a cylinder of double circle structure in cross-section parallel to the substrate with the cross-sectional area of the hardened outer portion being 90% of the total cross-sectional area of the spacer and the center portion being semi-hardened portion.

When this liquid crystal display was evaluated in the same way as in example 86, it was found that the liquid crystal display exhibits the same good characteristics as example 86.

Example 94

A liquid crystal display was manufactured under the same conditions as in example 86, except that the unhardened spacer was a cylinder of double circle structure with the cross-sectional area of the hardened outer portion being 10% of the total cross-sectional area of the spacer and the center portion being semi-hardened portion.

When this liquid crystal display was evaluated in the same way as in example 86, it was found that the liquid crystal display exhibits the same good characteristics as example 86.

Example 95

A liquid crystal display was manufactured under the same conditions as in example 86, except that the ferroelectric liquid crystal was replaced by twisted nematic type liquid crystal and the substrate gap was set at 6 μm.

When this liquid crystal display was evaluated in the same way as in example 86, it was found that the liquid crystal display exhibits the same good characteristics as example 86.

Example 96

A liquid crystal display was manufactured under the same conditions as in example 86, except that the ferroelectric liquid crystal was replaced by super twisted nematic type liquid crystal and the substrate gap was set at 6 μm.

When this liquid crystal display was evaluated in the same way as in example 86, it was found that the liquid crystal display exhibits the same good characteristics as example 86.

Example 97

A liquid crystal display was manufactured under the same conditions as in example 86, except that the ferroelectric liquid crystal was replaced by nematic cholesteric phase transition type liquid crystal and the substrate gap was set at 6 μm.

When this liquid crystal display was evaluated in the same way as in example 86, it was found that the liquid crystal display exhibits the same good characteristics as example 86.

Example 98

A liquid crystal display was manufactured under the same conditions as in example 86, except that the ferroelectric liquid crystal was replaced by anti-ferroelectric liquid crystal.

When this liquid crystal display was evaluated in the same way as in example 86, it was found that the liquid crystal display exhibits the same good characteristics as example 86.

Example 99

A liquid crystal display was manufactured under the same conditions as in example 86, except that the ferroelectric liquid crystal was replaced by twist grain boundary liquid crystal and the substrate gap was set at 6 μm.

When this liquid crystal display was evaluated in the same way as in example 86, it was found that the liquid crystal display exhibits the same good characteristics as example 86.

Example 100

A liquid crystal display was manufactured under the same conditions as in example 86, except that the ferroelectric liquid crystal was replaced by smectic A phase liquid crystal and the substrate gap was set at 6 μm.

When this liquid crystal display was evaluated in the same way as in example 86, it was found that the liquid crystal display exhibits the same good characteristics as example 86.

Example 101

A liquid crystal display was manufactured under the same conditions as in example 86, except that dropping method was adopted in place of vacuum injection method for injecting liquid crystal, and after ferroelectric liquid crystal was dropped on the substrate having spacers formed thereon, the other substrate was superimposed on this substrate and heated so as to join the two substrates via the peripheral sealant and the spacers. As the time required for injection of liquid crystal under reduced pressure was eliminated, time required for the manufacture was shortened as compared to example 86.

When the obtained liquid crystal display was evaluated in the same way as in example 86, it was found that the display shows same good characteristics as example 86.

Comparative Example 35

A liquid crystal display was manufactured under the same conditions as in example 86, except that spacers were formed on only one of the substrates at interval of 100 μm, and all these spacers were spacers exhibiting adhesive capability to the other substrate.

This liquid crystal display was evaluated in the same way as in example 86. When an opposing substrate was superimposed and joined by application of heat and pressure, strength of spacers was low so that spacers collapsed and the gap of 2 μm could not be formed. Therefore, good liquid crystal display was not realized with this device.

Comparative Example 36

A liquid crystal display was manufactured under the same conditions as in example 86, except that spacers were formed on only one of the substrates at interval of 100 μm, and all these spacers were spacers not exhibiting adhesive capability to the other substrate.

This liquid crystal display was evaluated in the same way as in example 86. Spacers had no adhesive capability to the other substrate, so that, when center of the display region was depressed using a pen tip of 0.8 mm in tip diameter with a pen load of 100 g, change of display color was observed around the pen tip, and a display defect was thus recognized.

Comparative Example 37

A liquid crystal display was manufactured under the same conditions as in example 86, except that the number of spacers exhibiting adhesive capability to the other substrate was 8% of the total number of spacers.

This liquid crystal display was evaluated in the same way as in example 86. Adequate adherence of spacers to the other substrate could not be realized, so that, when center of the display region was depressed using a pen tip of 0.8 mm in tip diameter with a pen load of 100 g, change of display color was observed around the pen tip, and a display defect was thus recognized.

Comparative Example 38

A liquid crystal display was manufactured under the same conditions as in example 86, except that the number of spacers exhibiting adhesive capability to the other substrate was 95% of the total number of spacers.

This liquid crystal display was evaluated in the same way as in example 86. Since strength of spacers was inadequate, spacers collapsed when forming an empty panel, and the gap of 2 μm could not be formed. Therefore, good liquid crystal display could not be realized with this device.

Comparative Example 39

A liquid crystal display was manufactured under the same conditions as in example 86, except that the proportion of the number of semi-hardened spacers exhibiting adhesive capability to the other substrate to the total number of spacers per 1 cm$^2$ of display region was 8% of the total number of spacers and the rest were spacers not exhibiting adhesive capability.

This liquid crystal display was evaluated in the same way as in example 86. Adhesive capability of spacers to the other substrate was not enough, so that, when center of the display region was depressed using a pen tip of 0.8 mm in tip diameter with a pen load of 100 g, change of display color was observed around the pen tip, and a display defect was thus recognized.

Comparative Example 40

A liquid crystal display was manufactured under the same conditions as in example 86, except that the proportion of the number of semi-hardened spacers exhibiting adhesive capability to the other substrate to the total number of spacers per 1 cm$^2$ of display region was 92% of the total number of spacers and the rest were spacers not exhibiting adhesive capability.

This liquid crystal display was evaluated in the same way as in example 86. As the strength of spacers was inadequate, spacers collapsed when forming an empty panel, and the gap of 2 μm could not be formed. Therefore, good liquid crystal display could not be realized with this device.

Comparative Example 41

A liquid crystal display was manufactured under the same conditions as in example 96, except that spacers, in which the cross-sectional area of hardened outer wall was 95% of the total cross-sectional area of the spacer, were used as unhardened spacers having adhesive capability to the other substrate.

This liquid crystal display was evaluated in the same way as in example 86. The adhesive capability of spacers to the other substrate was not enough, so that, when center of the display region was depressed using a pen tip of 0.8 mm in tip diameter with a pen load of 100 g, a change of display color was observed around the pen tip, and a display defect was thus recognized.

Comparative Example 42

A liquid crystal display was manufactured under the same conditions as in example 86, except that a negative type resist which is hardened at 190° C. for 1 hour was used as spacer material and was hardened at 190° C. for 1 hour.

As the curing temperature of spacers was higher than the temperature at which the effect of rubbing of the orientation film was lost (180° C.), damage due to heat was observed in orientation film, and the display quality of the liquid crystal display was degraded.

As has been described above, in the liquid crystal display according to the sixth aspect of the present invention, the gap between a pair of substrates can be maintained uniform and constant in the effective display region of the liquid crystal display by using hardened spacers with sufficient strength without being mixed with beads or the like in conjunction with spacers exhibiting adhesive capability to a substrate. Uniformity of contrast and response speed in the effective display region is thereby improved, and thus, a display quality can be improved in the liquid crystal display of the present invention.

Next, examples of liquid crystal display according to the seventh aspect of the present invention will be described in conjunction with comparative examples.

First, the step of sealing the liquid crystal display while maintaining the uniform and constant gap between electrodes in the liquid crystal display, will be described. Material used and the like will be described more specifically in subsequent examples.

A photoresist material was spin-coated on a glass substrate having a transparent electrode as a common electrode and an orientation film formed thereon. After being prebaked, this resist film was exposed to light using a photomask and a UV exposure apparatus, and then developed to form spacers on the substrate in a pattern of cylinders of 10 μm in diameter arranged longitudinally and laterally at interval of 100 μm. The spacers thus formed were washed with pure water, and dried.

An adhesive sealant was disposed on the periphery of the glass substrate provided with spacers with a portion left to form a liquid crystal injection port, and the other glass substrate having individual electrodes formed thereon was placed on the glass substrate to form an assembly. This assembly was loaded into a heat treatment apparatus, and heat and pressure were applied at the curing temperature (110° C.–150° C.) of the spacer and the heat curable resin of adhesive sealant. By this treatment, spacers were hardened under pressure so as to adhere glass substrates firmly to each other. At the same time, the periphery of the glass substrates was sealed by the adhesive sealant and an empty panel was thus obtained.

Then, liquid crystal was injected through the liquid crystal injection port into the empty panel, and the liquid crystal injection port was finally sealed.

Example 102

A liquid crystal display of example 102 was manufactured in accordance with the above-described manufacturing method of liquid crystal displays.

3 wt % polyimide solution was applied using a spin-coater at the rotation speed of 2,000 rpm to a glass substrate (common electrode substrate) of 200×100×1.1 mm provided with transparent electrode as a common electrode, and was baked at 200° C. for 30 minutes to form orientation films.

On the orientation film on the glass substrate, a negative type photoresist material (CFPR-CL; manufactured by Tokyo Ohka Industry Co.) was spin-coated to a film thickness of 2 μm. Prebaking of the formed resist film was performed on a hot plate at 100° C. for 1 minute. Then, the resist film was exposed to light using a UV exposure apparatus and a photomask adapted to form a pattern of spacers in the shape of cylinders of 10 μm in diameter arranged longitudinally and laterally at the interval of 100 μm on the substrate, at an energy of 220 mJ/cm$^2$ to form unhardened (semi-hardened) spacers. Then, the resist film was developed to form spacers, washed with pure water, and dried.

On the other glass substrate (individual electrode substrate) provided with individual electrodes, a photosensitive polyimide solution was applied at rotation speed of 4000 rpm, and prebaking was performed at 100° C. for 1 minute to form a photosensitive polyimide film.

Then, using a mask that permits the portion at which the spacers formed on the other substrate (common electrode substrate) come into contact with the surface of the individual electrode substrate to be exposed to light, the photosensitive polyimide film was exposed to light at energy of 800 mJ/cm$^2$ by a UV exposure apparatus. Then, the polyimide film was developed, washed with pure water, and dried to form an orientation film in which the polyimide material was removed in a pattern of circles of 10 μm in diameter arranged longitudinally and laterally at interval of 100 μm corresponding to the portion where spacers come into contact with the individual electrode substrate.

Then, the orientation films on both substrates were subjected to rubbing treatment.

An epoxy resin that is hardened at 150° C. for 1 hour was attached by printing method to the periphery of one of the glass substrates except the portion for a liquid crystal injection port. The pair of glass substrates were superimposed such that transparent electrodes faced each other and the tip of spacers provided on the common electrode substrate were brought into contact with the portion of the individual electrode substrate having the orientation film removed, placed into a vacuum bag, and subjected to heat treatment at 150° C. for 1 hour. By this treatment, the epoxy resin as the peripheral sealant as well as the resist as spacer material was hardened to join the glass substrates with each other. Then, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Example 103

A liquid crystal display was manufactured under the same conditions as in example 102, except that a photosensitive acrylate resin was used in place of the photosensitive polyimide for forming the orientation film on the individual electrode substrate.

When this liquid crystal display was evaluated in the same way as in example 102, it was found that the liquid crystal display exhibits the same good characteristics as example 102.

Example 104

A liquid crystal display was manufactured under the same conditions as in example 102, except that the number of circular portions formed by selectively removing the photosensitive polyimide orientation film formed on the individual electrode substrate in example 102, was reduced to 50% of the total number of spacers.

When this liquid crystal display was evaluated in the same way as in example 102, it was found that the liquid crystal display exhibits the same good characteristics as example 102.

Example 105

A liquid crystal display was manufactured under the same conditions as in example 102, except that the area of the circular portion formed by selectively removing the photosensitive polyimide orientation film formed on the individual electrode substrate in example 102, was 70% of the area of the end face of the spacer brought into contact with it.

When this liquid crystal display was evaluated in the same way as in example 102, it was found that the liquid crystal display exhibits the same good characteristics as example 102.

Example 106

A liquid crystal display was manufactured under the same conditions as in example 102, except that the area of the circular portion formed by selectively removing the photosensitive polyimide orientation film formed on the individual electrode substrate in example 102, was 130% of the area of the end face of the spacer brought into contact with it.

When this liquid crystal display was evaluated in the same way as in example 102, it was found that the liquid crystal display exhibits the same good characteristics as example 102.

Example 107

A liquid crystal display was manufactured under the same conditions as in example 102, except that same photosensitive polyimide was used to form an orientation film on the substrate having spacers formed thereon in advance (common electrode substrate) as was applied to the other substrate (individual electrode substrate).

When this liquid crystal display was evaluated in the same way as in example 102, it was found that the liquid crystal display exhibits the same good characteristics as example 102.

Example 108

A liquid crystal display was manufactured under the same conditions as in example 102, except that spacers were formed as cylinders having double circle structure in cross-section, the double circle structure consisting of outer hardened portion and inner semi-hardened portion, with the cross-sectional area of the hardened portion being 10% of the total cross section of the spacers.

The cylindrical spacers having double circle structure in cross-section were formed by exposing the portions of whole circle for forming spacers (10 µm in diameter) to light at energy of 220 mJ/cm², and then re-exposing only the outer portions to light at energy of 200 mJ/cm², developing, washing with pure water, and drying the resist film. The spacer having a double circle structure in cross-section that was thus formed is shown schematically in FIG. 17. This spacer was formed in the shape of a cylinder on one substrate 301, and had outer hardened portion 312 and inner semi-hardened portion 314.

When this liquid crystal display was evaluated in the same way as in example 102, it was found that the liquid crystal display exhibits the same good characteristics as example 102.

Example 109

A liquid crystal display was manufactured under the same conditions as in example 102, except that the cylindrical spacers having same double circle structure in cross-section as was formed in example 108, were formed such that the cross-sectional area of the outer hardened portion was 90% of the total cross-sectional area of spacers.

When this liquid crystal display was evaluated in the same way as in example 102, it was found that the liquid crystal display exhibits the same good characteristics as example 102.

Example 110

A liquid crystal display was manufactured under the same conditions as in example 102, except that the ferroelectric liquid crystal was replaced by twisted nematic type liquid crystal and the substrate gap was set at 6 µm.

When this liquid crystal display was evaluated in the same way as in example 102, it was found that the liquid crystal display exhibits the same good characteristics as example 102.

Example 111

A liquid crystal display was manufactured under the same conditions as in example 102, except that the ferroelectric liquid crystal was replaced by super twisted nematic type liquid crystal and the substrate gap was set at 6 µam.

When this liquid crystal display was evaluated in the same way as in example 102, it was found that the liquid crystal display exhibits the same good characteristics as example 102.

Example 112

A liquid crystal display was manufactured under the same conditions as in example 102, except that the ferroelectric liquid crystal was replaced by nematic cholesteric phase transition type liquid crystal and the substrate gap was set at 6 µm.

When this liquid crystal display was evaluated in the same way as in example 102, it was found that the liquid crystal display exhibits the same good characteristics as example 102.

Example 113

A liquid crystal display was manufactured under the same conditions as in example 102, except that the ferroelectric liquid crystal was replaced by anti-ferroelectric liquid crystal.

When this liquid crystal display was evaluated in the same way as in example 102, it was found that the liquid crystal display exhibits the same good characteristics as example 102.

Example 114

A liquid crystal display was manufactured under the same conditions as in example 102, except that the ferroelectric liquid crystal was replaced by twist grain boundary liquid crystal and the substrate gap was set at 6 µm.

When this liquid crystal display was evaluated in the same way as in example 102, it was found that the liquid crystal display exhibits the same good characteristics as example 102.

Example 115

A liquid crystal display was manufactured under the same conditions as in example 102, except that the ferroelectric liquid crystal was replaced by smectic A phase liquid crystal and the substrate gap was set at 6 µm.

When this liquid crystal display was evaluated in the same way as in example 102, it was found that the liquid crystal display exhibits the same good characteristics as example 102.

Example 116

A liquid crystal display was manufactured under the same conditions as in example 102, except that dropping method was adopted in place of vacuum injection method for injecting liquid crystal, and after ferroelectric liquid crystal was dropped on the substrate having spacers formed thereon and a sealing member disposed on the periphery thereof, the other substrate was superimposed on this substrate and heated so as to join the two substrates via the peripheral sealant and the spacers. As the time required for injection of liquid crystal under reduced pressure was eliminated, the time required for the manufacture was shortened as compared to example 102.

When this liquid crystal display was evaluated in the same way as in example 102, it was found that the liquid crystal display exhibits same good characteristics as example 102.

Comparative Example 43

A liquid crystal display was manufactured under the same conditions as in example 102, except that the orientation films on a pair of substrates were formed from a non-photosensitive polyimide without using a photosensitive polyimide, and the portion of the polyimide film on the individual electrode substrate which came into contact with spacers was not removed.

This liquid crystal display was evaluated in the same way as in example 102. Spacers were not adequately adhered to the individual electrode substrate, so that, when the center of the display region was depressed using a pen tip of 0.8 mm in tip diameter with a pen load of 100 g, a change of display color was observed around the pen tip, and a display defect was thus recognized.

Comparative Example 44

A liquid crystal display was manufactured under the same conditions as in example 102, except that the number of circular portions formed by selectively removing the photosensitive polyimide orientation film formed on the individual electrode substrate in example 102, was reduced to 40% of the total number of spacers.

This liquid crystal display was evaluated in the same way as in example 102. Number of spacers adhered to the individual electrode substrate was not enough and adequate adherence to the individual electrode substrate was not obtained, so that, when the center of the display region was depressed using a pen tip of 0.8 mm in tip diameter with a pen load of 100 g, a change of display color was observed around the pen tip, and a display defect was thus recognized.

Comparative Example 45

A liquid crystal display was manufactured under the same conditions as in example 102, except that the area of circular portion formed by selectively removing the photosensitive polyimide orientation film formed on the individual electrode substrate in example 102, was 60% of the total area of the end face of the spacer brought into contact with it.

This liquid crystal display was evaluated in the same way as in example 102. Individual spacer came into contact with the individual electrode substrate only in small area, so that, adherence of spacers to the substrate was inadequate, and when the center of the display region was depressed using a pen tip of 0.8 mm in tip diameter with a pen load of 100 g, a change of display color was observed around the pen tip, and a display defect was thus recognized.

Comparative Example 46

A liquid crystal display was manufactured under the same conditions as in example 102, except that the area of circular portion formed by selectively removing the photosensitive polyimide orientation film formed on the individual electrode substrate in example 102, was 140% of the total area of the end face of the spacer brought into contact with it.

This liquid crystal display was evaluated in the same way as in example 102. The orientation film was removed in a large area and the glass substrate was exposed too much. The liquid crystal on the exposed glass substrate was not orientated so that a good liquid crystal display was not obtained.

Comparative Example 47

A liquid crystal display was manufactured under the same conditions as in example 102, except that a negative type resist which is hardened at 190° C. for 1 hour was used as spacer material and was hardened at 190° C. for 1 hour. Damage due to heat was observed in orientation film, and display quality of the liquid crystal display was degraded.

As has been described above, according to the seventh aspect of the present invention, a liquid crystal display can be provided in which the spacers having sufficient strength without being mixed with beads or the like are firmly adhered to both of the opposed substrates. This liquid crystal display permits the gap between a pair of substrates to be maintained uniform and constant in the effective display region, and can improve uniformity of contrast and response speed in the effective display region, and thus, can exhibit an improved display quality.

Next, examples of liquid crystal display according to the eighth aspect of the present invention will be described in conjunction with comparative examples.

First, the step of sealing the liquid crystal display while maintaining the uniform and constant gap between electrodes in the liquid crystal display, will be described. Material used, and the like, will be described more specifically in subsequent examples.

A photoresist material was spin-coated on a glass substrate having transparent electrodes and an orientation film formed thereon. After being prebaked at 100° C. for 1 minute, the resist film was exposed to light in two steps using two type of photomasks and a UV exposure apparatus, and was developed to form spacers (having outer hardened portion and inner semi-hardened portion in cross-section parallel to the substrate) in a pattern of cylinders of 10 μm in diameter arranged longitudinally and laterally at interval of 100 μm on the substrate. The spacers thus formed were washed with pure water and dried.

An adhesive sealant was disposed on the periphery of the glass substrate provided with spacers so as to leave a portion for forming a liquid crystal injection port. The other glass substrate was placed on this glass substrate to form an assembly. This assembly was loaded into a heat treatment apparatus, and heat and pressure were applied at the curing temperature (110° C.–150° C.) of the spacer and the heat curable resin of adhesive sealant. By this treatment, the semi-hardened portions of the spacers were hardened under pressure so as to adhere two glass substrates firmly to each other. At the same time, the periphery of the glass substrates was sealed by the adhesive sealant and an empty panel was thus obtained.

Then, liquid crystal was injected through the liquid crystal injection port into the empty panel, and the liquid crystal injection port was finally sealed.

Example 117

A liquid crystal display of example 117 was manufactured in accordance with the above-described manufacturing method of liquid crystal displays.

A 3 wt % polyimide solution was applied using a spin-coater at the rotation speed of 2000 rpm to a pair of glass substrates of 200×100×1.1 mm provided with ITO transparent electrodes all over the surface, and was baked at 200° C. for 30 minutes to form orientation films.

On the orientation film on one of the glass substrates, a negative type photoresist material (TLOR-N; manufactured by Tokyo Ohka Industry Co.) was spin-coated to a film thickness of 1.8 μm. Prebaking of the formed resist film was performed on a hot plate at 100° C. for 1 minute. Then, the resist film was exposed to light using a UV exposure apparatus so as to form a pattern of spacers in the shape of double circle of 10 μm in diameter in cross-section parallel to the substrate arranged longitudinally and laterally at interval of 100 μm on the substrate. More specifically, the whole of the circles (10 μm in diameter) to form spacers were first exposed to light at energy of 30 mJ/cm$^2$, and then only ring portions (6 μm in inner diameter and 2 μm in width) to form outer wall portions were re-exposed to light at energy of 40 mJ/cm$^2$, so that, in a plane parallel to the substrate, portions of different degree of hardening were mixedly present (semi-hardened portion inside a circle of 6 µm in diameter and hardened outer wall portion of 2 µm in width). The resist film was then developed to form spacers, washed with pure water, and dried.

Figure 17:
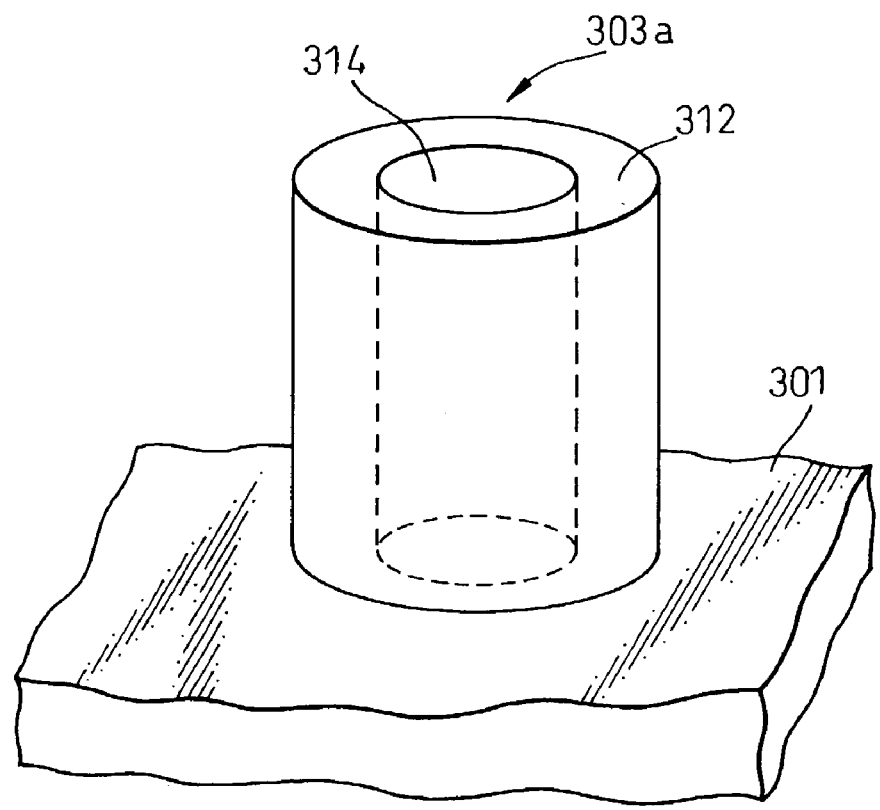
FIG. 17 is a view showing a spacer which has both portions adhesive and portions non-adhesive to the other substrate.

The spacer having double circle shape in cross-section that was thus formed is as shown schematically in FIG. 17. This spacer was formed in the shape of a cylinder on one substrate 301, and had outer hardened portion 312 and inner semi-hardened portion 314. The hardened portion 312 was adhered at the bottom surface to the substrate 301, while the semi-hardened portion 314 was hardened by heating after the other substrate (not shown) was superimposed so as to be adhered to the substrate 301 as well as to the other substrate.

Then, the orientation films on both substrates were subjected to a rubbing treatment.

An epoxy resin that is hardened at 150° C. for 1 hour was attached by a printing method to the periphery of one of the glass substrates except the portion for a liquid crystal injection port. The pair of glass substrates were superimposed such that transparent electrodes faced each other, placed into a vacuum bag, and subjected to heat treatment at 150° C. for 1 hour. By this treatment, the epoxy resin as the peripheral sealant as well as the inner semi-hardened portion of spacers was hardened to join the glass substrates with each other. Then, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Example 118

A liquid crystal display was manufactured under the same conditions as in example 117, except that spacers were pillars having square cross-section of 10×10 µm, wherein cross-sectional area of the outer hardened portions was 50% of total cross-sectional area of spacers and center portion was semi-hardened portion as in example 117.

When this liquid crystal display was evaluated in the same way as in example 117, it was found that the liquid crystal display exhibits the same good characteristics as example 117.

Example 119

A liquid crystal display was manufactured under the same conditions as in example 117, except that the cross-sectional shape of a spacer was a triple circle and exposure was performed such that the innermost circular portion (2 µm in diameter) was hardened portion, the adjoining inner ring portion (4 µm in outer diameter and 2 µm in width) was a semi-hardened portion and an outermost ring portion (6 µm in outer diameter and 2 µm in width) was a hardened portion.

When this liquid crystal display was evaluated in the same way as in example 117, it was found that the liquid crystal display exhibits the same good characteristics as example 117.

Example 120

A liquid crystal display was manufactured under the same conditions as in example 117, except that the spacers were in the shape of cylinder wherein the cross-sectional area of outer hardened portion was 10% of the total cross-sectional area of the spacer and center portion was a semi-hardened portion.

When this liquid crystal display was evaluated in the same way as in example 117, it was found that the liquid crystal display exhibits the same good characteristics as example 117.

Example 121

A liquid crystal display was manufactured under the same conditions as in example 117, except that the spacers were in the shape of cylinder wherein the cross-sectional area of outer hardened portion was 90% of the total cross-sectional area of the spacer and center portion was a semi-hardened portion.

When this liquid crystal display was evaluated in the same way as in example 117, it was found that the liquid crystal display exhibits the same good characteristics as example 117.

Example 122

A liquid crystal display was manufactured under the same conditions as in example 117, except that spacers were pillars having square cross-section of 10×10 µm, wherein cross-sectional area of the outer hardened portions was 10% of total cross-sectional area of spacers and center portion was semi-hardened portion.

When this liquid crystal display was evaluated in the same way as in example 117, it was found that the liquid crystal display exhibits the same good characteristics as example 117.

Example 123

A liquid crystal display was manufactured under the same conditions as in example 117, except that spacers were pillars having square cross-section of 10×10 µm, wherein cross-sectional area of the outer hardened portions was 90% of total cross-sectional area of spacers and center portion was semi-hardened portion.

When the obtained liquid crystal display was evaluated in the same way as in example 117, it was found that the liquid crystal display exhibits the same good characteristics as example 117.

Example 124

A liquid crystal display was manufactured under the same conditions as in example 117, except that, in exposing the resist to light, the whole circle (10 µm in diameter) forming a spacer was first exposed to light at 10% of the amount of exposure required to harden the resist, and then only the outer ring portion (6 µm in inner diameter and 2 µm in width) was exposed to light at the rest of the required amount of exposure to form a hardened portion.

When the obtained liquid crystal display was evaluated in the same way as in example 117, it was found that the liquid crystal display exhibits the same good characteristics as example 117.

Example 125

A liquid crystal display was manufactured under the same conditions as in example 117, except that, in exposing the resist to light, the whole circle (10 µm in diameter) forming a spacer was first exposed to light at 80% of the amount of exposure required to harden the resist, and then only the outer ring portion (6 µm in inner diameter and 2 µm in width) was exposed to light at the rest of the required amount of exposure to form hardened portion.

When the obtained liquid crystal display was evaluated in the same way as in example 117, it was found that the liquid crystal display exhibits the same good characteristics as example 117.

Example 126

A liquid crystal display was manufactured under the same conditions as in example 117, except that the resist was exposed to light using a photomask with light transmissivity varying from outer periphery to center portion such that outer ring portion of about 3 µm in width was completely hardened and inner portion was irradiated at 60% of the amount of exposure required for hardening of the resist.

When the obtained liquid crystal display was evaluated in the same way as in example 117, it was found that the liquid crystal display exhibits the same good characteristics as example 117.

Example 127

A liquid crystal display was manufactured under the same conditions as in example 117, except that the ferroelectric liquid crystal was replaced by a twisted nematic type liquid crystal and the substrate gap was set at 6 µm.

When this liquid crystal display was evaluated in the same way as in example 117, it was found that the liquid crystal display exhibits the same good characteristics as example 117.

Example 128

A liquid crystal display was manufactured under the same conditions as in example 117, except that the ferroelectric liquid crystal was replaced by super twisted nematic type liquid crystal and the substrate gap was set at 6 µm.

When this liquid crystal display was evaluated in the same way as in example 117, it was found that the liquid crystal display exhibits the same good characteristics as example 117.

Example 129

A liquid crystal display was manufactured under the same conditions as in example 117, except that the ferroelectric liquid crystal was replaced by nematic cholesteric phase transition type liquid crystal and the substrate gap was set at 6 µm.

When this liquid crystal display was evaluated in the same way as in example 117, it was found that the liquid crystal display exhibits the same good characteristics as example 117.

Example 130

A liquid crystal display was manufactured under the same conditions as in example 117, except that the ferroelectric liquid crystal was replaced by anti-ferroelectric liquid crystal.

When this liquid crystal display was evaluated in the same way as in example 117, it was found that the liquid crystal display exhibits the same good characteristics as example 117.

Example 131

A liquid crystal display was manufactured under the same conditions as in example 117, except that the ferroelectric liquid crystal was replaced by twist grain boundary liquid crystal and the substrate gap was set at 6 µm.

When this liquid crystal display was evaluated in the same way as in example 117, it was found that the liquid crystal display exhibits the same good characteristics as example 117.

Example 132

A liquid crystal display was manufactured under the same conditions as in example 117, except that the ferroelectric liquid crystal was replaced by smectic A phase liquid crystal and the substrate gap was set at 6 µm.

When this liquid crystal display was evaluated in the same way as in example 117, it was found that the liquid crystal display exhibits the same good characteristics as example 117.

Example 133

A liquid crystal display was manufactured under the same conditions as in example 117, except that dropping method was adopted in place of vacuum injection method for injecting liquid crystal, and after ferroelectric liquid crystal was dropped on the substrate having spacers consisting of hardened portion and semi-hardened portion formed thereon and a sealing member disposed on the periphery thereof, the other substrate was superimposed on this substrate and heated so as to join the two substrates via the peripheral sealant and the spacers. As the time required for injection of liquid crystal under reduced pressure was eliminated, the time required for the manufacture was shortened as compared to example 117.

When this liquid crystal display was evaluated in the same way as in example 117, it was found that the liquid crystal display exhibits same good characteristics as example 117.

Comparative Example 48

A liquid crystal display was manufactured under the same conditions as in example 117, except that all circles of 10 µm in diameter for forming spacers were wholly exposed to light at energy of 100 mJ/cm² all at once.

The obtained liquid crystal display was evaluated in the same way as in example 117. Spacers were not adequately adhered to the other substrate, so that, when the center of the display region was depressed using a pen tip of 0.8 mm in tip diameter with a pen load of 100 g, a change of display color was observed around the pen tip, and a display defect was thus recognized.

Comparative Example 49

A liquid crystal display was manufactured under the same conditions as in example 117, except that all circles of 10 μm in diameter for forming spacers were wholly exposed to light at energy of 30 mJ/cm² all at once.

The obtained liquid crystal display was evaluated in the same way as in example 117. Spacers had no hardened portion and therefore only low strength, so that spacers collapsed when forming a liquid crystal panel, and a gap of 1.8 μm could not be formed. Therefore, good liquid crystal display could not be realized with this device.

Comparative Example 50

A liquid crystal display was manufactured under the same conditions as in example 117, except that the photomask and exposure condition were controlled such that the semi-hardened portion of spacers was 8% of the total cross-sectional area of the spacers.

This liquid crystal display was evaluated in the same way as in example 117. The adhesive capability of spacers to the other substrate was not enough, so that, when the center of the display region was depressed using a pen tip of 0.8 mm in tip diameter with a pen load of 100 g, a change of display color was observed around the pen tip, and a display defect was thus recognized.

Comparative Example 51

A liquid crystal display was manufactured under the same conditions as in example 117, except that the photomask and exposure condition were controlled such that the semi-hardened portion of spacers was 95% of the total cross-sectional area of spacers.

This liquid crystal display was evaluated in the same way as in example 117. Semi-hardened portion was too large, and strength of spacers was not enough when substrates were superposed to each other, so that spacers collapsed when forming a liquid crystal display and gap of 1.8 μm could not be formed. Therefore, good liquid crystal display could not be realized with this device.

Comparative Example 52

A liquid crystal display was manufactured under the same conditions as in example 120, except that the photomask and exposure condition were controlled such that the cross-sectional area of the outer portion, that is, hardened portion of spacers was 8% of the total cross-sectional area of spacers.

This liquid crystal display was evaluated in the same way as in example 117. Hardened portion of spacers was too small and did not provide adequate strength, so that spacers collapsed when forming a liquid crystal panel and gap of 1.8 μm could not be formed. Therefore, good liquid crystal display could not be realized with this device.

Comparative Example 53

A liquid crystal display was manufactured under the same conditions as in example 120, except that the photomask and exposure condition were controlled such that the cross-sectional area of the outer portion, that is, the hardened portion of spacers was 95% of the total cross-sectional area of spacers.

This liquid crystal display was evaluated in the same way as in example 117. Adhesive capability of spacers to the other substrate was not enough, so that, when the center of the display region was depressed using a pen tip of 0.8 mm in tip diameter with a pen load of 100 g, a change of display color was observed around the pen tip, and a display defect was thus recognized.

Comparative Example 54

A liquid crystal display was manufactured under the same conditions as in example 122, except that the photomask and exposure condition were controlled such that the cross-sectional area of the outer portion, that is, hardened portion of spacers was 8% of the total cross-sectional area of spacers.

This liquid crystal display was evaluated in the same way as in example 117. Hardened portion is too small and strength of spacers was inadequate, so that spacers collapsed when forming a liquid crystal panel and gap of 1.8 μm could not be formed. Therefore, a good liquid crystal display could not be realized with this device.

Comparative Example 55

A liquid crystal display was manufactured under the same conditions as in example 122, except that the photomask and exposure condition were controlled such that the cross-sectional area of the outer portion, that is, hardened portion of spacers was 95% of the total cross-sectional area of spacers.

This liquid crystal display was evaluated in the same way as in example 117. The adhesive capability of spacers to the other substrate was not enough, so that, when the center of the display region was depressed using a pen tip of 0.8 mm in tip diameter with a pen load of 100 g, a change of display color was observed around the pen tip, and a display defect was thus recognized.

Comparative Example 56

A liquid crystal display was manufactured under the same conditions as in example 124, except that the whole circles forming spacers were exposed to light at 5% of the amount of exposure required to harden the resist.

The amount of exposure in the primary exposure was insufficient and the resin in the inner semi-hardened portion of the spacers was removed in development after the secondary exposure, so that the spacers were not adhered to the substrate. Therefore, when the center of the display region was depressed using a pen tip of 0.8 mm in tip diameter with a pen load of 100 g, a change of display color was observed around the pen tip, and a display defect was thus recognized.

Comparative Example 57

A liquid crystal display was manufactured under the same conditions as in example 124, except that the whole circles forming spacers were exposed to light at 85% of the amount of exposure required to harden the resist.

This liquid crystal display was evaluated in the same way as in example 117. Hardening had proceeded far into the inner portion of spacers before the substrates were superimposed to each other, and therefore, adequate adherence of spacers to the substrate was not obtained, so that, when the center of the display region was depressed using a pen tip of 0.8 mm in tip diameter with a pen load of 100 g, a change of display color was observed around the pen tip, and a display defect was thus recognized.

Comparative Example 58

A liquid crystal display was manufactured under the same conditions as in example 124, except that only the outer portion (6 μm in diameter and 2 μm in width) was exposed to light at 10% of the amount of exposure required to harden the resist.

This liquid crystal display was evaluated in the same way as in example 117. The spacers had no portion that was completely hardened, and therefore, the strength of spacers was not enough, so that spacers collapsed when forming a liquid crystal panel and gap of 1.8 μm could not be formed. Therefore, a good liquid crystal display could not be realized with this device.

Comparative Example 59

A liquid crystal display was manufactured under the same conditions as in example 117, except that a negative type resist which is hardened at 190° C. for 1 hour was used as spacer material and was hardened at 190° C. for 1 hour.

As the curing temperature of spacers was higher than the temperature at which the effect of rubbing of the orientation film was lost (150° C.), damage due to heat was observed in orientation film, and the display quality of the liquid crystal display was degraded.

As has been described above, in the liquid crystal display according to the eighth aspect of the present invention, the gap between a pair of substrates can be maintained uniform and constant in the effective display region of the liquid crystal display by using spacers which have sufficient strength without being mixed with beads or the like and which have also adhesive capability to the substrates. This liquid crystal display can thereby improve uniformity of contrast and response speed in the effective display region, and thus, can exhibit an improved display quality.

Next, examples of liquid crystal display according to the ninth aspect of the present invention will be described in conjunction with comparative examples.

First, the step of sealing the liquid crystal display while maintaining the uniform and constant gap between electrodes in the liquid crystal display, will be described. Material used and the like will be described more specifically in subsequent examples.

A mixture of a negative type photoresist material with a thermoplastic resin at 3 wt % of the material added thereto was spin-coated on a glass substrate having transparent electrodes and an orientation film formed thereon. After being prebaked at 100° C. for 1 minute, the resist film was exposed to light using a photomask and a UV exposure apparatus, and was developed to form spacers in a pattern of cylinders of 10 μm in diameter arranged longitudinally and laterally at intervals of 100 μm on the substrate. The spacers thus formed were washed with pure water and dried. Then, post-baking was performed at 150° C. for 60 minutes to form hardened pillar-shaped spacers.

An adhesive sealant was disposed on the periphery of the glass substrate provided with spacers so as to leave a portion for forming a liquid crystal injection port. The other glass substrate was placed on this glass substrate to form an assembly. This assembly was loaded into a heat treatment apparatus, and heat and pressure were applied at the curing temperature (110° C.–150° C.) of the heat curable resin of adhesive sealant. By this treatment, all the pillar-shaped spacers were under pressure, the thermoplastic resin added in the pillar-shaped spacers was softened so as to adhere the glass substrates firmly to each other. At the same time, the periphery of the glass substrates was sealed by the adhesive sealant and an empty panel was thus obtained.

Then, liquid crystal was injected through the liquid crystal injection port into the empty panel, and the liquid crystal injection port was finally sealed.

Example 134

A liquid crystal display of example 134 was manufactured in accordance with the above-described manufacturing method of liquid crystal displays.

3 wt % polyimide solution was applied using a spin-coater at the rotation speed of 2,000 rpm to a pair of glass substrates of 200×100×1.1 mm provided with ITO transparent electrodes all over the surface, and was baked at 200° C. for 30 minutes to form orientation films. Then, the orientation films were subjected to rubbing treatment.

On the orientation film on one of the glass substrates, a mixture of a negative type photoresist material (TLOR-N; manufactured by Tokyo Ohka Industry Co.) to which a solution of polyester resin (Vylon 220; manufactured by Toyobo Vylon Co., softening temperature 110° C.) in 3 wt % of the material dissolved in propylene-glycol-methyl-ether acetate (PGMEA) was added, was spin-coated to a film thickness of 2 μm. Prebaking of the formed resist film was performed on a hot plate at 100° C. for 1 minute. Then, the resist film was exposed to light using a UV exposure apparatus at energy of 50 mJ/cm$^2$. Then, the resist film was developed to form a pattern of pillar-shaped spacers in the shape of cylinders of 10 μm in diameter arranged longitudinally and laterally at interval of 100 μm, washed with pure water, and dried. Further, post-baking was performed at 150° C. for 1 hour, and adhesive pillar shaped spacers (hereinafter simply referred to as "spacers") were formed.

An epoxy resin that was hardened at 150° C. for 1 hour was attached by a printing method to the periphery of one of the glass substrates except the portion for forming a liquid crystal injection port. The pair of glass substrates were superimposed such that transparent electrodes faced each other, placed into a vacuum bag, and subjected to heat treatment at 150° C. for 1 hour to harden the epoxy resin as the sealant of the periphery as well as to soften the polyester resin so as to adhere the glass substrates to each other. Then, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 60

In order to make comparison with example 134, a liquid crystal display of comparative example 60 was manufactured under same conditions as in example 134, except that spacers were formed without adding thermoplastic polyester resin.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that the liquid crystal display has inferior stress resistance against an external force acting to reduce the thickness of the liquid crystal layer.

When the liquid crystal display was supported at the center and a load of 100 g was applied to both end portions, change in display color was observed all over the display screen. This is because spacers were not adhered to the substrate, and therefore, the panel gap changed under applied pressure.

Example 135

A liquid crystal display of comparative example 60 was manufactured under same conditions as in example 134, except that an epoxy resin (Epofriend A1020; manufactured by Daicel Chemical Industries Co., softening point 110° C.) was used as the thermoplastic resin added to spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 61

A liquid crystal display was manufactured under same conditions as in example 134, except that the sealant was replaced by a material that is hardened at 190° C. for 1 hour. In this liquid crystal display, damage of the orientation film due to heat was observed, and display quality was degraded.

Comparative Example 62

A liquid crystal display was manufactured under same conditions as in example 134, except that a polyester resin with softening temperature of 150° C. was used as the adhesive and an epoxy resin that hardens at 140° C. for 1 hour was used as the sealant. In this liquid crystal display, adherence of spacers to the substrate via the adhesive was inadequate, so that the center portion of the panel bulged out as a result of hardening and shrinkage of the sealant in the periphery of the panel. Thus, the gap became non-uniform, leading to degradation of display quality.

Example 136

A liquid crystal display was manufactured under same conditions as in example 134, except that the polyester resin was added in an amount of 20% to spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 63

A liquid crystal display was manufactured under same conditions as in example 134, except that the polyester resin was added in an amount of 35% to spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

However, in the liquid crystal display of this example, the resin added to the pillar-shaped spacers spread to display electrodes outside the spacer region, leading to change of refractive index of the display electrode surface and consequent degradation of the display quality.

Comparative Example 64

A liquid crystal display was manufactured under same conditions as in example 134, except that the polyester resin was added in an amount of 0.2% to spacers.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that the liquid crystal display has inferior stress resistance against an external force acting to reduce the thickness of the liquid crystal layer.

When the liquid crystal display was supported at the center and a load of 100 g was applied to both end portions, a change in display color was observed all over the display screen. This is because spacers were not adhered to the substrate and, therefore, the panel gap changed under an external pressure.

Comparative Example 65

A liquid crystal display was manufactured under same conditions as in example 134, except that an epoxy resin with molecular weight (MW) of 231 was used as the resin added to spacers. In this liquid crystal display, the epoxy resin added to spacers dissolved into the liquid crystal, resulting in significant degradation of display quality.

Example 137

A liquid crystal display was manufactured under the same conditions as in example 134, except that the ferroelectric liquid crystal was replaced by twisted nematic type liquid crystal and the substrate gap was set at 6 µm.

When this liquid crystal display was evaluated in the same way as in example 134, it was found that the liquid crystal display exhibits the same good characteristics as example 134.

Example 138

A liquid crystal display was manufactured under the same conditions as in example 134, except that the ferroelectric liquid crystal was replaced by super twisted nematic type liquid crystal and the substrate gap was set at 6 µm.

When this liquid crystal display was evaluated in the same way as in example 134, it was found that the liquid crystal display exhibits the same good characteristics as example 134.

Example 139

A liquid crystal display was manufactured under the same conditions as in example 134, except that the ferroelectric liquid crystal was replaced by nematic cholesteric phase transition type liquid crystal and the substrate gap was set at 6 µm.

When this liquid crystal display was evaluated in the same way as in example 134, it was found that the liquid crystal display exhibits the same good characteristics as example 134.

Example 140

A liquid crystal display was manufactured under the same conditions as in example 134, except that the ferroelectric liquid crystal was replaced by anti-ferroelectric liquid crystal.

When this liquid crystal display was evaluated in the same way as in example 134, it was found that the liquid crystal display exhibits the same good characteristics as example 134.

Example 141

A liquid crystal display was manufactured under the same conditions as in example 134, except that the ferroelectric liquid crystal was replaced by twist grain boundary liquid crystal and the substrate gap was set at 6 µm.

When this liquid crystal display was evaluated in the same way as in example 134, it was found that the liquid crystal display exhibits the same good characteristics as example 134.

Example 142

A liquid crystal display was manufactured under the same conditions as in example 134, except that the ferroelectric liquid crystal was replaced by smectic A phase liquid crystal and the substrate gap was set at 6 µm.

When this liquid crystal display was evaluated in the same way as in example 134, it was found that the liquid crystal display exhibits the same good characteristics as example 134.

Example 143

A liquid crystal display was manufactured under the same conditions as in example 134, except that dropping method was adopted in place of vacuum injection method for injecting liquid crystal, and after ferroelectric liquid crystal was dropped on the substrate having spacers formed thereon and a sealing member disposed on the periphery thereof, the other substrate was superimposed on this substrate and heated so as to join the two substrates via the peripheral sealant and the pillar-shaped spacers. As the time required for injection of liquid crystal under reduced pressure was eliminated, time required for the manufacture was shortened as compared to example 134.

When this liquid crystal display was evaluated in the same way as in example 134, it was found that the liquid crystal display exhibits the same good characteristics as example 134.

As has been described above, in the liquid crystal display according to the ninth aspect of the present invention, the gap between a pair of substrates can be maintained uniform and constant in the effective display region of the liquid crystal display by using spacers which have sufficient strength without being mixed with beads or the like and which have also adhesive capability to the substrates. The liquid crystal display of the present invention can thereby improve uniformity of contrast and response speed in the effective display region, and thus, can exhibit an improved display quality.

Next, examples of liquid crystal display according to the tenth aspect of the present invention will be described in conjunction with comparative examples.

First, the step of sealing the liquid crystal display while maintaining the uniform and constant gap between electrodes in the liquid crystal display, will be described. The material used and the like will be described more specifically in subsequent examples.

A photoresist material with a substance having photo-thermal conversion capability added thereto was spin-coated on a glass substrate having transparent electrodes and a thermoplastic orientation film formed thereon. After being prebaked at 100° C. for 1 minute, the resist film was exposed to light using a photomask and a UV exposure apparatus, and was developed to form spacers in a pattern of cylinders of 10 µm in diameter arranged longitudinally and laterally at interval of 100 µm on the substrate. The spacers thus formed were washed with pure water and dried. Then, post-baking was performed at 180° C. for 60 minutes to form hardened spacers.

An adhesive sealant was disposed on the periphery of the glass substrate provided with spacers so as to leave a portion for forming a liquid crystal injection port. The other glass substrate having also a thermoplastic orientation film formed thereon was placed on this glass substrate to form an assembly. The spacers were irradiated with light from the side of the other glass substrate to raise the temperature of only the spacers by heat generated from the substance giving a photo-thermal conversion capability. By thus softening the thermoplastic orientation film on the other glass substrate in the portions in contact with the spacers, two glass substrates were joined with each other via the spacers. Then, the assembly was loaded into a heat treatment apparatus, and heat and pressure were applied at curing temperature (110° C.–150° C.) the heat curable resin of the adhesive sealant, to thereby seal the periphery of the glass substrates, and thus to obtain an empty panel.

Then, liquid crystal was injected through the liquid crystal injection port into the empty panel, and the liquid crystal injection port was finally sealed.

Example 144

A liquid crystal display of example 144 was manufactured in accordance with the above-described manufacturing method of liquid crystal displays.

3 wt % polycarbonate solution (softening temperature of the polycarbonate was 146° C.) was applied using a spin-coater at the rotation speed of 2000 rpm to a pair of glass substrates of 200×100×1.1 mm provided with ITO transparent electrodes, and was dried at 100° C. for 30 minutes to form orientation films. Then, the orientation films were subjected to rubbing treatment.

On the orientation film on one of the glass substrates, a spacer material consisting of a negative type photoresist material (TLOR-N; manufactured by Tokyo Ohka Industry Co.) uniformly mixed with carbon black (Printex 150T, manufactured by Cabot) in an amount of 5 wt % of the resist material, was spin-coated to a film thickness of 2 µm. Prebaking of the formed resist film was performed on a hot plate at 100° C. for 1 minute. Then, the resist film was exposed to light using a UV exposure apparatus at energy of 50 mJ/cm$^2$. Then, the resist film was developed to form spacers in a pattern of cylinders of 10 µm in diameter arranged longitudinally and laterally at intervals of 100 µm, washed with pure water, and dried. Further, post-baking was performed at 180° C. for 1 hour to harden the spacers.

Then, an epoxy resin that is hardened at 150° C. for 1 hour was attached by printing method to the periphery of one of the glass substrates except the portion for forming a liquid crystal injection port. The pair of glass substrates were superimposed such that transparent electrodes faced each other. Then, spacers were irradiated with light from the side of the substrate with no spacers formed thereon using a xenon flash lamp (FW502, manufactured by Ushio Co.) at light emitting frequency of 3 Hz for 3 seconds, to thereby adhere the spacers to the glass substrate via the softened thermoplastic orientation film in contact with the tip of the spacers. The pair of substrates thus joined with each other were placed into a vacuum bag, and subjected to heat treatment at 150° C. for 1 hour to harden the epoxy resin of the sealant of the periphery.

Then, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 66

In order to make comparison with the liquid crystal display of example 144, an example of liquid crystal display will be described below which was manufactured under same conditions with respect to size and shape of glass substrates, material for the orientation film, spacers and liquid crystal, etc., as in example 144, except that spacers were formed from a spacer material having no substance with photo-thermal conversion capability added thereto.

More specifically, a liquid crystal display was manufactured by following same procedure as in example 144, except that spacers were formed from a spacer material having no substance with photo-thermal conversion capability added thereto, and after a pair of substrates were superimposed, irradiation with light using a xenon flash lamp was not performed.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that the liquid crystal display has inferior stress resistance against an external force acting to reduce the thickness of the liquid crystal layer.

When the liquid crystal display was supported at the center and a load of 100 g was applied to both end portions, change in display color was observed over the entire display screen. This is because the spacers which had already hardened before superimposition of substrates were not adhered to the other substrate, and therefore, the gap between the substrates changed under the load.

Example 145

A liquid crystal display was manufactured under same conditions as in example 144, except that the aminium compound represented by formula (1) as shown before (in which $R^1$–$R^8$ were methyl groups, X was chlorine) was used as the substance giving photo-thermal conversion capability to be mixed into spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 146

A liquid crystal display was manufactured under the same conditions as in example 144, except that the diimonium compound represented by formula (2) as shown before (in which $R^1$–$R^8$ were methyl groups, X was chlorine) was used as the substance giving photo-thermal conversion capability to be mixed into spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 147

A liquid crystal display was manufactured under same conditions as in example 144, except that the vanadyl-naphthalocyanine compound represented by formula (3) as shown before (in which M was vanadium, $R^1$–$R^3$ were methyl groups) was used as the substance giving photo-thermal conversion capability to be mixed into spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 148

A liquid crystal display was manufactured under same conditions as in example 144, except that the light source was replaced by a laser light source (wavelength 905 nm, 2 W, HPD Co.) and irradiation with the laser light was performed for 30 seconds.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 149

A liquid crystal display was manufactured under same conditions as in example 144, except that the amount of carbon black added as the substance giving photo-thermal conversion capability to the resist material as the base material of spacers was 20 wt % of the resist material.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Comparative Example 67

A liquid crystal display was manufactured under same conditions as in example 144, except that the amount of carbon black added to the resist material as the base material of spacers was 25 wt % of the resist material.

In this example, spacers could not be formed in a predetermined pattern using a photolithographic method.

Comparative Example 68

A liquid crystal display was manufactured under same conditions as in example 144, except that polyimide with softening temperature of 350° C. was used as the material for orientation films.

When this liquid crystal display was placed under a cross nicol arrangement and was depressed at the center of the display region using a pen tip of 0.8 mm in tip diameter with a pen load of 100 g, change in display color was observed around the pen tip. It was shown from this observation that the liquid crystal display has inferior stress resistance against an external force acting to reduce the thickness of the liquid crystal layer.

When the liquid crystal display was supported at the center and a load of 100 g was applied to both end portions, change in display color was observed over the entire display screen. This is because the spacers were not adhered to the other substrate, and therefore, the gap between the substrates changed under the load.

Example 150

A liquid crystal display was manufactured under the same conditions as in example 144, except that the ferroelectric liquid crystal was replaced by twisted nematic type liquid crystal and the substrate gap was set at 6 μm.

When this liquid crystal display was evaluated in the same way as in example 144, it was found that the liquid crystal display exhibits the same good characteristics as example 144.

Example 151

A liquid crystal display was manufactured under the same conditions as in example 144, except that the ferroelectric liquid crystal was replaced by super twisted nematic type liquid crystal and the substrate gap was set at 6 μm.

When this liquid crystal display was evaluated in the same way as in example 144, it was found that the liquid crystal display exhibits the same good characteristics as example 144.

Example 152

A liquid crystal display was manufactured under the same conditions as in example 144, except that the ferroelectric liquid crystal was replaced by nematic cholesteric phase transition type liquid crystal and the substrate gap was set at 6 μm.

When this liquid crystal display was evaluated in the same way as in example 144, it was found that the liquid crystal display exhibits the same good characteristics as example 144.

Example 153

A liquid crystal display was manufactured under the same conditions as in example 144, except that the ferroelectric liquid crystal was replaced by anti-ferroelectric liquid crystal.

When this liquid crystal display was evaluated in the same way as in example 144, it was found that the liquid crystal display exhibits the same good characteristics as example 144.

Example 154

A liquid crystal display was manufactured under the same conditions as in example 144, except that the ferroelectric liquid crystal was replaced by twist grain boundary liquid crystal and the substrate gap was set at 6 μm.

When this liquid crystal display was evaluated in the same way as in example 144, it was found that the liquid crystal display exhibits the same good characteristics as example 144.

Example 155

A liquid crystal display was manufactured under the same conditions as in example 144, except that the ferroelectric liquid crystal was replaced by smectic A phase liquid crystal and the substrate gap was set at 6 μm.

When this liquid crystal display was evaluated in the same way as in example 144, it was found that the liquid crystal display exhibits the same good characteristics as example 144.

Example 156

A liquid crystal display was manufactured under the same conditions as in example 144, except that dropping method was adopted in place of vacuum injection method for injecting liquid crystal, and after sealing member was disposed on the periphery of the substrate having spacers formed thereon and ferroelectric liquid crystal was dropped on the substrate, the other substrate was superimposed on this substrate and the spacers were adhered to the other substrate by irradiation with light. As the time required for injection of liquid crystal under reduced pressure was eliminated, time required for the manufacture was shortened as compared to example 144.

When this liquid crystal display was evaluated in the same way as in example 144, it was found that the liquid crystal display exhibits same good characteristics as example 144.

As has been described above, in the liquid crystal display according to the tenth aspect of the present invention, the gap between a pair of superimposed substrates can be maintained uniform and constant by using spacers which have sufficient strength without being mixed with beads or the like. Using the photo-thermal conversion capability of spacers and the thermoplastic orientation film, spacers can be firmly adhered to the substrates via an orientation film that is softened by heat generated from spacers upon irradiation with light. When spacers are adhered to the substrate, a temperature rise is limited to the region in contact with spacers, and therefore, the orientation film is not damaged by heat. The liquid crystal display of the present invention can thereby improve uniformity of contrast and response speed in the effective display region, and thus, can exhibit an improved display quality.

Next, examples of liquid crystal display according to the eleventh aspect of the present invention will be described in conjunction with comparative examples.

First, the step of sealing the liquid crystal display, while maintaining a uniform and constant gap between electrodes in the liquid crystal display, will be described. The material used, and the like, will be described more specifically in subsequent examples.

A photoresist material was spin-coated on a glass substrate having transparent electrodes and an orientation film formed thereon. After being prebaked-at 100° C. for 1 minute, the resist film was exposed to light using a photomask and a UV exposure apparatus, and was developed to form spacers in a pattern of cylinders of 10 μm in diameter arranged longitudinally and laterally at intervals of 100 μm on the substrate. The spacers thus formed were washed with pure water and dried. Then, post-baking was performed at 180° C. for 60 minutes to form hardened spacers.

Then, an adhesive containing a photo-thermal heat generating agent was applied continuously on top of spacer using an adhesive applicator 220 as shown in FIG. 12. In the examples that follow, the adhesive applied on top of spacers 203 was stabilized by heating at 100° C. for 1 minute.

An adhesive sealant was disposed on the periphery of the glass substrate provided with spacers 203 having the adhesive applied on top thereof, so as to leave a portion for forming a liquid crystal injection port. The other glass substrate was placed on this glass substrate to form an assembly. The two glass substrates were joined with each other via spacers by irradiating the adhesive containing photo-thermal heat generating agent with light from the side of the other glass substrate. Then, the assembly was loaded into a heat treatment apparatus, and heat and pressure were applied at the curing temperature (110° C.–150° C.) of the heat curable resin of the adhesive sealant, to thereby seal the periphery of the glass substrates with the adhesive sealant, and thus to obtain an empty panel.

Then, liquid crystal was injected into the empty panel through the liquid crystal injection port, and the liquid crystal injection port was finally sealed.

Example 157

A liquid crystal display of example 157 was manufactured in accordance with the above-described manufacturing method of liquid crystal displays as follows.

3 wt % polyimide solution was applied using a spin-coater at the rotation speed of 2000 rpm to a pair of glass substrates of 200×100×1.1 mm provided with ITO transparent electrodes, and was baked at 200° C. for 30 minutes to form orientation films. Then, the orientation films were subjected to a rubbing treatment.

On the orientation film on one of the glass substrates, a negative type photoresist material (TLOR-N; manufactured by Tokyo Ohka Industry Co.) was spin-coated to a film thickness of 2 μm. Prebaking of the formed resist film was performed on a hot plate at 100° C. for 1 minute. Then, the resist film was exposed to light using a UV exposure apparatus at energy of 60 mJ/cm$^2$. Then, the resist film was developed to form spacers in a pattern of cylinders of 10 μm in diameter arranged longitudinally and laterally at intervals of 100 μm, and then washed with pure water, and dried. Further, post-baking was performed at 180° C. for 1 hour to harden the spacers.

On top of spacers thus formed, an adhesive of an epoxy resin (Cyclomer A200, manufactured by Daicel Chemical Industries) having carbon black (Printex 150T, manufactured by Cabot) uniformly mixed therein in an amount of 5% of the resin, was rolled and transferred in thickness of 0.05 µm using the applicator described above with reference to FIG. 12. Then, an epoxy resin that is hardened at 150° C. for 1 hour was attached by printing method to the periphery of this glass substrates except the portion for forming a liquid crystal injection port. The pair of glass substrates were superimposed such that transparent electrodes faced each other. Then, the substrates were irradiated with light from the side of the substrate in contact with the top of spacers using a xenon flash lamp (FW502, manufactured by Ushio Co.) at light emitting frequency of 3 Hz for 3 seconds, to thereby adhere the spacers to the glass substrate. The pair of substrates thus joined with each other were placed into a vacuum bag, and subjected to heat treatment at 150° C. for 1 hour to harden the epoxy resin of the peripheral sealant.

Next, ferroelectric liquid crystal was injected through the liquid crystal injection port (vacuum method), and the liquid crystal injection port was sealed to obtain a liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and the thickness of the liquid crystal layer did not change over the whole surface.

Comparative Example 69

In order to make comparison with the liquid crystal display of example 157, a liquid crystal display was manufactured under same conditions with respect to the size and shape of glass substrates, material for orientation films, spacers, and liquid crystal, etc., as in example 157, except that an adhesive containing photo-thermal heat generating agent was not used in the manufacture of the liquid crystal display.

More specifically, after spacers were formed on one of the substrates as in example 157, the liquid crystal display was manufactured by following same procedure as in example 157, except that an epoxy adhesive containing photo-thermal heat generating agent was not applied on top of spacers, and accordingly, irradiation with light from the xenon flash lamp was not performed after superimposition of a pair of substrates.

When this liquid crystal display was placed under a cross nicol arrangement and was depressed at the center of the display region using a pen tip of 0.8 mm in tip diameter with a pen load of 100 g, a change in display color was observed around the pen tip. It was shown from this observation that the liquid crystal display has inferior stress resistance against an external force acting to reduce the thickness of the liquid crystal layer.

When the liquid crystal display was supported at the center and a load of 100 g was applied to both end portions, a change in display color was observed over the entire display screen. This is because the spacers which had already hardened before superimposition of substrates were not adhered to the other substrate, and therefore, the gap between the substrates changed under the load.

Example 158

A liquid crystal display was manufactured under same conditions as in example 157, except that the aminium compound represented by formula (4) as shown before (in which $R^1$–$R^8$ were methyl groups, X was chlorine) was used as the photo-thermal heat generating agent to be mixed into the adhesive on top of spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 159

A liquid crystal display was manufactured under same conditions as in example 157, except that the diimonium compound represented by formula (5) as shown before (in which $R^1$–$R^8$ were methyl groups, X was chlorine) was used as the photo-thermal heat generating agent to be mixed into the adhesive on top of spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 160

A liquid crystal display was manufactured under same conditions as in example 157, except that the vanadyl-naphthalocyanine compound represented by formula (6) as shown before (in which M was vanadium, $R^1$–$R^3$ were methyl groups) was used as the photo-thermal heat generating agent to be mixed into the adhesive on top of spacers.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 161

A liquid crystal display was manufactured under same conditions as in example 157, except that the light source was replaced by a laser light source (wavelength 905 nm, 2 W, HPD Co.) and the adhesive on top of spacers were irradiated with the laser light for 30 seconds.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Example 162

A liquid crystal display was manufactured under same conditions as in example 157, except that the thickness of the adhesive applied on top of spacers was changed from 0.05 μm (2.5% of spacer height) in example 157 to 0.2 μm (10% of spacer height).

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface.

Comparative Example 70

A liquid crystal display was manufactured under same conditions as in example 157, except that the thickness of the adhesive applied on top of spacers was 15% of spacer height (0.3 μm).

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer. When the liquid crystal display was supported at the center and a load of 300 g was applied to both end portions, no change in display color was observed over the entire display screen, and thickness of the liquid crystal layer did not change over the whole surface. However, the excess adhesive applied on top of spacers spread to display electrodes, leading to change in the refractive index of the display electrode surface, and hence, degradation of display quality of the liquid crystal display.

Comparative Example 71

A liquid crystal display was manufactured under same conditions as in example 157, except that the thickness of the adhesive applied on top of the spacers was 20% of spacer height (0.4 μm).

In this liquid crystal display, when the adhesive was transferred to the top of spacers, the adhesive was also transferred to the orientation film, giving rise to orientation defects, and hence, a satisfactory display quality could not be obtained.

Example 163

A liquid crystal display was manufactured under same conditions as in example 157, except that the amount of carbon black mixed into the adhesive applied on top of spacers was 20% of the epoxy resin as the base material.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Comparative Example 72

A liquid crystal display was manufactured under same conditions as in example 157, except that the amount of carbon black mixed into the adhesive applied on top of spacers was 30% of the epoxy resin as the base material.

In this liquid crystal display, carbon black was dispersed in the adhesive in high concentration, and hence, extensibility of the adhesive was degraded in application thereof, so that the adhesive could not be applied uniformly. As a result, when this liquid crystal display was placed under a cross nicol arrangement and was depressed at the center of the display region using a pen tip of 0.8 mm in tip diameter with a pen load of 100 g, a change in display-color was observed around the pen tip. It was shown from this observation that the liquid crystal display has inferior stress resistance against an external force acting to reduce the thickness of the liquid crystal layer. When the liquid crystal display was supported at the center and a load of 300 g was applied to both end portions, change in display color was observed over the entire display screen.

Example 164

A liquid crystal display was manufactured under the same conditions as in example 157, except that the ferroelectric liquid crystal was replaced by twisted nematic type liquid crystal and the substrate gap was set at 6 μm.

When the obtained liquid crystal display was evaluated in the same way as in example 157, it was found that the liquid crystal display exhibits the same good characteristics as example 157.

Example 165

A liquid crystal display was manufactured under the same conditions as in example 157, except that the ferroelectric liquid crystal was replaced by super twisted nematic type liquid crystal and the substrate gap was set at 6 μm.

When this liquid crystal display was evaluated in the same way as in example 157, it was found that the liquid crystal display exhibits the same good characteristics as example 157.

Example 166

A liquid crystal display was manufactured under the same conditions as in example 157, except that the ferroelectric liquid crystal was replaced by nematic cholesteric phase transition type liquid crystal and the substrate gap was set at 6 μm.

When this liquid crystal display was evaluated in the same way as in example 157, it was found that the liquid crystal display exhibits the same good characteristics as example 157.

Example 167

A liquid crystal display was manufactured under the same conditions as in example 157, except that the ferroelectric liquid crystal was replaced by anti-ferroelectric liquid crystal.

When this liquid crystal display was evaluated in the same way as in example 157, it was found that the liquid crystal display exhibits the same good characteristics as example 157.

Example 168

A liquid crystal display was manufactured under the same conditions as in example 157, except that the ferroelectric liquid crystal was replaced by twist grain boundary liquid crystal and the substrate gap was set at 6 μm.

When this liquid crystal display was evaluated in the same way as in example 157, it was found that the liquid crystal display exhibits the same good characteristics as example 157.

Example 169

A liquid crystal display was manufactured under the same conditions as in example 157, except that the ferroelectric liquid crystal was replaced by smectic A phase liquid crystal and the substrate gap was set at 6 μm.

When this liquid crystal display was evaluated in the same way as in example 157, it was found that the liquid crystal display exhibits the same good characteristics as example 157.

Example 170

A liquid crystal display was manufactured under the same conditions as in example 157, except that a dropping method was adopted in place of vacuum injection method for injecting liquid crystal and, after an adhesive containing photo-thermal heat generating agent was applied on top of spacers formed on one of the substrates, and a sealing member was disposed on the periphery of the substrate, and ferroelectric liquid crystal was dropped on the substrate, the other substrate was superimposed on this substrate and spacers were adhered to the other substrate via the adhesive by irradiation with light. As the time required for injection of liquid crystal under reduced pressure was eliminated, the time required for the manufacture was shortened as compared to example 157.

When the obtained liquid crystal display was evaluated in the same way as in example 157, it was found that the display shows same good characteristics as example 157.

As has been described above, in the liquid crystal display according to the eleventh aspect of the present invention, the gap between a pair of superimposed substrates can be maintained uniform and constant by using hardened spacers which have sufficient strength without being mixed with beads or the like. Also, using an adhesive containing photo-thermal heat generating agent, spacers can be firmly adhered to the substrate. When the substrate was adhered to spacers having the adhesive on top thereof, a temperature rise does not occur outside the joint region of the two, so that the orientation film is not damaged by heat. The liquid crystal display of the present invention can thereby improve uniformity of contrast and response speed in the effective display region, and thus, can exhibit an improved display quality.

Next, examples of liquid crystal display according to the twelfth aspect of the present invention will be described in conjunction with comparative examples.

First, the step of sealing the liquid crystal display while maintaining the uniform and constant gap between electrodes in the liquid crystal display, will be briefly described. Materials used, and the like, will be described more specifically in subsequent examples.

A photoresist material was spin-coated on a glass substrate having transparent electrodes and an orientation film formed thereon. After being prebaked at 100° C. for 1 minute, the resist film was exposed to light, by back surface exposure through the glass substrate using a photomask and a UV exposure apparatus, and was then developed to form spacers in a pattern of cylinders of 10 μm in diameter arranged longitudinally and laterally at interval of 100 μm on the substrate. The spacers thus formed were washed with pure water and dried.

An adhesive sealant was disposed on the periphery of the glass substrate provided with spacers so as to leave a portion for forming a liquid crystal injection port. The other glass substrate was placed on this glass substrate to form an assembly. This assembly was loaded into a heat treatment apparatus, and heat and pressure were applied at the curing temperature (110° C.–150° C.) of the heat curable resin of the spacer and the adhesive sealant. By this treatment, spacers were hardened under pressure so as to adhere the two glass substrates firmly to each other. At the same time, the periphery of the glass substrates was sealed by the adhesive sealant, and thus an empty panel was obtained.

Then, liquid crystal was injected into the empty panel through the liquid crystal injection port, and the liquid crystal injection port was finally sealed.

Example 171

A liquid crystal display of example 171 was manufactured in accordance with the above-described manufacturing method of liquid crystal displays as follows.

3 wt % polyimide solution was applied using a spin-coater at the rotation speed of 2000 rpm to a pair of glass substrates of 200×100×1.1 mm provided with ITO transparent electrodes over the entire surface, and was baked at 200° C. for 30 minutes to form orientation films.

On the orientation film on one of the glass substrates, a negative type photoresist material (TLOR-N; manufactured by Tokyo Ohka Industry Co.) was spin-coated to a film thickness of 2 μm. Prebaking of the formed resist film was performed on a hot plate at 100° C. for 1 minute. Then, the resist film was exposed to light through the glass substrate from the side opposite to the formed resist film using a UV exposure apparatus at wavelength of 254 nm for 10 seconds. With this exposure, the resist film in the exposed portion was hardened such that the degree of hardening decreased from the substrate side to the front end. Then, the resist film was developed to form spacers in a pattern of cylinders of 10 μm in diameter arranged longitudinally and laterally at interval of 100 μm, and then washed with pure water, and dried.

Figure 19:
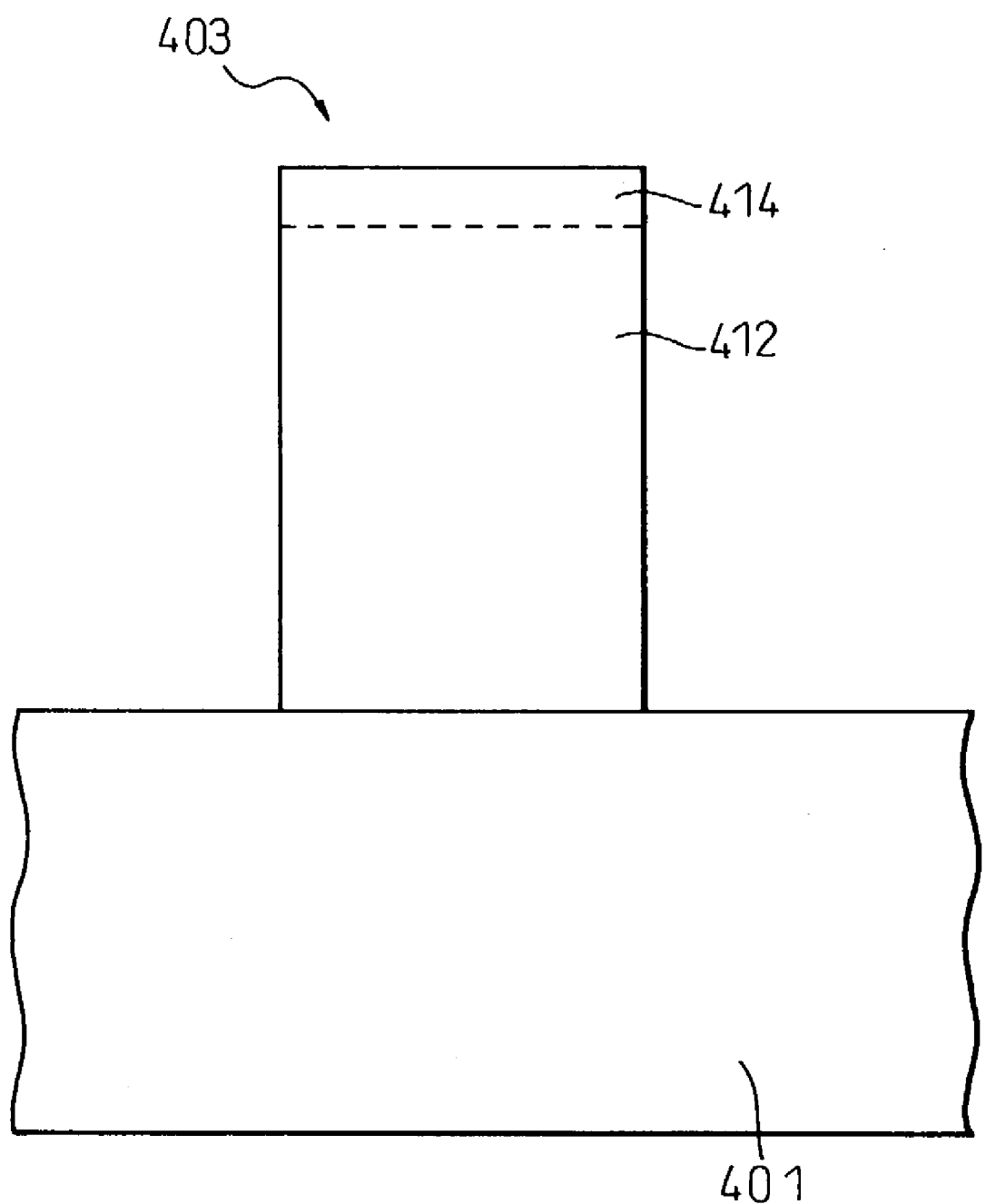
FIG. 19 is a view useful for explaining a spacer used in a manufacturing method for a liquid crystal display according to a twelfth aspect of the present invention.

FIG. 19 is a schematic view showing a spacer thus formed. This spacer 403 is formed in the shape of a cylinder on one of the substrates 401 having a portion of high degree of hardening 412 near the substrate 401 and a portion of low degree of hardening 414 on the front end away from the substrate 401. In FIG. 19, a region of high degree of hardening 412 and a region of low degree of hardening 414 are shown with a clear boundary between them. In reality, however, the degree of hardening decreases gradually from the substrate side to the front end side, and no such clear boundary as shown in the FIG. 19 cannot be recognized.

Then, the orientation films on both substrates were subjected to rubbing treatment.

Then, an epoxy resin that is hardened at 150° C. for 1 hour was attached by printing method to the periphery of this glass substrates except the portion for forming a liquid crystal injection port. The pair of glass substrates were superimposed such that transparent electrodes faced each other, were placed into a vacuum bag, and were subjected to heat treatment at 150° C. for 1 hour to harden the epoxy resin of the peripheral sealant as well as to harden the resin (resist) of low degree of hardening at the front end of spacers to thereby join the glass substrates with each other. Next, ferroelectric liquid crystal was injected through the liquid crystal injection port (vacuum method), and the liquid crystal injection port was sealed to obtain a ferroelectric liquid crystal display.

When this liquid crystal display was placed under a cross nicol arrangement and was depressed at the center of the display region using a pen tip of 0.8 mm in tip diameter with a pen load of 100 g, no change in display color was observed around the pen tip. It was confirmed from this observation that the liquid crystal display has stress resistance against an external force acting to reduce the thickness of the liquid crystal layer.

When the liquid crystal display was supported at the center and a load of 300 g was applied to both end portions, no change in display color was observed over the entire display screen, and thickness of the liquid crystal layer did not change over the whole surface.

Example 172

A liquid crystal display was manufactured under same conditions as in example 171, except that the resist film was exposed to light with the photomask having circular pattern of 10 μm in diameter for forming a spacer replaced by one such that light transmissivity decreased from peripheral portion to center portion and center portion was more difficult to be exposed.

When the obtained liquid crystal display was evaluated in the same way as in example 171, it was found that the liquid crystal display exhibits the same good characteristics as example 171.

Example 173

A liquid crystal display was manufactured under the same conditions as in example 171, except that the ferroelectric liquid crystal was replaced by twisted nematic type liquid crystal and the substrate gap was set at 6 μm.

When the obtained liquid crystal display was evaluated in the same way as in example 171, it was found that the liquid crystal display exhibits the same good characteristics as example 171.

Example 174

A liquid crystal display was manufactured under the same conditions as in example 171, except that the ferroelectric liquid crystal was replaced by super twisted nematic type liquid crystal and the substrate gap was set at 6 μm.

When this liquid crystal display was evaluated in the same way as in example 171, it was found that the liquid crystal display exhibits the same good characteristics as example 171.

Example 175

A liquid crystal display was manufactured under the same conditions as in example 171, except that the ferroelectric liquid crystal was replaced by nematic cholesteric phase transition type liquid crystal and the substrate gap was set at 6 μm.

When this liquid crystal display was evaluated in the same way as in example 171, it was found that the liquid crystal display exhibits the same good characteristics as example 171.

Example 176

A liquid crystal display was manufactured under the same conditions as in example 171, except that the ferroelectric liquid crystal was replaced by anti-ferroelectric liquid crystal.

When this liquid crystal display was evaluated in the same way as in example 171, it was found that the liquid crystal display exhibits the same good characteristics as example 171.

Example 177

A liquid crystal display was manufactured under the same conditions as in example 171, except that the ferroelectric liquid crystal was replaced by twist grain boundary liquid crystal and the substrate gap was set at 6 μm.

When this liquid crystal display was evaluated in the same way as in example 171, it was found that the liquid crystal display exhibits the same good characteristics as example 171.

Example 178

A liquid crystal display was manufactured under the same conditions as in example 171, except that the ferroelectric liquid crystal was replaced by smectic A phase liquid crystal and the substrate gap was set at 6 μm.

When this liquid crystal display was evaluated in the same way as in example 171, it was found that the liquid crystal display exhibits the same good characteristics as example 171.

Example 179

A liquid crystal display was manufactured under the same conditions as in example 171, except that dropping method was adopted in place of vacuum injection method for injecting liquid crystal, and after ferroelectric liquid crystal was dropped on the substrate having spacers formed thereon and sealing member disposed on the periphery thereof, the other substrate was superimposed on this substrate and heated so that two substrates were adhered to each other via spacers. Since the time required for injection of liquid crystal under reduced pressure was eliminated, the time required for the manufacture was shortened as compared to example 171.

When the obtained liquid crystal display was evaluated in the same way as in example 171, it was found that the display shows same good characteristics as example 171.

Comparative Example 73

A liquid crystal display was manufactured under the same conditions as in example 171, except that the whole circles of 10 μm in diameter for forming spacers were exposed to light for 1 minute so as not to leave unhardened portion in spacers.

This liquid crystal display was evaluated in the same way as in example 171. As the spacers had been completely hardened before superimposition of the substrates, adequate adherence of spacers to the other substrate was not obtained, so that, when this liquid crystal display was placed under a cross nicol arrangement and was depressed at the center of the display region using a pen tip of 0.8 mm in tip diameter with a pen load of 100 g, change in display color was observed around the pen tip, and hence, a display defect was recognized.

Comparative Example 74

A liquid crystal display was manufactured under the same conditions as in example 171, except that the whole circles of 10 μm in diameter for forming spacers were exposed to light for 2 seconds.

This liquid crystal display was evaluated in the same way as in example 171. As the exposure time was not enough and overall hardening of spacers was inadequate, the strength of the spacers was low and the spacers collapsed when forming a panel, so that the gap of 2 μm could not be formed. Therefore, good liquid crystal display was not realized with this device.

Comparative Example 75

A liquid crystal display was manufactured under the same conditions as in example 171, except that the photomask for forming spacers was replaced by one wherein light transmissivity increased from peripheral portion to center portion and center portion was more easily exposed (light transmissivity of peripheral portion of 6 μm in inner diameter and 2 μm in width was 50% of that of center portion).

Spacers in this example had center portion already hardened when the substrates were superimposed and press-bonded to each other, and did not collapse under pressure, so that, the surrounding portion that was in unhardened (semi-hardened) state and was expected to exhibit adhesive capability upon hardening, was not brought into contact with the substrate, and therefore, adherence of spacers to the substrate was not obtained. (In contrast, in spacers in example 172, hardening of the peripheral portion having higher degree of hardening was not so high, and spacers collapsed to some degree under pressure and adherence of spacers to the substrate was thereby realized).

The obtained liquid crystal display was evaluated in the same way as in example 171. Adherence of spacers to the substrate was not obtained, so that, when this liquid crystal display was placed under a cross nicol arrangement and was depressed at the center of the display region using a pen tip of 0.8 mm in tip diameter with a pen load of 100 g, a change in display color was observed around the pen tip, and a display defect was recognized.

Comparative Example 76

A liquid crystal display was manufactured under the same conditions as in example 171, except that a negative type resist that is hardened at 190° C. for 1 hour was used as spacer material, and it was hardened at 190° C. for 1 hour.

As the curing temperature of spacers was higher than the temperature at which the effect of rubbing of the orientation films was lost (150° C.), damage due to heat was observed in the orientation films, leading to degradation of display quality of the liquid crystal display.

As has been described above, according to the twelfth aspect of the present invention, a liquid crystal display can be manufactured wherein, by using spacers which have sufficient strength without being mixed with beads or the like as well as sufficient adhesive capability to substrates, the gap in the effective display region of the liquid-crystal display can be maintained uniform and constant. The liquid crystal display of the present invention can thereby improve uniformity of contrast and response speed in the effective display region and, thus, can exhibit an improved display quality.

What is claimed is:

1. A liquid crystal display comprising:
   a pair of substrates of which at least one is transparent and each has electrodes and an orientation film formed on one surface thereof and which are opposed with these surfaces having electrodes and an orientation film formed thereon facing each other;
   spacers disposed between these opposed surfaces; and liquid crystal sealed between the substrates with the periphery of the opposed substrates being sealed;
   wherein each of said substrates is adhered to part of the ends of the respective spacers facing the substrate,
   and wherein the end of the spacer includes two or more hardened portions not adhered to the substrate, the portions of the end of the spacer not adhered to the substrate and the portion(s) of the end of the spacer.

2. A liquid crystal display comprising: a pair of substrates of which at least one is transparent and each has electrodes and an orientation film formed on one surface thereof and which are opposed with these surfaces having electrodes and an orientation film formed thereon facing each other; spacers disposed between these opposed surfaces; and liquid crystal sealed between the substrates with the periphery of the opposed substrates being sealed;
   wherein at least one of said orientation films is thermoplastic, and said spacers have photo-thermal conversion capability, and the spacers are adhered to the thermoplastic orientation film,
   wherein said spacers are formed from a spacer base material having a photo-thermal conversion capability providing agent added thereto, and
   wherein said photo-thermal conversion capability providing agent is selected from the group consisting of an aminium compound represented by a following formula

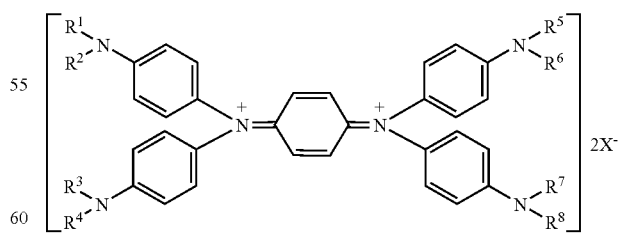

(in the above formula, each of $R^1$–$R^8$ represents hydrogen atom, halogen atom, alkyl group, aryl group, alkoxy group, nitro group, or carboxyl group, and $X^-$ represents an anion),
   a diimonium compound represented by a following formula

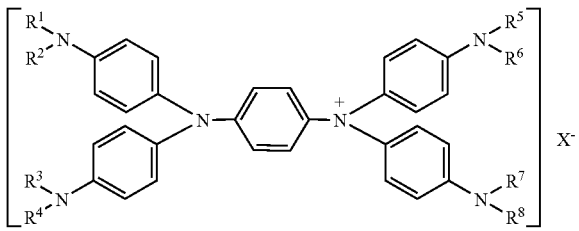

(in the above formula, each of $R^1$–$R^8$ represents hydrogen atom, halogen atom, alkyl group, aryl group, alkoxy group, nitro group, or carboxyl group, and $X^-$ represents an anion), and a vanadyl-naphthalocyanine represented by a following formula

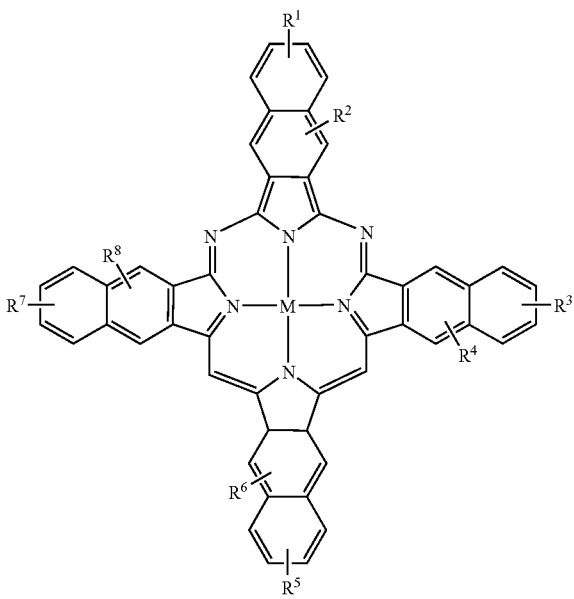

(each of $R^1$–$R^8$ represents a hydrogen atom, a halogen atom, a saturated or unsaturated hydrocarbon group of carbon number of 1–18, oxygen and/or nitrogen containing hydrocarbon with carbon number of 1–13, and M represents a divalent metal, two hydrogen atoms, or an atomic group containing trivalent or quadrivalent atom combined with other atoms with total valence of 2).

3. A liquid crystal display according to claim 2, wherein the softening point of said orientation film is 200° C. or lower.

4. A liquid crystal display according to claim 2, wherein said orientation film is formed from a thermoplastic resin selected from the group consisting of polyethylene, polyvinyl acetate, polyvinyl chloride, polyvinyl alcohol, polyvinylmethyl ketone, polyvinyl cinnamate, polystyrene, polybutylene terephthalate, polyethylene terephthalate, polyhexylene terephthalate, nylon 6, nylon 66, nylon 69, nylon 11, nylon 12, polyamide, polyester, polyimide, polymethyl methacrylate, polycarbonate, and mixtures thereof.

5. A liquid crystal display according to claim 2, wherein said spacers contain the photo-thermal conversion capability providing agent in an amount of 20 wt% or less of said spacer base material.

6. A liquid crystal display according to claim 2, wherein said spacer base material is a positive type or a negative type photosensitive resin.

7. A liquid crystal display according to claim 6, wherein said photosensitive resin is at least one resin selected from the group consisting of polyimide, polyamide, polyvinylalcohol, polyacrylamide, cyclized rubber, novolac resin, polyester, polyurethane, acrylate resin, bisphenol resin, and gelatin made to be a photosensitive resin.

8. A liquid crystal display according to claim 2, wherein said liquid crystal is twisted nematic type liquid crystal, super twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal, or smectic A phase liquid crystal.

9. A liquid crystal display comprising: a pair of substrates of which at least one is transparent and each has electrodes and an orientation film formed on one surface thereof and which are opposed with these surfaces having electrodes and an orientation film formed thereon facing each other; spacers disposed between these opposed surfaces; and liquid crystal sealed between the substrates with the periphery of the opposed substrates being sealed;

wherein said spacers are adhered to one of said pair of substrates via an adhesive containing a photo-thermal heat generating agent, and wherein said photo-thermal heat generating agent contained in said adhesive is selected from the group consisting of an aminium compound represented by a following formula

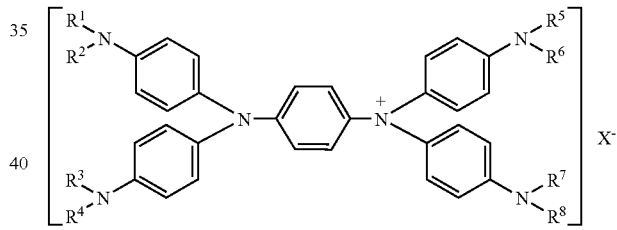

(in the above formula, each of $R^1$–$R^8$ represents hydrogen atom, halogen atom, alkyl group, aryl group, alkoxy group, nitro group, or carboxyl group, and $X^-$ represents an anion), a diimonium compound represented by a following formula

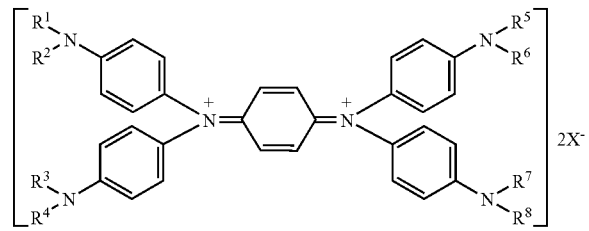

(in the above formula, each of $R^1$–$R^8$ represents hydrogen atom, halogen atom, alkyl group, aryl group, alkoxy group, nitro group, or carboxyl group, and $X^-$ represents an anion), and a vanadyl-naphthalocyanine represented by a following formula

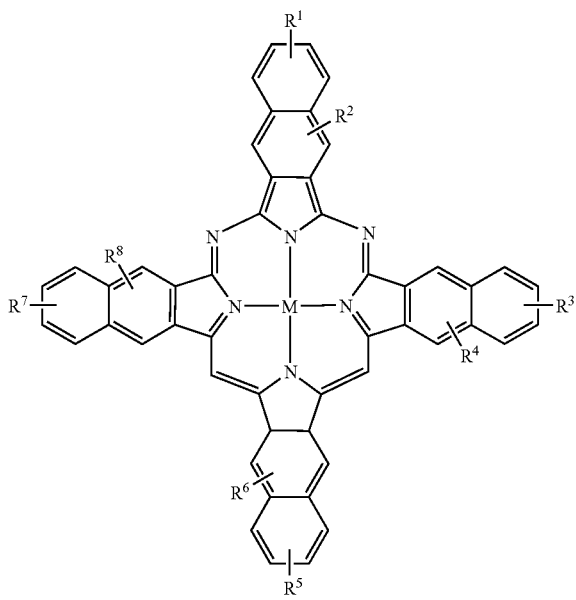

(each of $R^1$–$R^8$ represents hydrogen atom, halogen atom, saturated or unsaturated hydrocarbon group of carbon number of 1–18, oxygen and/or nitrogen containing hydrocarbon with carbon number of 1–13, and M represents divalent metal, two hydrogen atoms, or an atomic group containing trivalent or quadrivalent atom combined with other atoms with total valence of 2).

10. A liquid crystal display according to claim 9, wherein said adhesive contains a photo-thermal heat generating agent as well as a resin component as the base material.

11. A liquid crystal display according to claim 10, wherein said adhesive contains the photo-thermal heat generating agent in an amount of 20 wt% or less of said resin.

12. A liquid crystal display according to claim 9, wherein said adhesive containing a photo-thermal heat generating agent is interposed between said spacers and said one of the substrates in thickness of 10% or less of the height of the spacer.

13. A liquid crystal display according to claim 9, wherein said spacers are formed from a positive type or a negative type photosensitive resin.

14. A liquid crystal display according to claim 9, wherein said liquid crystal is twisted nematic type liquid crystal, super twisted nematic type liquid crystal, nematic cholesteric phase transition type liquid crystal, polymer dispersion type liquid crystal, ferroelectric liquid crystal, anti-ferroelectric liquid crystal, twist grain boundary liquid crystal, or smectic A phase liquid crystal.

* * * * *

UNITED STATES PATENT AND TRADEMARK OFFICE
CERTIFICATE OF CORRECTION

PATENT NO. : 7,179,512 B2
APPLICATION NO. : 10/436331
DATED : February 20, 2007
INVENTOR(S) : Katsuji Ebisu et al.

It is certified that error appears in the above-identified patent and that said Letters Patent is hereby corrected as shown below:

Column 128, Line 30, after "spacer" delete "." and insert --adhered to the substrate are alternately arranged concentrically.--.

Signed and Sealed this

Nineteenth Day of June, 2007

JON W. DUDAS
*Director of the United States Patent and Trademark Office*